United States Patent
Akiyama

(10) Patent No.: US 11,738,974 B2
(45) Date of Patent: Aug. 29, 2023

(54) ADJUSTABLE LOAD LEVELER APPARATUS AND RELATED METHODS FOR USE WITH AUTOMOTIVE MANUFACTURING SYSTEMS

(71) Applicant: TOYOTA MOTOR ENGINEERING & MANUFACTURING NORTH AMERICA, INC., Plano, TX (US)

(72) Inventor: Shigeo Akiyama, Lexington, KY (US)

(73) Assignee: TOYOTA MOTOR ENGINEERING & MANUFACTURING NORTH INC., Plano, TX (US)

( * ) Notice: Subject to any disclaimer, the term of this patent is extended or adjusted under 35 U.S.C. 154(b) by 386 days.

(21) Appl. No.: 16/945,967

(22) Filed: Aug. 3, 2020

(65) Prior Publication Data
US 2022/0033231 A1 Feb. 3, 2022

(51) Int. Cl.
  B66C 13/04 (2006.01)
  B66C 1/10 (2006.01)
  B62D 65/02 (2006.01)

(52) U.S. Cl.
  CPC ............ B66C 13/04 (2013.01); B62D 65/022 (2013.01); B66C 1/10 (2013.01)

(58) Field of Classification Search
  CPC .. B66C 13/04; B66C 1/10; B66C 1/66; B66C 1/666; B62D 65/022
  USPC ........................................................ 294/81.3
  See application file for complete search history.

(56) References Cited

U.S. PATENT DOCUMENTS

| | | | |
|---|---|---|---|
| 1,928,213 A | 9/1933 | Showers, Jr. et al. | |
| 3,596,968 A * | 8/1971 | Holm | B66C 1/10 |
| | | | 294/81.4 |
| 4,936,616 A * | 6/1990 | Williams | B66C 1/10 |
| | | | 294/67.5 |
| 6,499,779 B2 | 12/2002 | Thies et al. | |
| 6,716,018 B2 | 4/2004 | Abrego et al. | |
| 8,979,148 B1 | 3/2015 | Hatton, II | |
| 10,106,376 B2 | 10/2018 | Del Pozo Polidoro et al. | |
| 2011/0036043 A1 * | 2/2011 | Heinaman | B66C 1/105 |
| | | | 52/741.1 |

(Continued)

| | | | |
|---|---|---|---|
| 2015/0321886 A1 * | 11/2015 | Eicher | B66C 1/10 |
| | | | 294/81.3 |

FOREIGN PATENT DOCUMENTS

| | | |
|---|---|---|
| JP | 2-249893 A | 10/1990 |
| JP | 10-87271 A | 4/1998 |

* cited by examiner

Primary Examiner — Paul T Chin
(74) Attorney, Agent, or Firm — Oblon, McClelland, Maier & Neustadt, L.L.P.

(57) ABSTRACT

Adjustable load leveler apparatus and related methods for use with automotive manufacturing systems are disclosed. A disclosed automotive manufacturing system includes a hoist supported by a support structure and configured to carry a vehicle component. The automotive manufacturing system also includes a load leveler mechanism attached to the hoist. The load leveler mechanism includes a frame, a weight movably coupled to the frame, and an actuator operatively coupled to the weight. The automotive manufacturing system also includes control circuitry connected to the actuator and an input device connected to the control circuitry and configured to generate input data in response to a user interacting with the input device. The control circuitry is configured to move, via the actuator, the weight relative to the hoist based on the input data to adjust a levelness of the hoist.

19 Claims, 17 Drawing Sheets

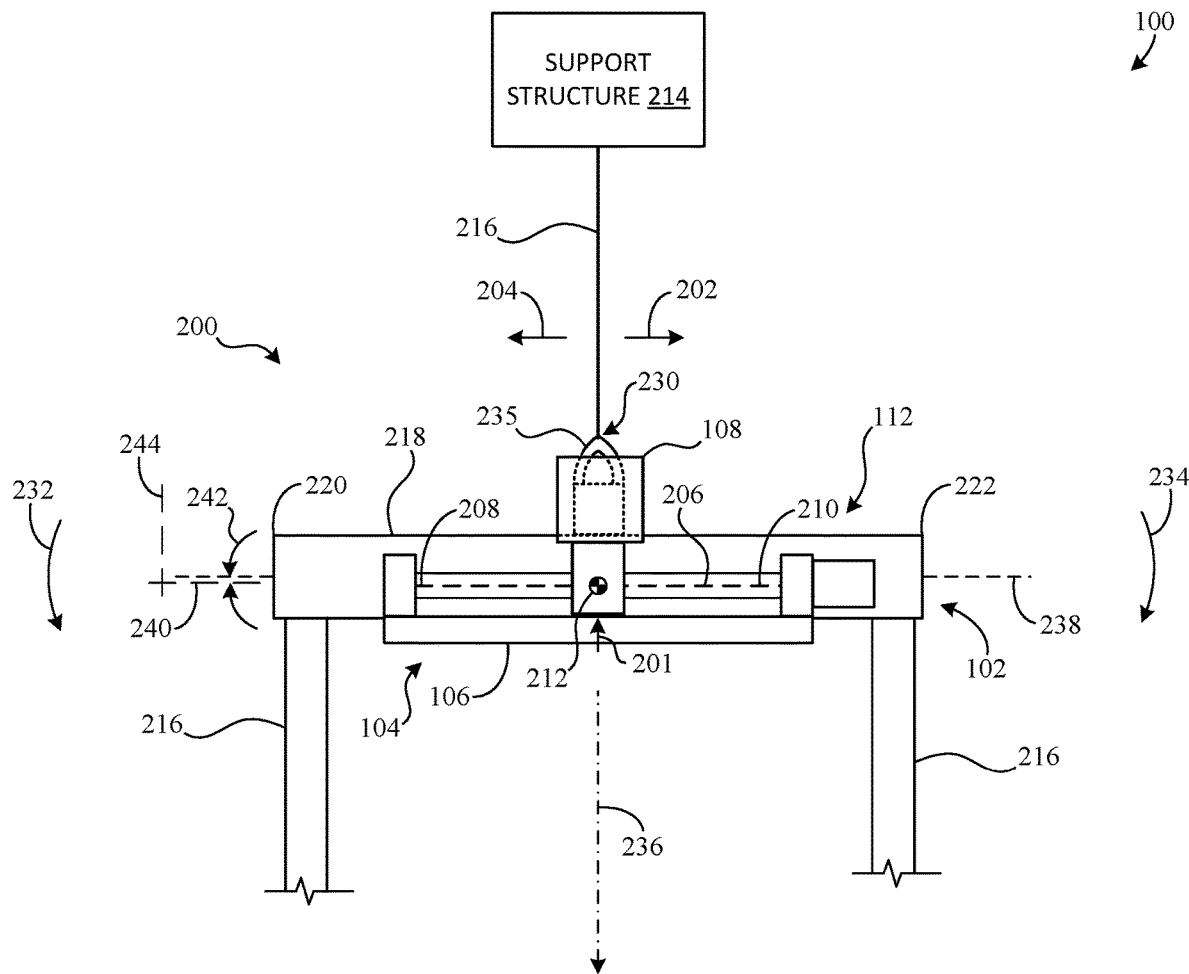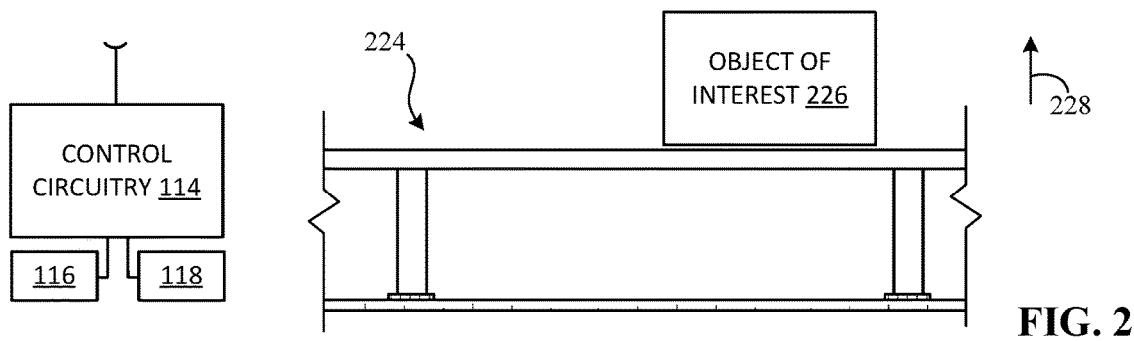
FIG. 2

ADJUSTABLE LOAD LEVELER APPARATUS AND RELATED METHODS FOR USE WITH AUTOMOTIVE MANUFACTURING SYSTEMS

FIELD OF THE DISCLOSURE

This disclosure relates generally to lifting devices and, more particularly, to adjustable load leveler apparatus and related methods for use with automotive manufacturing systems.

BACKGROUND

Lifting devices, such as hoists, load levelers, etc., are used in a wide-range of applications and can assist users in moving and/or orienting objects. Some manufacturing systems (e.g., automotive manufacturing systems) typically employ hoists capable of repeatedly lifting relatively large or heavy objects and lowering the objects in a desired manufacturing area during a production run.

SUMMARY

An aspect of the present disclosure includes an automotive manufacturing system. The automotive manufacturing system includes a hoist supported by a support structure and configured to carry a vehicle component. The automotive manufacturing system also includes a load leveler mechanism attached to the hoist. The load leveler mechanism includes a frame, a weight movably coupled to the frame, and an actuator operatively coupled to the weight. The automotive manufacturing system also includes control circuitry connected to the actuator and an input device connected to the control circuitry and configured to generate input data in response to a user interacting with the input device. The control circuitry is configured to move, via the actuator, the weight relative to the hoist based on the input data to adjust a levelness of the hoist. The control circuitry may be connected to one or more tilt sensors and receive sensor data therefrom.

Another aspect of the present disclosure includes an adjustable load leveler mechanism for a hoist. The adjustable load leveler mechanism includes a frame coupled to the hoist, a weight movable along the frame to change a center of gravity of the hoist, and an actuator operatively coupled to the weight. The adjustable load leveler mechanism also includes an input device configured to generate a user input in response to a user interacting with the input device. The adjustable load leveler mechanism also includes control circuitry configured to receive the user input from the input device and control, based on the user input, the actuator to move the weight relative to the hoist.

Another aspect of the present disclosure includes a method of operating an adjustable load leveler mechanism attached to a hoist. The method includes interacting with an output device to receive a production instruction associated with a manufacturing system. The method also includes lifting an object of interest off of a first handling unit via the hoist. The method also includes identifying an input device connected to control circuitry of the adjustable load leveler mechanism. The adjustable load leveler mechanism includes a frame, a weight movably coupled to the frame, and an actuator operatively coupled to the weight. The method also includes interacting with the input device in accordance with the production instruction or sending, via a network, an additional instruction to cause the control circuitry to move, via the actuator, the weight relative to the hoist to adjust a levelness of the hoist.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2-6 illustrate schematic diagrams of the example load leveler mechanism of FIG. 1 and show example implementations thereof in accordance with the teachings of this disclosure;

In general, the same reference numbers will be used throughout the drawing(s) and accompanying written description to refer to the same or like parts.

DETAILED DESCRIPTION

Figure 1:
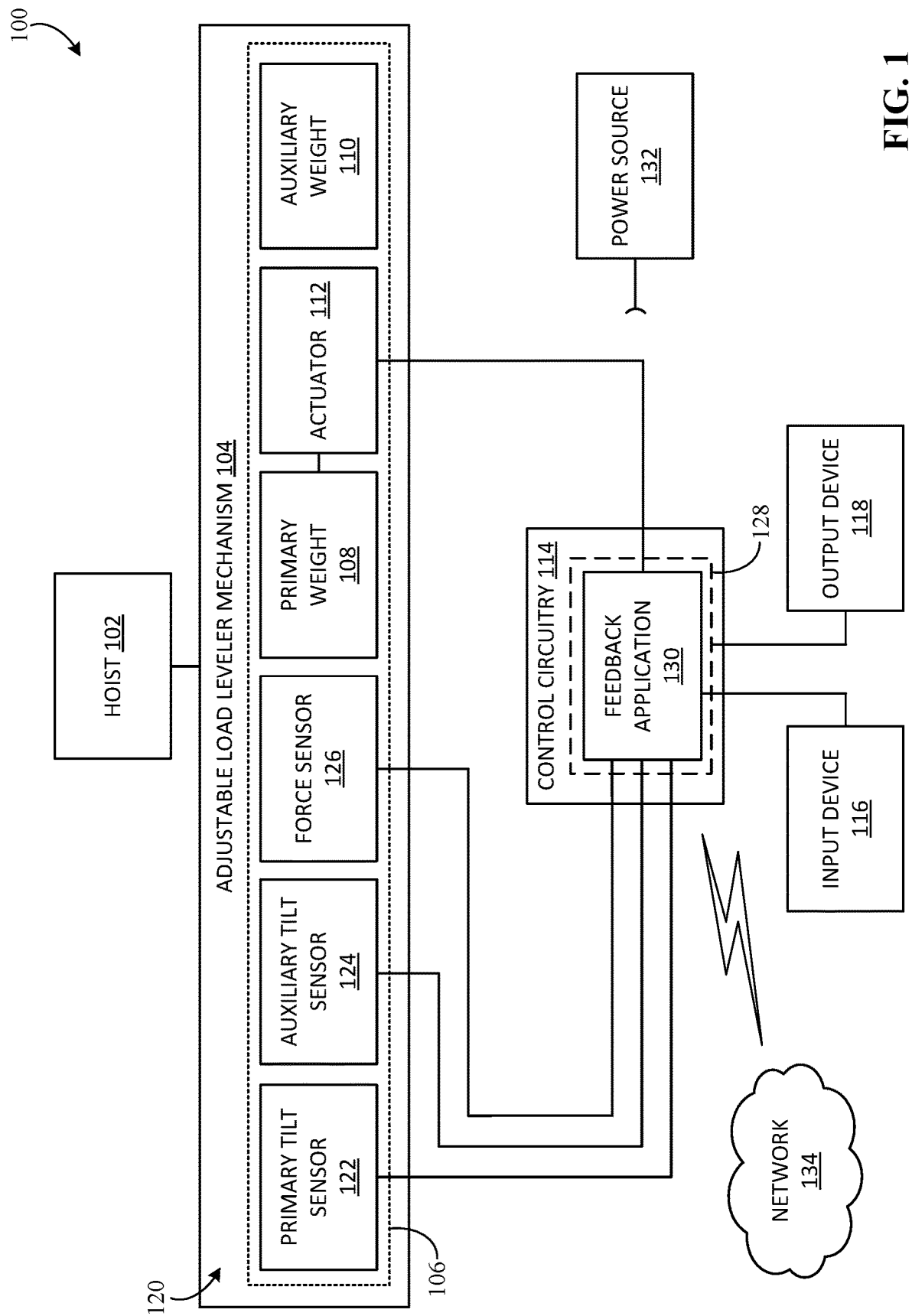
FIG. 1 illustrates a schematic diagram of an example manufacturing system including an example hoist, an example load leveler mechanism, and example control circuitry in accordance with the teachings of this disclosure.

Some automotive manufacturing systems employ hoists configured to pick up and/or carry vehicle components such as, for example, a first assembly or subassembly (e.g., one or more of a front suspension subassembly, an engine, a transmission, etc.) corresponding to a first vehicle model (e.g., a vehicle having a six-cylinder combustion engine and an automatic transmission). Such a hoist is typically supported by an overhead rail or girder in a manufacturing plant via wires, chains, etc. During a certain manufacturing process, the hoist can pick up the first subassembly from a conveyor and place it on top of an engine lifter to install the first subassembly on a vehicle body. To properly place the first subassembly on the engine lifter, a certain levelness of the hoist is maintained while the hoist is carrying the first subassembly. Typically, the levelness of the hoist is manually calibrated or tuned beforehand by one or more users such that the hoist remains substantially level or does not tilt when carrying the first subassembly during a production run. However, such hoists may substantially tilt when used to lift and/or carry a different or second subassembly corresponding to a different or second vehicle model (e.g., a vehicle having a four-cylinder combustion engine and a continuously variable transmission (CVT)). For example, the second subassembly may have more weight on a particular side of the subassembly compared to the previous or first subassembly. As a result, when the second subassembly is produced during the production run or a subsequent production run, plant personnel may need to physically interact with the hoist to manually adjust the levelness of the hoist, for example, by pushing the hoist and exerting substantial effort. Thus, when a new vehicle model is introduced to an automotive manufacturing system, such hoists may decrease manufacturing productivity and/or pose risks to the plant personnel manually adjusting the hoist.

Some manufacturing systems employ known load levelers capable of adjusting a levelness of a hoist while the hoist is carrying a load. However, such known load levelers shift a pick point or set point of the hoist in order to adjust the levelness and, consequently, also shift the load. Further, the center of the load changes as a result of shifting the load. Thus, the load may be substantially misaligned or off-center relative to a handling unit (e.g., the engine lifter) when the hoist lowers the load onto the handling unit. Such misalignment of the load and the handling unit can cause issues during a production run of a manufacturing system. Additionally, these known load levelers tend to be bulky and large because they have to carry the entire load capacity in order to adjust the levelness, which may be undesirable in certain manufacturing applications.

Adjustable load leveler apparatus and related methods for use with automotive manufacturing systems are disclosed. Disclosed examples provide an efficient, low mass, and low cost solution to advantageously level an example hoist. The disclosed hoist is configured to carry a load and can be used during a production run of a manufacturing system such as an automotive manufacturing system. For example, the hoist can lift a first vehicle module (e.g., a front suspension module) off of a first handling unit (e.g., a prep conveyor dolly) and lower the first vehicle module onto a second handling unit (e.g., an engine lifter dolly). Some disclosed examples provide an example adjustable load leveler mechanism that includes a frame (e.g., a counter weight carriage), a primary weight (e.g., a movable counterweight), and at least one actuator (e.g., a linear actuator such as a servo-drive linear actuator) operatively coupled to the primary weight. The adjustable load leveler mechanism, which is sometimes referred to as a smart hoist leveler, is attached (e.g., removably attached) to and/or supported by the hoist. For example, the frame is positioned on the hoist or a body of the hoist. In particular, the primary weight is movable relative to the hoist along a length of the frame, and the actuator is configured to generate an output (e.g., a torque and/or force) and apply the output to the primary weight to move the primary weight. Movement of the primary weight relative to the hoist shifts or changes a center of gravity (COG) associated with the hoist and, thus, shifts or changes a levelness of the hoist (e.g., when the hoist is loaded or unloaded). More particularly, the disclosed load leveler mechanism does not change or shift a center line of the first vehicle module or a center line of a set point of the hoist while positional adjustments of the primary weight are carried out, which will be discussed in greater detail below.

The disclosed hoist and load leveler mechanism, together, can be provided as an integral device. On the other hand, in some examples, the disclosed load leveler mechanism can be provided as a standalone clamp-on unit. In such examples, the load leveler mechanism is produced separately from the hoist and then installed on the hoist, for example, via one or more fasteners and/or one or more fastening methods or techniques. In such examples, the disclosed load leveler mechanism is a self-contained package that can be retrofitted on a wide-range of existing hoists, for example, by bolting one or more parts of the frame onto end effectors of a hoist. Further, in some such examples, the load leveler mechanism can be easily removed from any hoist on which the load leveler mechanism is installed. In particular, the disclosed load leveler mechanism can be made much more compact compared to the above-mentioned known load levelers, because the frame has to carry only the mass of the primary weight. That is, when the hoist is carrying the first vehicle module, the load leveler mechanism or the frame thereof does not support a load associated with the first vehicle module. In other words, only the disclosed hoist supports the load when the hoist is carrying the first vehicle module (or any other object of interest). In any case, the disclosed load leveler mechanism can be provided with an example safety structure (e.g., a cover extending over the primary weight) preventing user access to one or more (e.g., all) moving components of the load leveler mechanism such as the primary weight and/or the actuator, which improves safety.

In some examples, the disclosed load leveler mechanism can be advantageously used with hoist assembly systems, such as automobile door ON/OFF hoists, and/or in connection with transaxle to transfer case docking processes, where a certain preset angle may be necessary to assemble the load leveler mechanism with such a hoist.

Additionally, some disclosed examples provide example control circuitry (e.g., a programmable logic controller (PLC)) connected to the actuator and an example input device (e.g., one or more operation boxes) connected to the control circuitry, which allow one or more users (e.g., plant personnel) to easily operate the load leveler mechanism in connection with leveling the hoist. The disclosed input device is configured to generate input data (e.g., one or more user inputs associated with operating the load leveler mechanism) in response to a user interacting with the input device. In particular, the disclosed control circuitry is configured to move, via the actuator, the primary weight relative to the hoist based on the input data to adjust the levelness of the hoist, as will be discussed in greater detail below. That is, the control circuitry is configured to process the input data obtained from the input device to determine when and/or how to direct the actuator. For example, the control circuitry can move, via the actuator, the primary weight away from an initial position of the primary weight toward or to a target position (e.g., a predefined position stored in a database of the control circuitry) of the primary weight that is associated with providing levelness to the hoist. Additionally, in some examples, the disclosed control circuitry is configured to provide different operating modes of the load leveler mechanism and/or change the load leveler mechanism between the operating modes based on the input data. For example, the load leveler mechanism can have a first operating mode associated with automatic or feedback leveling functionality, a second operating mode associated with vehicle model selection functionality, and a third operating mode associated with manual leveling functionality, each of which will be discussed in greater detail below.

Generally speaking, a user or person can interact with the input device to operate the load leveler mechanism in a manner that results in the hoist transitioning from a tilted state to a level state. In some examples, to aid the user(s) in operating the load leveler mechanism, the control circuitry can be configured to present, via an output device, one or more production instructions to the user(s). Such a production instruction can notify the user(s) regarding how to interact with the input device and/or when to interact with the input device during a production run of the manufacturing system. In such examples, a production instruction can indicate to the user(s) a particular vehicle model (e.g., a next model to be produced), one or more components of which are ready to be carried by the hoist. Additionally or alternatively, a production instruction can indicate a certain switch mechanism (e.g., a push-button switch) of the input device that, when pressed or pushed, causes the load leveler mechanism to substantially level the hoist (e.g., when the hoist is carrying the component(s) of the particular vehicle model). For example, the switch mechanism can generate a user input indicative of (a) enabling or activating the automatic leveling functionality and/or (b) a predefined position of the primary weight relative to the hoist 102 associated with providing levelness to the hoist for the first vehicle module.

In particular, different objects of interest may be introduced to the manufacturing system and carried by the hoist, which can be communicated to the user(s) via the production instruction(s). In some examples, after the first vehicle module is disconnected from the hoist, the hoist may lift a subsequent or second vehicle module (e.g., a front suspension module) having a different weight distribution compared to the first vehicle module, which can cause the hoist to tilt. For example, the first vehicle module may correspond to a first vehicle model, and the second vehicle module may correspond to a second vehicle model different from the first vehicle model. In such examples, the users can interact with the input device in accordance with the production instruction(s), thereby enabling the load leveler mechanism to provide levelness to the hoist when the hoist is carrying the second vehicle module. More particularly, the disclosed load leveler mechanism does not change or shift a center line of the second vehicle module or the center line of the set point of the hoist while positional adjustments of the primary weight are carried out. Thus, the disclosed load leveler mechanism, when attached to the hoist, ensures center lines between a vehicle module carried by the hoist and the second handling unit are aligned for all vehicle models when the hoist sets down the vehicle module, which would have otherwise been unattainable using the above-mentioned known hoists and/or load levelers.

In some examples, to facilitate providing the operating mode(s), the load leveler mechanism includes one or more sensors. For example, one or more tilt sensors (e.g., inclinometers) can be positioned on the hoist and connected to the control circuitry. In such examples, the control circuitry is configured to detect an observed parameter (e.g., a tilt angle) of the hoist via the tilt sensor(s), for example, when the hoist is carrying a load. Additionally, the control circuitry is also configured to detect an observed parameter (e.g., a motor position) of the actuator, for example, via a position sensor operatively coupled to the actuator. The control circuitry can then process the observed parameter(s) using one or more example algorithms to calculate adjustments for the actuator associated with advantageously moving the primary weight. In such examples, the algorithm(s) enable control circuitry to determine, based on the observed parameter(s), a direction of travel and a travel distance of the primary weight that are associated with achieving a desired levelness of the hoist. Then, the disclosed control circuitry executes or carries out the adjustment(s). In particular, the control circuitry is configured to adjust one or more operating parameters of the actuator based on the calculated adjustment(s), thereby effectively controlling a position of the primary weight relative to the hoist. For example, the disclosed controller can adjust electrical power that is provided to the actuator in accordance with a calculated adjustment to adjust the output of the actuator.

Additionally, in some examples, the control circuitry includes a feedback controller (e.g., a proportional-integral-derivative (PID) controller, etc.) forming a feedback control loop with the actuator and the tilt sensor(s). In such examples, the disclosed control circuitry, when processing sensor data (e.g., raw and/or processed sensor), employs one or more control strategies corresponding to any of (a) proportional feedback control, (b) integral feedback control, (c) derivative feedback control, (d) or a combination thereof. In such examples, the disclosed sensor(s) continuously or repeatedly obtain sensor data indicative of the observed parameters. Further, in such examples, the disclosed control circuitry is configured to generate, based on the sensor data, feedback control signals or commands to rapidly control the actuator or a particular control component (e.g., an electric motor or motor circuitry) thereof. In particular, the actuator can generate the output based on the feedback commands to provide rapid control, compensation, and/or correction with respect to reducing a calculated error value, which enables the adjustable load leveler mechanism to quickly achieve a target levelness of the hoist and substantially maintain the target levelness. The calculated error value is determined by the control circuitry and includes, for example, differences between the observed parameter(s) and one or more target parameters (e.g., a target tilt angle of the hoist). Further, the control circuitry can update (e.g., continuously or repeatedly) the feedback commands to enable the actuator to adjust or change the position of the primary weight based on changes of, for example, an observed or calculated tilt angle (e.g., an instantaneous tilt angle) of the hoist. In such examples, the control circuitry may process subsequent sensor data received from the sensor(s) to determine whether and/or how to update the feedback commands. In particular, a time varying strength of the actuator output is facilitated by the control circuitry and based on the subsequent sensor data. As a result of employing such feedback control strategies, a relatively small tilt angle of the hoist (e.g., +/−5 degrees, +/−2 degrees, +/−0.5 degrees, etc.), which is defined by the hoist and a horizontal axis, can be maintained while an example leveling process is performed on the hoist.

Further, in some examples, the control circuitry is configured to detect, via one or more low precision inclinometers, a coarse tilt angle of the hoist, which facilitates rapid positional adjustments of the primary weight during execution of a feedback application (e.g., installed on a processor of the control circuitry). In such examples, the control circuitry directs the actuator to move, at a relatively high speed, the primary weight relative to the hoist based on the coarse tilt angle. Additionally or alternatively, in some examples, the control circuitry is configured to detect, via one or more high precision inclinometers, a fine tilt angle of the hoist, which facilitates precise and/or accurate positional adjustments of the primary weight during execution of the feedback application. The fine tilt angle is relatively precise or accurate compared to the coarse tilt angle. In such examples, the control circuitry directs the actuator to the move, at a relatively low speed, the primary weight relative to the hoist based on the fine tilt angle. Accordingly, the disclosed actuator can be configured to have at least two different operating modes: (a) a high speed mode associated with providing low precision positional adjustments of the primary weight and (b) a low speed mode associated with providing high precision positional adjustments of the primary weight. In particular, the control circuitry can alternate between using the coarse tilt angle and the fine tilt angle to direct the actuator, for example, in response to detecting that the coarse tilt angle is at or below a threshold tilt angle. That is, the control circuitry can change the actuator between the two different operating modes while the leveling process is performed on the hoist, which will be discussed in greater detail below. By utilizing low and high precision inclinometers together in in this manner to operate the actuator, the disclosed control circuitry substantially reduces time taken for the leveler mechanism to level the hoist while ensuring sufficient leveling accuracy is achieved, which improves manufacturing productivity.

Further still, in some examples, the disclosed load leveler mechanism can include one or more force sensors (e.g., one or more load cells, etc.) configured to generate sensor data indicative of a load carried by the hoist. The disclosed control circuitry can monitor the load to detect sudden changes therein, which can serve as a trigger for the control circuitry to enable the automatic leveling functionality. In such examples, in response to detecting that the hoist released the load, the control circuitry can automatically control the actuator to advantageously move the primary weight relative to the hoist (e.g., from the initial position to the target position), thereby changing the hoist from the tilted state to level state.

FIG. 1 illustrates a schematic diagram of an example manufacturing system (e.g., an automotive manufacturing system) 100 in which examples disclosed herein can be implemented. According to the illustrated example of FIG. 1, the manufacturing system 100 includes a hoist (e.g., a front suspension pick hoist) 102 and an example adjustable load leveler mechanism 104 for providing levelness to the hoist 102. The adjustable load leveler mechanism 104 includes a frame (e.g., a counterweight carriage) 106 supporting and/or carrying one or more (e.g., all) components of the adjustable load leveler mechanism 104. The frame 106 is represented by the dotted/dashed lines of FIG. 1. Further, in the example of FIG. 1, the adjustable load leveler mechanism 104 also includes an example primary weight (e.g., a movable counterweight) 108, an example auxiliary weight (e.g., a fixed counterweight) 110, and an example actuator 112. The actuator 112 of FIG. 1 is operatively coupled to the primary weight 108. In particular, the actuator 112 of FIG. 1 is configured to interact with the primary weight 108 to adjust a relative position of the primary weight 108, thereby adjusting a levelness of the hoist 102, as will be discussed in greater detail below in connection with FIGS. 2-17. The relative position of the primary weight 108 includes a position of the primary weight 108 relative to (a) the hoist 102 and/or (b) the adjustable load leveler mechanism 104 or the frame 106 thereof. Additionally, in some examples, each of the adjustable load leveler mechanism 104 and/or, more generally, the manufacturing system 100 also includes example control circuitry 114, which facilities operating the actuator 112 in accordance with input data to advantageously control the relative position of the primary weight 108.

In the example of FIG. 1, the hoist 102 is configured to carry an object of interest (e.g., the object 226 shown in FIGS. 2-4), for example, from a first location in a manufacturing plant to a second location in the manufacturing plant different from the first location. For example, the hoist 102 of FIG. 1 can be operated by one or more users (e.g., plant personnel) to pick up, lift, lower, and/or otherwise move the object of interest, for example, during a manufacturing process associated with the manufacturing system 100. The hoist 102 of FIG. 1 can be implemented, for example, using any of a chain hoist, a wire rope hoist, etc. any other suitable hoist(s) useable with a manufacturing system, or a combination thereof.

In the example of FIG. 1, the adjustable load leveler mechanism 104 of FIG. 1, which is sometimes referred to more generally as a load leveler mechanism or unit, is attached (e.g., removably attached) to the hoist 102. In some examples, the load leveler mechanism 104 of FIG. 1 is produced separately from the hoist 102 and operatively coupled to the hoist 102. In particular, the frame 106 of the load leveler mechanism 104 is coupled (e.g., removably coupled) to the hoist 102. In some examples, the frame 106 can be configured to couple to the hoist 102 and decouple from the hoist 102, for example, via one or example fasteners (e.g., any of bolts, screws, etc.) and/or one or more fastening methods or techniques. The frame 106 of FIG. 1 facilitates supporting one or more (e.g., all) of the component(s) of the adjustable load leveler mechanism 104 as well as connecting the component(s) to the hoist 102.

In example of FIG. 1, the primary weight 108 facilitates maintaining a primary levelness of the hoist 102 relative to a certain axis. In particular, the primary weight 108 of FIG. 1 is movably coupled to the frame 106, for example, via the actuator 112. For example, the primary weight 108 is movable relative to the hoist 102 along a length of the frame 106. As will be discussed in greater detail below in connection with FIGS. 2-4, relative movement of the primary weight 108 causes a COG of the load leveler mechanism 104 to shift or change and, as a result, causes a COG of the hoist 102 to shift or change. The primary weight 108 can be implemented, for example, using one or more plates, one or more discs, etc., any other suitably-shaped solid bodies, or a combination thereof. Further, the primary weight 108 of FIG. 1 can be constructed of one or more materials having suitable mechanical properties (e.g., any one or more of a relatively high density, a relatively high strength and/or rigidity, etc.) such as, for example, one or more metals, one or more composites, etc., any other suitable material(s), or a combination thereof. In some examples, a mass of the primary weight 108 can be adjusted (e.g., incrementally) by the user(s), which is discussed in greater detail below.

In the example of FIG. 1, the auxiliary weight 110 facilitates maintaining an auxiliary levelness of the hoist 102 relative to a certain axis, different from the primary levelness. In particular, the auxiliary weight 110 of FIG. 1 is non-movably or fixedly coupled to the frame 106, for example, via one or more fasteners and/or one or more fastening methods or techniques. The auxiliary weight 110 can be implemented, for example, the using one or more plates, one or more discs, etc. any other suitably-shaped solid body, or a combination thereof. Further, the auxiliary weight 110 of FIG. 1 can be constructed of one or more materials having suitable mechanical properties such as, for example, one or more metals, one or more composites, etc., any other suitable material(s), or a combination thereof. In some examples, a mass of the auxiliary weight 110 can be adjusted (e.g., incrementally) by the user(s), similar to the primary weight 108.

In the example of FIG. 1, the actuator 112 facilitates providing positional adjustments of the primary weight 108. The actuator 112 of FIG. 1 can be implemented, for example, using one or more linear actuators (e.g., a servo-drive linear actuator). In some examples, the actuator 112 includes one or more ball screw actuators, example hardware components of which are described further below.

Additionally, to facilitate providing actuator functionality, the actuator 112 of FIG. 1 can include one or more electric motors (e.g., a servo motor), one or more actuator sensors, control circuitry including a processor, an encoder, etc., and/or any other suitable electrical device suitable for use with an actuator. Accordingly, the actuator 112 of FIG. 1 can include a single device or multiple devices that function cooperatively. Further, the actuator 112 is connected to the control circuitry 114. For example, the actuator 112 of FIG. 1 is communicatively couple to the control circuitry 114 to receive one or more advantageous control signals or commands and/or electrical power from the control circuitry 114. In some examples, the actuator 112 is configured to generate an output (e.g., a force and/or a torque) based on the control signal(s) or command(s) and/or electrical power provided by the control circuitry 114, which is sometimes referred to as an actuator output. Further, in such examples, the actuator 112 is configured to apply and/or provide the output to the primary weight 108, thereby moving the primary weight 108 relative to the hoist 102.

Additionally, in some examples, the manufacturing system 100 of FIG. 1 also includes an example input device 116, which facilitates interactions and/or communications between the user(s) and the load leveler mechanism 104 or the control circuitry 114. The input device 116 of FIG. 1 can be implemented, for example, using one or more operation boxes, one or more of switch mechanisms (e.g., push-button switches), one or more levers, one or more touch responsive screens, one or more mouses, one or more keyboards, etc., any other suitable device(s) capable of communicating user input(s) to the control circuitry 114, or a combination thereof. Accordingly, the input device 116 of FIG. 1 can include a single device or multiple devices. According to the illustrated example of FIG. 1, the input device 116 is connected to the control circuitry 114. In particular, the input device 116 is configured to generate input data (e.g., one or more user inputs or requests to operate the load leveler mechanism 104) in response to the user(s) interacting with the input device 116. For example, the user(s) can provide one or more input selections to the input device 116 (e.g., via pushing or pressing a switch mechanism 707, 708, 710, 711, 714, 716, 718, 720 shown in FIG. 7), which causes the input device 116 to generate the input data. Further, in response such user interaction, the input device 116 is configured to transmit the input data to the control circuitry 114 for processing by the control circuitry 114. Accordingly, the control circuitry 114 of FIG. 1 can detect when a user is interacting with the input device 116 and receive the input data from the input device 116.

Additionally, in some examples, the manufacturing system 100 of FIG. 1 also includes an example output device (e.g., a display device) 118, which facilitates communicating (e.g., visually and/or audibly) certain information to a person within relatively close proximity to the output device 118. The output device 118 can be implemented, for example, using one or more display devices or screens (e.g., including a touch responsive screen), one or more light-emitting diodes (LEDs), one or more speakers, etc., any other suitable output device(s), or a combination thereof. That is, the output device 118 of FIG. 1 can be a single device or multiple devices. According to the illustrated example of FIG. 1, the output device 118 is connected to the control circuitry 114. In particular, the output device 118 is configured to present information (e.g., visual information and/or audible information) to the user(s) by generating, for example, text, one or more images, a video, one or more sounds, natural language speech, etc.

In some examples, the control circuitry 114 controls the output device 118 to present one or more production instructions associated with the manufacturing system 100 to the user(s). As will be discussed further below, such a production instruction aids the user(s) in operating the load leveler mechanism 104, for example, by notifying the user(s) regarding how to interact with the input device 116 and/or when to interact with the input device 116. In some examples, the production instruction can indicate to the user(s) a particular vehicle model, one or more components of which are ready to be carried by the hoist 102 during a production run of the manufacturing system 100. Additionally or alternatively, the production instruction can also indicate a certain switch mechanism of the input device 116 to the user(s) that, when pressed or pushed, causes the load leveler mechanism 104 to substantially level the hoist 102 (e.g., when the hoist 102 carrying the component(s) the particular vehicle model).

Additionally, in some examples, each of the load leveler mechanism 104 and/or, more generally, the manufacturing system 100 also includes one or more sensors 120. The sensor(s) 120 of FIG. 1 enable the control circuitry 114 to detect one or more observable parameters of the hoist 102 and/or one or more observable parameters of the adjustable load leveler mechanism 104. Such parameters include, but are not limited to, (a) a relative angle or degree of tilt of the hoist 102, (b) an angular velocity of the hoist 102, (c) an angular acceleration of the hoist 102, (d) a load carried by the hoist 102, (e) a relative angle or degree of tilt of the load leveler mechanism 104, (f) an angular velocity of the load leveler mechanism 104, (g) an angular acceleration of the load leveler mechanism 104, (h) a position (e.g., a motor position) of the actuator 112, (i) the output (e.g., force and/or torque) of the actuator 112, (j) the relative position of the primary weight 108, (k) a speed or velocity of the primary weight 108, (l) an acceleration of the primary weight 108, (m) etc., (n) any other observable or measurable parameter(s), or (o) a combination thereof. The sensor(s) 120 FIG. 1 can be implemented, for example, using one or more tilt sensors, one or more accelerometers, one or more gyroscopes, one or more position or angle sensors, one or more proximity sensors, one or more voltage sensors, one or more current sensors, etc., any other suitable sensor(s), or a combination thereof. The sensor(s) 120 of FIG. 1 are connected to the control circuitry 114 and can be arranged on, for example, the hoist 102 and/or the load leveler mechanism 104. In particular, the sensor(s) 120 are configured to generate sensor data (e.g., see the sensor data 920, 922, 924 of FIG. 9) such as, for example, raw sensor data and/or processed sensor data. Further, the sensor(s) 120 are configured to provide the sensor data to the control circuitry 114 for processing. In some examples, the sensor(s) 120 generate raw sensor data that indicates to the control circuitry 114 one or more (e.g., all) of the above described parameter(s) of the hoist 102 and/or one or more (e.g., all) of the above described parameter(s) of the adjustable load leveler mechanism 104. The sensor(s) 120 of FIG. 1 can obtain such raw sensor data continuously and/or repeatedly (e.g., periodically or a-periodically) during operation of the adjustable load leveler mechanism 104. Further, in some examples, the sensor(s) 120 can be configured to detect any such parameter and provide related processed sensor data corresponding to the detection(s) to the control circuitry 114. In any case, the control circuitry 114 of FIG. 1 can detect, via the sensor(s) 120, one or more (e.g., all) of the parameters (a)-(o) described above.

Additionally, the control circuitry 114 of FIG. 1 can be configured to measure and/or monitor one or more other positional parameters of the hoist 102. In some examples, the control circuitry 114 can determine a relative height position of the hoist 102 and/or displacement along a z-axis, for example, via encoder readings received from a hoist drive unit or one or more external height measurement sensors.

In some examples, the sensor(s) 120 include at least a primary tilt sensor (e.g., a high precision tilt sensor) 122 configured to generate (e.g., continuously or repeatedly) sensor data indicative of a fine tilt angle of the hoist 102. In such examples, the fine tilt angle includes, for example, an observed tilt angle of the hoist 102 that is substantially precise or accurate. Additionally or alternatively, in some examples, the sensor(s) 120 include at least an auxiliary tilt sensor (e.g., a low precision tilt sensor) 124 configured to generate (e.g., continuously or repeatedly and/or timer based) sensor data indicative of a coarse tilt angle of the hoist 102. In such examples, the coarse tilt angle includes an observed tilt angle of the hoist 102 that is substantially inaccurate. In particular, the coarse tilt angle of the hoist 102, which is substantially inaccurate compared to the fine tilt angle, enables the control circuitry 114 to direct the actuator 112 to coarsely adjust, at a first speed (e.g., a substantially high speed), the position of the primary weight 108 relative to the hoist 102. On the other hand, the fine tilt angle of the hoist 102, which is substantially accurate compared to the coarse tilt angle, enables the control circuitry 114 to direct the actuator 112 to finely adjust, at a second speed (e.g., a substantially low speed), the position of the primary weight 108 relative to the hoist 102. Accordingly, in some examples, the actuator 112 of FIG. 1 is configured to have a first actuator operating mode associated with a first operating characteristic of the actuator 112 and a second actuator operating mode associated with a second operating characteristic of the actuator 112 different from the first operating characteristic. For example, the first actuator operating mode can be a high speed mode in which the actuator 112 is controlled based on the coarse tilt angle. Additionally or alternatively, the second actuator operating mode can be a low speed mode in which the actuator 112 is controlled based on the fine tilt angle.

As previously described, the control circuitry 114 can direct the actuator 112 to move the primary weight 108 relative to the hoist 102 at the first speed or the second speed. The first speed at which the primary weight 108 is moved can be substantially higher than the second speed at which the primary weight 108 is moved, which reduces time taken to substantially level the hoist 102 while ensuring sufficient leveling accuracy is achieved. In some examples, the control circuitry 114 is configured to alternate between using the coarse tilt angle and the fine tilt angle to control the actuator 112, which is discussed further below in connection with FIG. 14. That is, the control circuitry 114 can change the actuator 112 between the first actuator operating mode and the second actuator operating mode, for example, in response to detecting that the coarse tilt angle is at or below a threshold coarse tilt angle. In particular, as a result of the control circuitry 114 using the primary and auxiliary tilt sensors 122, 124 together in connection with operating the actuator 112, no compromise is made between leveling speed and leveling accuracy of the load leveler mechanism 104. In such examples, the auxiliary tilt sensor 124 can have an operational tolerance that is substantially greater than an operational tolerance of the auxiliary tilt sensor 124. The auxiliary tilt sensor 124 of FIG. 1 is sometimes referred to as a first tilt sensor, and the primary tilt sensor 122 of FIG. 1 is sometimes referred to as a second tilt sensor.

The primary tilt sensor 122 and/or the auxiliary tilt sensor 124 can be implemented, for example, using one or more inclinometers. In some examples, the primary tilt sensor 122 includes a relatively high precision inclinometer, and the auxiliary tilt sensor 124 includes a relatively low precision inclinometer. Additionally or alternatively, in some examples, the primary tilt sensor 122 and/or the auxiliary tilt sensor 124 include(s) one or more force balance tilt sensors, one or more solid-state tilt sensors, one or more fluid-filled tilt sensors, etc., any other suitable tilt sensor(s), or a combination thereof.

Additionally, in some examples, the sensor(s) 120 include at least a force sensor 126 configured to generate sensor data indicative of a load carried by the hoist 102 and/or, more generally, a load associated with the hoist 102. The force sensor 126 can be implemented, for example, using one or more load cells (e.g., any of tension load cells, compression load cells, bending load cells, etc.), one or more strain gauges, etc., any other suitable force sensing device(s), or a combination thereof.

The control circuitry 114 of FIG. 1 can be implemented, for example, using one or more microcontrollers, one or more programmable logic controllers (PLCs), etc., any other suitable computing device(s), or a combination thereof. According to the illustrated example of FIG. 1, the control circuitry 114 is operatively coupled and/or connected to any one or more (e.g., all) of the actuator 112, the input device 116, the output device 118, the sensor(s) 120, 122, 124, 126, and/or, more generally, the adjustable load leveler mechanism 104. The control circuitry 114 of FIG. 1 can be configured to initiate and/or perform an example leveling process of the adjustable load leveler mechanism 102 in which the relative position of the primary weight 108 is particularly adjusted to provide levelness to the hoist 102 (e.g., when the hoist 102 is substantially tilted). The leveling process is performed on the hoist 102 and can include, for example, one of a fully automatic leveling process, a semi-automatic leveling process, or a manual leveling process. In particular, during the leveling process, the control circuitry 114 directs the actuator 112 to control (e.g., increase, decrease, or maintain) the output of the actuator 112, thereby controlling relative movement of the primary weight 108. To determine when and/or how to direct the actuator 112 during the leveling process, the control circuitry 114 of FIG. 1 processes (a) the input data obtained from the input device 116 and/or (b) the sensor data obtained from the sensor(s) 120, 122, 124, 126. As such, in some examples, the control circuitry 114 of FIG. 1 is configured to move, via the actuator 112, the primary weight 108 relative to the hoist 102 based on the input data and/or the sensor data to adjust a levelness of the hoist 102. In such examples, the control circuitry 114 can be configured to receive a user input from the input device 116 and control, based on the user input, the actuator 112 to move the primary weight 108 relative to the hoist 102, for example, from an initial position of the primary weight 108 to a target position of the primary weight 108. The control circuitry 114 of FIG. 1 can also be configured to control the output device 118 (e.g., prior to initiating the leveling process), for example, to notify the user(s) regarding (a) how to interact with the input device 116 to initiate the leveling process and/or (b) when to initiate the leveling process.

In some examples, the control circuitry 114 of FIG. 1 can interact with the sensor(s) 120, 122, 124, 126 to determine whether the hoist 102 is substantially level, for example, based on live data and/or time based measurements. Conversely, the control circuitry 114 of FIG. 1 can also interact with the sensor(s) 120, 122, 124, 126 to determine whether the hoist 102 is substantially tilted, which can serve as a trigger for initiating the automatic leveling process. Additionally or alternatively, in some examples, the control circuitry 114 can interact with the sensor(s) 120, 122, 124, 126 to detect when the hoist 102 releases a load, which can serve as the trigger for initiating the fully automatic leveling process.

The load leveler mechanism 104 of FIG. 1 can have different operating modes associated with different operating characteristics of the load leveler mechanism 104. For example, the load leveler mechanism 104 can have one or more (e.g., all) of (a) a first operating mode (e.g., an automatic leveling mode) in which the load leveler mechanism 104 performs the fully automatic leveling process, (b) a second operating mode (e.g., a model select leveling mode) in which the load leveler mechanism 104 performs the semi-automatic leveling process, and/or (c) a third operating mode (e.g., a manual leveling mode) in which the load leveler mechanism 104 performs the manual leveling process. In such examples, the control circuitry 114 is configured to change the load leveler mechanism 104 between the different operating modes thereof, for example, in response to receiving a user input from the input device 116 that is indicative of changing or switching the operating mode of the load leveler mechanism 104.

Further, the control circuitry 114 of FIG. 1 has a primary processor 128 to facilitate providing automatic functions and/or controls of the adjustable load leveler mechanism 104. In some examples, the primary processor 128 includes a feedback application 130 (e.g., installed on the primary processor 128), which provides instantaneous or near instantaneous control of the actuator 112 based on the above-described sensor data provided by the sensor(s) 120, 122, 124, 126. The primary processor 128 can execute the feedback application 130, for example, during the fully automatic leveling process of the load leveler mechanism 104 and/or when the load leveler mechanism 104 is in the first operating mode. In some examples, the primary processor 128 of FIG. 1 is configured to execute the feedback application 130 to transmit (e.g., repeatedly or continuously) feedback control signals or commands to the actuator 112. In such examples, the actuator 112 of the adjustable load leveler mechanism 104 can generate the actuator output in response to receiving the feedback commands. In particular, during the fully automatic leveling process, a magnitude or strength of the actuator output can be controlled by the control circuitry 114 via the feedback commands and, consequently, the relative movement of the primary weight 108 can be controlled by the control circuitry 114 via the feedback commands.

Additionally, in some examples, the manufacturing system 100 also includes an example power source 132, which facilitates powering one or more (e.g., all) of the actuator 112, the control circuitry 114, the sensor(s) 120, 122, 124, 126, and/or any other electrical components or circuitry associated with the adjustable load leveler mechanism 104. The power source 132 of FIG. 1 can be implemented, for example, using one or more dedicated power circuits, one or more generators, one or more batteries, etc. any other suitable power source(s), or a combination thereof. That is, the power source 132 can include a single device or multiple devices. The power source 132 is electrically coupled to the actuator 112 and/or the control circuitry 114, for example, via one or more wires extending from the power source 132 to the actuator 112 and/or to the control circuitry 114. In particular, the power source 132 is configured to supply or provide electrical power to the actuator 112 and/or the control circuitry 114 during operation of the adjustable load leveler mechanism 104. Additionally or alternatively, the power source 132 of FIG. 1 can be configured to similarly provide the electrical power to one or more other components and/or devices of the manufacturing system 100 such as, for example, one or more motors associated with the hoist.

Additionally, in some examples, the manufacturing system 100 includes an example network 134 that may be external to the control circuitry 114, which facilitates operation of the hoist 102 and/or the adjustable load leveler mechanism 104. The network 134 of FIG. 1 can be implemented, for example, using one or more local area networks (LANs), one or more wide area networks (WANs), the Internet, etc. and/or any other suitable process control system (PCS) network(s). That is, the network 134 of FIG. 1 can include a single network or multiple networks. In such examples, the control circuitry 114 is communicatively coupled to the network 134 to receive data from the network 134 and/or provide data to the network 134. For example, the control circuitry 114 can receive the production instruction(s) from the network 134 and then proceed to inform or notify, via the output device 118, the user(s) of the production instruction(s). In another example, the control circuitry 114 can receive additional instructions and/or control signals or commands from the network 134 that may be associated with controlling the load leveler mechanism 104. Further, in some examples (e.g., where the manufacturing system 100 does not include the network 134), the control circuitry 114 may be suitably implemented using one or more PLCs. In such examples, one or more example programs are installed on the primary processor 128, which enable the control circuitry 114 to operate the hoist 102 and/or the adjustable load leveler mechanism 104 independent of such a network.

FIG. 2 illustrates a schematic diagram of the load leveler mechanism 104 of FIG. 1 and shows a first implementation 200 thereof in accordance with the teachings of this disclosure. In the example of FIG. 2, the hoist 102 is not carrying a load, and the hoist 102 is in a first state (e.g., a level state) thereof. Further, the primary weight 108 of FIG. 2 is in an initial or first position (e.g., a center position) 201 thereof relative to the hoist 102. As a result, the hoist 102 of FIG. 2 is substantially level. That is, the hoist 102 of FIG. 2 is not substantially tilting. According to the illustrated example of FIG. 2, the primary weight 108 is movable relative to the frame 106 and the hoist 102, for example, in a first direction (e.g., a horizontal direction) 202 and/or a second direction 204 opposite to the first direction 202. Each of the first and second directions 202, 204 of FIG. 2 is sometimes referred to as a direction of travel and/or a travel direction of the primary weight 108. The first and second directions 202, 204 of FIG. 2 can be defined by an orientation of the hoist 102 such that, when the hoist 102 tilts, the first and second directions 202, 204 shift or change (e.g., see FIG. 2). In some examples, the primary weight 108 of FIG. 2 can travel along a path 206 (e.g., provided by the actuator 112) between a first end 208 of the path 206 and a second end 210 of the path 206 opposite to the first end 208. As the primary weight 108 travels along the path 206, the primary weight 108 moves relative to the hoist 102 and/or relative to the frame 106. In particular, such relative movement of the primary weight 108 of FIG. 2 in the first or second direction 202, 204 (i.e., away from the first position 201) changes or shifts a COG 212 associated with the hoist 102 and, as a result, advantageously adjusts a levelness of the hoist 102. Such relative movement of the primary weight 108 of FIG. 2 away from the first position 201 also changes or shifts a center of gravity associated with the load leveler mechanism 104.

In the example of FIG. 2, to provide support to the hoist 102, the manufacturing system 100 also includes an example support structure (e.g., a girder) 214. As such, the hoist 102 of FIG. 2 is supported by the support structure 214. In some examples, the manufacturing system 100 also includes one or more example links (e.g., chains, ropes, slings, etc.) 216, which facilitate connecting the hoist 102 to the support structure 214 and/or to one or more objects that require lifting. As shown in FIG. 2, a first one of the link(s) 216 is connecting the hoist 102 to the support structure 214 and extends from the hoist 102 to the support structure 214. Further, at least some (e.g., two or more) of the link(s) 216 are connected to an example body 218 (sometimes referred to as a hoist body) of the hoist 102. As shown in FIG. 2, a second one of the link(s) 216 is connected to a first end 220 of the hoist body 218, and a third one of the link(s) 216 is connected to a second end 222 of the hoist body 218 opposite to the first end 220.

Additionally, in some examples, the manufacturing system 100 of FIG. 2 also includes a first example handling unit 224, which facilitates providing an example object of interest 226 to the hoist 102. The first handling unit 224 of FIG. 2 can be implemented using a dolly such as, for example, a prep conveyor dolly and/or any other suitable dolly or handling unit usable with a manufacturing system. Additionally or alternatively, in some examples, the first handling unit 224 of FIG. 2 can be implemented using a conveyor such as, for example, a chain conveyor, a floor slat conveyor, a towline conveyor, a roller conveyor, etc., and/or any other suitable conveyor associated with manufacturing. Accordingly, in some examples, the first handling unit 224 of FIG. 2 can be configured to move (e.g., via one or more conveyor motors) the object of interest 226, for example, toward the hoist 102. As shown in FIG. 2, the object of interest 226 is positioned on the first handling unit 224 such that the first handling unit 224 supports the object of interest 226. The object of interest 226 of FIG. 2 can include, for example, one or more vehicle components (e.g., assembled together) such as a vehicle module (e.g., a front suspension module) or subassembly. Of course, the object of interest 226 of FIG. 2 can include any other suitable item(s) and/or object(s) that may require moving during a production run.

When using the hoist 102 (e.g., during a single production run or multiple production runs), different objects of interest 226 can be provided to the hoist 102. For example, a first object of interest provided to the hoist 102 can include a first vehicle module (e.g., a front suspension module) associated with a first vehicle model. Continuing with this example, a second object of interest provided to the hoist 102 can include a second vehicle module (e.g., a front suspension module) associated with a second vehicle model different from the first vehicle model. In particular, the first vehicle module can have a weight distribution that is different relative to a weight distribution of the second vehicle module, which can cause substantial tilting of the hoist 102 that may be undesirable. In some examples, the control circuitry 114 of FIG. 1 can determine and/or account for a difference between the weight distributions of the respective first and second vehicle modules.

According to the illustrated example of FIG. 2, the hoist 102 is configured to carry the object of the interest 226. For example, the user(s) can connect the object of interest 226 to the hoist 102 via the link(s) 216. When connected together, the hoist 102 is configured to lift the object of interest 226 off the first handling unit 224. For example, the hoist 102 can be operated to move the object of interest 226 away from the first handling unit 224 in a third direction (e.g., a vertical direction) 228. As will be discussed further below, the object of interest 226, when carried by the hoist 102, may cause the hoist 102 to tilt, which is undesirable in certain manufacturing applications. For example, the hoist body 218 can pivot relative to an attachment point 230 of the hoist 102 in a first tilt direction (e.g., counterclockwise) 232 and/or a second tilt direction (e.g., clockwise) 234 opposite to the first tilt direction 232. The attachment point 230 of FIG. 2 is sometimes referred to as a set point of the hoist 102. A degree of the tilt of the hoist 102 is based on, for example, a weight distribution associated with the object of interest 226 and/or a weight distribution associated with the hoist 102.

The hoist 102 of FIG. 2 includes the body 218 to which the adjustable load leveler mechanism 104 or the frame 106 is coupled. The body 218 of FIG. 2 can be implemented, for example, using one or more rails, one or more beams, one or more brackets, etc., any other suitably-shaped solid body, or a combination thereof. Additionally, the hoist 102 of FIG. 2 also includes an example adapter 235 such as, for example, a hook. In some examples, the adapter 235 of FIG. 2 defines the set point 230 of the hoist 102 and is configured to receive at least one of the link(s) 216 at the set point 230. Further, the adapter 235 of FIG. 2 is positioned (e.g., centrally positioned) on the hoist body 218 and fixedly coupled to the hoist body 218, for example, via one or more fasteners and/or fastening methods or techniques. In some examples, during positional adjustment(s) of the primary weight 108, the set point 230 is maintained along with a first center line 236 of the hoist 102. That is, in such examples, neither of the set point 230 nor the first center line 236 of FIG. 2 shifts or moves relative to the hoist 102 when the load leveler mechanism 104 is adjusting the levelness of the hoist 102. The first center line 236 of FIG. 2 can include, for example, an axis that corresponds to the first one of the link(s) 216 and/or extends vertically through the set point 230.

Additionally, in some examples, the hoist 102 of FIG. 2 is movable in one or more directions (e.g., horizontal directions). In such examples, the hoist 102 can be provided with a mechanism configured to move the hoist 102 such as, for example, a trolley and/or one or more motors operatively coupled to the trolley.

In the example of FIG. 2, the hoist 102 has a first axis (e.g., a longitudinal axis) 238 associated with the hoist body 218, which is indicative of the primary levelness of the hoist 102. The first axis 238 of FIG. 2 extends along the hoist body 218 through a central portion of the hoist 102. For example, the first axis 238 of FIG. 2 extends through the COG 212 of the hoist 102 or an area of the hoist body 218 corresponding to the COG 212. In some examples, when the hoist 102 is substantially level or in the first state, the first axis 238 of the hoist 102 is substantially parallel relative to a horizontal axis 240. That is, in the example of FIG. 2, the first axis 238 and the horizontal axis 240 form and/or define a first tilt angle 242 of the hoist 102 that is substantially 0 degrees or within a predefined range of tilt angles, for example, including an upper allowable tilt angle (e.g., 5 degrees, 2 degrees, 0.5 degrees) and a lower allowable tilt angle (e.g., −5 degrees, −2 degrees, −0.5 degrees). As such, the first axis 238 of the hoist 102 is substantially perpendicular relative to a vertical axis 244 when the hoist 102 is in the first state. For example, the first axis 238 of FIG. 2 and the vertical axis 244 of FIG. 2 form and/or define a tilt angle of the hoist 102 that is substantially 90 degrees.

As previously described, the primary weight 108 of FIG. 2 is in the first position 201, which can provide levelness to the hoist 102 while the hoist 102 is unloaded or not carrying the object of interest 226. The first position 201 of the primary weight 108 can be preprogrammed into the control circuitry 114 (e.g., stored in the database 808 described below), for example, prior to operation of the load leveler mechanism 104. Additionally or alternatively, the first position 201 of primary weight 108 can be provided as a result of the control circuitry 114 advantageously utilizing the sensor(s) 120, 122, 124, 126 in connection with operating the actuator 112. In particular, the user(s) can interact with the input device 116 of FIG. 2 to provide a certain user input to the control circuitry 114 indicative of (a) the first position 201 and/or (b) initiating the leveling process of the load leveler mechanism 104. Accordingly, based on such a user input, the control circuitry 114 can quickly determine the first position 201 and/or move the primary weight 108 to the first position 201 via the actuator 112 and, in some examples, via the sensor(s) 120, 122, 124, 126. In such examples (e.g., if the primary weight 108 is not in the first position 201 while the hoist 102 is unloaded), the control circuitry 114 is configured to the move, via the actuator 112 and based on the user input and/or the sensor data, the primary weight 108 to the first position 201 to substantially level the hoist 102.

Additionally or alternatively, in some examples, the user(s) can interact with the input device 116 of FIG. 2 to manually adjust the relative position of the primary weight 108, for example, based on one or more visual characteristics associated with the hoist 102 and/or the primary weight 108. In such examples, the user(s) can identify and select a particular switch mechanism of the input device 116 that indicates one of the first or second direction 202, 204 to the control circuitry 114. In such examples, while the user(s) hold the switch mechanism in an activated state, the control circuitry 114 moves, via the actuator 112, the primary weight 108 in one of the first or second direction 202, 204, for example, until the user(s) release the switch mechanism (e.g., the switch mechanism changes from the activated state to a deactivated state). During such manual adjustment(s) of the primary weight 108, the control circuitry 114 can direct the output device 118 to display an observed tilt angle (e.g., an instantaneous tilt angle such as the first tilt angle 242) of the hoist 102, which helps the user(s) in achieving desired positioning of the primary weight 108 (e.g., while the hoist 102 is unloaded).

While FIG. 2 depicts the first position 201 of the primary weight 108 that is centrally positioned relative to the hoist 102, in some examples, the first position 201 of the primary weight 108 is implemented differently. For example, the first position 201 can correspond to a position on the path 206 that is substantially offset relative to the hoist 102 and/or the COG 212 associated therewith.

Additionally, in some examples, the control circuitry 114 of FIG. 2 directs the output device 118 to present to the user(s) a primary production instruction associated with the manufacturing system 100. In such examples, the primary production instruction informs the user(s) regarding, for example, (a) a type of the object of interest 226, (b) where to place the object of interest 226, (c) how to interact with the input device 116, (d) when to interact with the input device 116, (e) etc., and/or (f) any other suitable user instruction associated with manufacturing. After presenting the primary production instruction, the control circuitry 114 is configured to monitor the input device 116 for one more subsequent user inputs.

Figure 3:
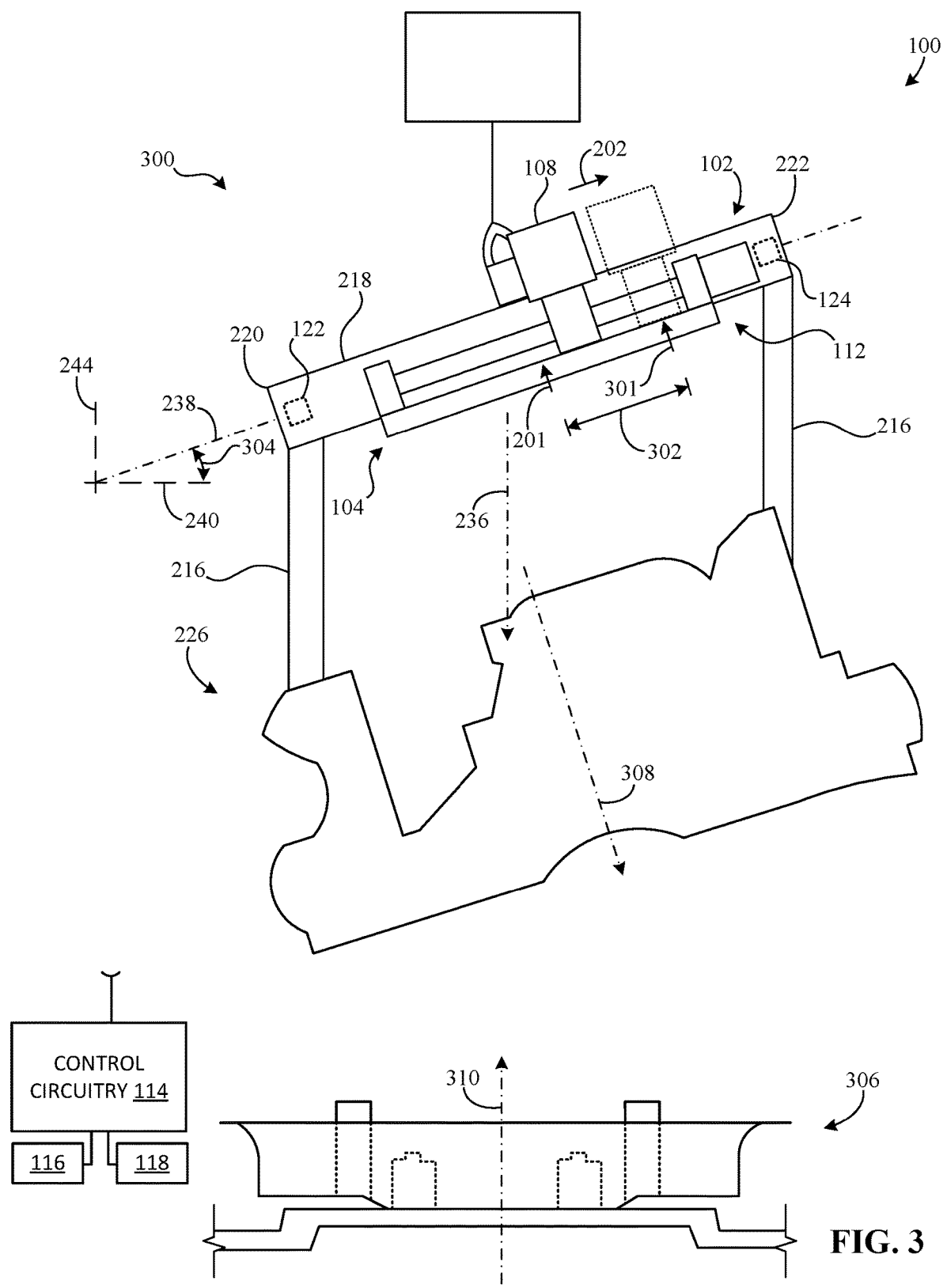

FIG. 3 illustrates another schematic diagram of the load leveler mechanism 104 of FIG. 1 and shows a second implementation 300 thereof in accordance with the teachings of this disclosure. In the example of FIG. 3, the hoist 102 is carrying a load (e.g., the object of interest 226) that is causing the hoist 102 to tilt. As such, the hoist 102 of FIG. 3 is in a second state (e.g., a tilted state) thereof different from the first state of the hoist 102. According to the illustrated example of FIG. 3, to provide substantial levelness to the hoist 102, the control circuitry 114 moves, via the actuator 112 and based on the input data and/or the sensor data, the primary weight 108 relative to the hoist 102 in the first direction 202 away from the initial position 201 of the primary weight 108 toward a first target position (e.g., an off-center position) 301 of the primary weight 108. The first target position 301 of the primary weight 108 is different relative to the initial position 201. The first target position 301 can correspond to a location on the path 206, between the first and second ends 208, 210, that is different from a location on the path 206 corresponding to the initial position 201. In particular, the first target position 301 is a position of the primary weight 108 relative to the hoist 102 that is associated with providing levelness to the hoist 102. For example, when the primary weight 108 of FIG. 3 reaches or is in the first target position 301, the primary weight 108 and/or, more generally, the adjustable load leveler mechanism 104 causes the hoist 102 of FIG. 3 to become substantially level or change from the second state to the first state.

As shown in FIG. 3, a distance 302 is defined by the initial position 201 and the first target position 301. That is, the first target position 301 is spaced from the initial position 201 by the distance 302. The distance 302 of FIG. 3 is sometimes referred to as a travel distance of the primary weight 108. For example, the primary weight 108 travels across the distance 302 during the leveling process. In some examples, the control circuitry 114 is configured to calculate and/or determine the distance 302 based on the sensor data, for example, via one or more algorithms, one or more models, one or more equations, etc. related to determining a direction of travel of the primary weight 108 and a travel distance of the primary weight 108 that are associated with achieving a desired levelness of the hoist 102.

In the example of FIG. 3, the hoist 102 is carrying the object of interest 226. On the other hand, the load leveler mechanism 104 of FIG. 3 is not carrying and/or supporting the object of interest 226 or any portion thereof. Accordingly, when the hoist 102 of FIG. 3 is carrying the object of interest 226, the object of interest 226 does not apply a load (e.g., a tensile load transmitted through the link(s) 216) to the load leveler mechanism 104 or any portion thereof. As a result, the load leveler mechanism 104 can be substantially compact with a relatively small packaging size, because the frame 106 has to carry only the mass of the primary weight 108. However, in some examples, the load leveler mechanism 104 and/or the hoist 102 can be implemented differently. For example, the frame 106 of the load leveler mechanism 104 can be configured to carry at least a portion of the object of interest 226.

Unlike the illustrated example of FIG. 2, the hoist 102 of FIG. 3 is substantially tilted due to the object of interest 226 applying the load to the hoist 102. When the hoist 102 is substantially tilted or in the second state, the first axis 238 of the hoist 102 is substantially angled relative to the horizontal axis 240. That is, in the illustrated example of FIG. 3, the first axis 238 and the horizontal axis 240 form and/or define a second tilt angle 304 of the hoist 102, an absolute value of which is substantially greater than an absolute value of the first tilt angle 242 shown in FIG. 2. For example, the second tilt angle 304 of FIG. 3 is greater than the upper allowable tilt angle previously described. In some examples, the control circuitry 114 detects such tilting of the hoist 102 via at least some or all of the sensor(s) 120, 122, 124, 126 of FIG. 1. As shown in FIG. 3, the primary tilt sensor 122 and the auxiliary tilt sensor 124 are disposed on the hoist body 218 and/or coupled to the hoist body 218, for example, via one or more fasteners and/or one or more fastening methods or techniques. In some examples, the primary tilt sensor 122 of FIG. 3 is positioned adjacent or proximate to the first end 220 of the hoist body 218, and the auxiliary tilt sensor 124 of FIG. 3 is positioned adjacent or proximate to the second end 222 of the hoist body 218. While FIG. 3 depicts the tilt sensors 122, 124 on the hoist body 218, in some examples, the sensor(s) 120 can be implemented differently while still sufficiently maintaining functionality. For example, the primary tilt sensor 122 and/or the auxiliary tilt sensor 124 can be positioned on the load leveler mechanism 104 or the frame 106 thereof.

The first target position 301 of the primary weight 108 can be preprogrammed into the control circuitry 114 (e.g., stored in the database 808 described below), for example, prior to operation of the load leveler mechanism 104. Additionally or alternatively, the first target position 301 of primary weight 108 can be provided as a result of the control circuitry 114 advantageously utilizing the sensor(s) 120, 122, 124, 126 in connection with operating the actuator 112. In particular, the user(s) can interact with the input device 116 to provide a certain user input to the control circuitry 114 indicative of (a) the first target position 301 and/or (b) initiating the leveling process of the load leveler mechanism 104. Accordingly, based on such a user input, the control circuitry 114 can quickly determine the first target position 301 and/or move the primary weight 108 to the first target position 301 via the actuator 112 and, in some examples, via the sensor(s) 120, 122, 124, 126. In such examples (e.g., if the primary weight 108 is not in the first target position 301 while the hoist 102 is loaded), the control circuitry 114 is configured to the move, via the actuator 112 and based on the user input and/or the sensor data, the primary weight 108 to the first target position 301 to substantially level the hoist 102.

Additionally or alternatively, in some examples, the user(s) can interact with the input device 116 of FIG. 3 to manually adjust the relative position the primary weight 108, for example, based on one or more visual characteristics associated with the hoist 102 and/or the primary weight 108. In such examples, the user(s) can identify and select a particular switch mechanism of the input device 116 that indicates the first direction 202 to the control circuitry 114. In such examples, while the user(s) hold the switch mechanism in an activated state, the control circuitry 114 moves, via the actuator 112, the primary weight 108 in the first direction 202, for example, until the user(s) release the switch mechanism (e.g., the switch mechanism changes from the activated state to a deactivated state). During such manual adjustment(s) of the primary weight 108, the control circuitry 114 can direct the output device 118 to display an observed tilt angle (e.g., an instantaneous tilt angle such as the second tilt angle 304) of the hoist 102, which helps the user(s) in achieving desired positioning of the primary weight 108 (e.g., while the hoist 102 is loaded).

In some examples, the manufacturing system 100 also includes a second handling unit 306 different from the first handling unit 224, as shown in FIG. 3. The second handling unit 306 of FIG. 3 can be implemented using a dolly such as, for example, an engine lifter dolly. In particular, the second handling unit 306 is configured to receive the object of interest 226 from the hoist 102, for example, after the hoist 102 picks up the object of interest 226 from the first handling unit 224. As shown in FIG. 3, a second center line 308 is associated with the object of interest 226, and a third center line 310 is associated with the second handling unit 306. The second center line 308 of FIG. 3 can include an axis (e.g., a central axis) of the object of interest 226. Further, the third center line 310 of FIG. 3 can include an axis (e.g., a central axis) of the second handling unit 306. In some examples, to properly set the object of interest 226 on the second handling unit 306, a certain orientation of the object of interest 226 is achieved while the hoist 102 is carrying the object of interest 226, for example, by moving the primary weight 108 to the first target position 301. In the example of FIG. 3, the first center line 236 of the hoist 102 is substantially aligned to and/or parallel with the third center line 310 of the second handling unit 306. On the other hand, the second center line 308 is substantially misaligned and/or angled relative to the first center line 236 and the third center line 310, which is undesirable when placing the object of interest 226 on the second handling unit 306.

Figure 4:
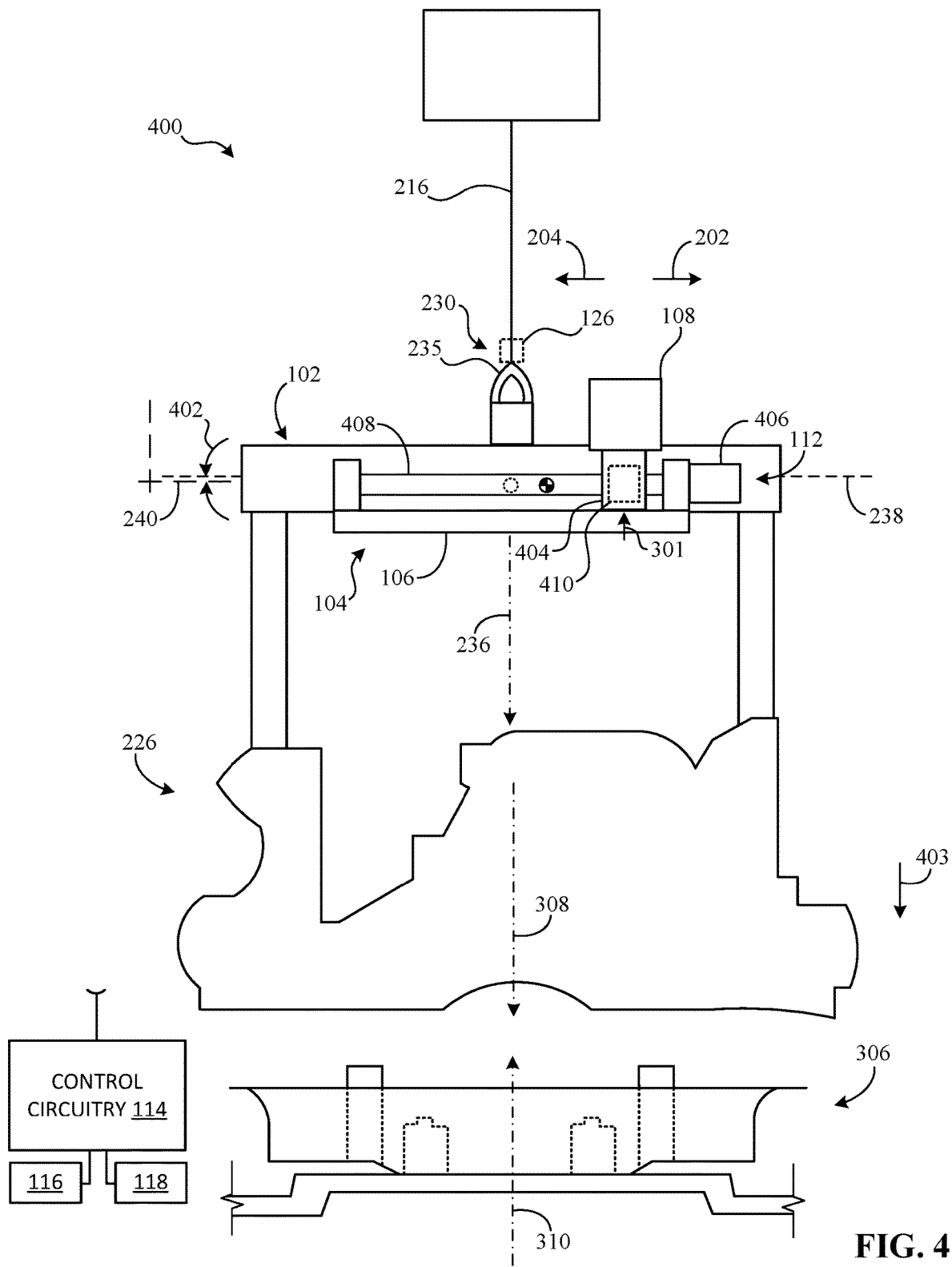

FIG. 4 illustrates another schematic diagram of the load leveler mechanism 104 of FIG. 1 and shows a third implementation 400 thereof in accordance with the teachings of this disclosure. In the example of FIG. 4, the hoist 102 is carrying a load (e.g., the object of interest 226), similar to the illustrated example of FIG. 3. Unlike the illustrated example of FIG. 3, the hoist 102 of FIG. 4 is substantially level as a result of the primary weight 108 reaching the first target position 301. That is, in contrast to the illustrated example of FIG. 3, the control circuitry 114 moved, via the actuator 112 and based on the input data and/or the sensor data, the primary weight 108 from the first position 201 to the first target position 301. As such, the hoist 102 of FIG. 4 is in the first state thereof while loaded, for example, such that the first axis 238 and the horizontal axis 240 form and/or define a third tilt angle 402 of the hoist 102. An absolute value of the third tilt angle 402 is substantially less than an absolute value of the second tilt angle 304 shown in FIG. 3. For example, the third tilt angle 402 of FIG. 4 is (a) less than or equal to upper allowable tilt angle of the hoist 102 and (b) greater than or equal to the lower allowable tilt angle of the hoist 102. The control circuitry 114 may notify, via the output device 118, the user(s) when the hoist 102 completes such a transition from the second state to the first state. In particular, according to the illustrated example of FIG. 4, the first center line 236 of the hoist 102, the second center line 308 of the object of interest 226, and the third center line 310 of the second handling unit 306 are substantially aligned to each other and/or parallel. Thus, the object of interest 226 of FIG. 4 can be suitably placed on the second handling unit 306. More particularly, neither the set point 230 of FIG. 4 nor the first center line 236 of FIG. 4 have moved or shifted relative to the hoist body 218 due to the movement of the primary weight 108 from the first position 201 to the first target position 301.

Each of the first, second, and third tilt angles 242, 304, 402 can be an observed tilt angle of hoist 102 that is substantially instantaneous. For example, the first, second, and third tilt angles 242, 304, 402 exist at different times and are sometimes collectively referred to as a tilt angle of the hoist 102. In some examples, the tilt angle 242, 304, 402 of the hoist 102, when detected by the control circuitry 114 via the auxiliary tilt sensor 124, corresponds to the coarse tilt angle of the hoist 102 previously described. On the other hand, in some examples, the tilt angle 242, 304, 402 of the hoist 102, when detected by the control circuitry 114 via the primary tilt sensor 122, corresponds the fine tilt angle of the hoist 102 previously described.

In some examples, the hoist 102 of FIG. 4 is configured to lower the object of interest 226 and/or place the object of interest 226 onto the second handling unit 306. For example, the hoist 102 of FIG. 3 can be operated by the user(s) to move the object of interest 226 toward the second handling unit 306 in a fourth direction (e.g., a vertical direction) 403 opposite to the third direction 228. In such examples, the second center line 308 and the third center line 310 can meet as the object of interest 226 engages the second handling unit 306.

Additionally, in some examples, the control circuitry 114 of FIG. 4 is configured to detect, via at least some or all of the sensor(s) 120, 122, 124, 126, substantial load changes associated with the hoist 102. In such examples, the control circuitry 114 detects, via the force sensor 126, when the hoist 102 releases the object of interest 226. In response to such a detection, the control circuitry 114 can initiate the fully automatic leveling process of the load leveler mechanism 104, which prepares the hoist 102 for a subsequent object of interest. As shown in FIG. 4, the force sensor 126 is coupled to the first one of the link(s) 216 and/or coupled between the adapter 235 and the first one of the link(s) 216. As such, the force sensor 126 of FIG. 4 can be configured to detect and/or monitor a tension of the first one of the link(s) 216. However, the force sensor 126 can be positioned relative to the hoist 102 differently while still sufficiently maintaining functionality. In particular, force sensor 126 of FIG. 4 is configured to trigger the control circuitry 114 when the load carried by the hoist 102 suddenly decreases, for example, below a threshold load.

In some examples, the primary weight 108 of FIG. 4 is incrementally adjustable, for example, in predetermined increments (e.g., 2-pound increments, 5-pound increments, 10-pound increments, etc.). In such examples, the load leveler mechanism 104 includes a first example coupling mechanism 404 coupled to the primary weight 108, which can form at least part of the mass of the primary weight 108. The first coupling mechanism 404 can be implemented, for example, using one or more brackets, one or more fasteners, etc. In particular, the first coupling mechanism 404 of FIG. 4 is configured to removably connect the primary weight 108 to the actuator 112 and/or, more generally, to the load leveler mechanism 104 or the frame 106 thereof. As such, the first coupling mechanism 404 of FIG. 4 can be operatively coupled between at least a portion (e.g., one or more weighted plates) of the primary weight 108 and part of the actuator 112 such that the primary weight 108 is supported by the load leveler mechanism 104 or the frame 106 thereof.

As previously described, the primary weight 108 can include multiple components (e.g., weighted plates), each of which can be removably connected to the load leveler mechanism 104 via the first coupling mechanism 404. In some examples, the first coupling mechanism 404 of FIG. 4 is configured to connect the multiple components of the primary weight 108 to the load leveler mechanism 104 and disconnect the multiple components of the primary weight 108 from load leveler mechanism 104, for example, in response to the user(s) interacting with the first coupling mechanism 404. In such examples, the user(s) can interact with the first coupling mechanism 404 (e.g., via adjusting one or more fasteners of the first coupling mechanism 404) to remove one or more of the multiple components from the primary weight 108 or add one or more additional components (e.g., weighted plates) to the primary weight 108, as desired or required for maintaining the auxiliary levelness of the hoist 102.

In some examples, the actuator 112 of FIG. 4 includes a first actuator component (e.g., an electric motor such as a servo motor) 406, a second actuator component (e.g., a threaded shaft such as a ball screw) 408, and a third actuator component (e.g., a ball nut) 410 that are configured to function cooperatively to precisely control the relative position of the primary weight 108. The second actuator component 408 can be rotatably supported by the frame 106, for example, via one or more bearings. The second actuator component 408 is also operatively coupled to the first actuator component 406 to receive an actuator output from the first actuator component 406. For example, the control circuitry 114 of FIG. 4 can control the first actuator component 406 to generate an actuator output (e.g., a force and/or a torque) and apply the actuator output to the second actuator component 408, thereby rotating the second actuator component 408 relative to the frame 106. In such examples, such relative rotation of the second actuator component 408 causes the third actuator component 410 to move along the second actuator component 408 in the first or second direction 202, 204 between opposite ends of the second actuator component 408. As such, the third actuator component 410 of FIG. 4 can be threadably engaged with the second actuator component 408. In some examples, the third actuator component 410 of FIG. 4 can be attached to the first coupling mechanism 404 such the primary weight 108, the first coupling mechanism 404, and the third actuator component 410 move together along the second actuator component 408 when the actuator output is generated. Further, the second actuator component 408 of FIG. 4 can define the path 206 or at least part thereof along which the primary weight 108 is to travel.

Figure 5:
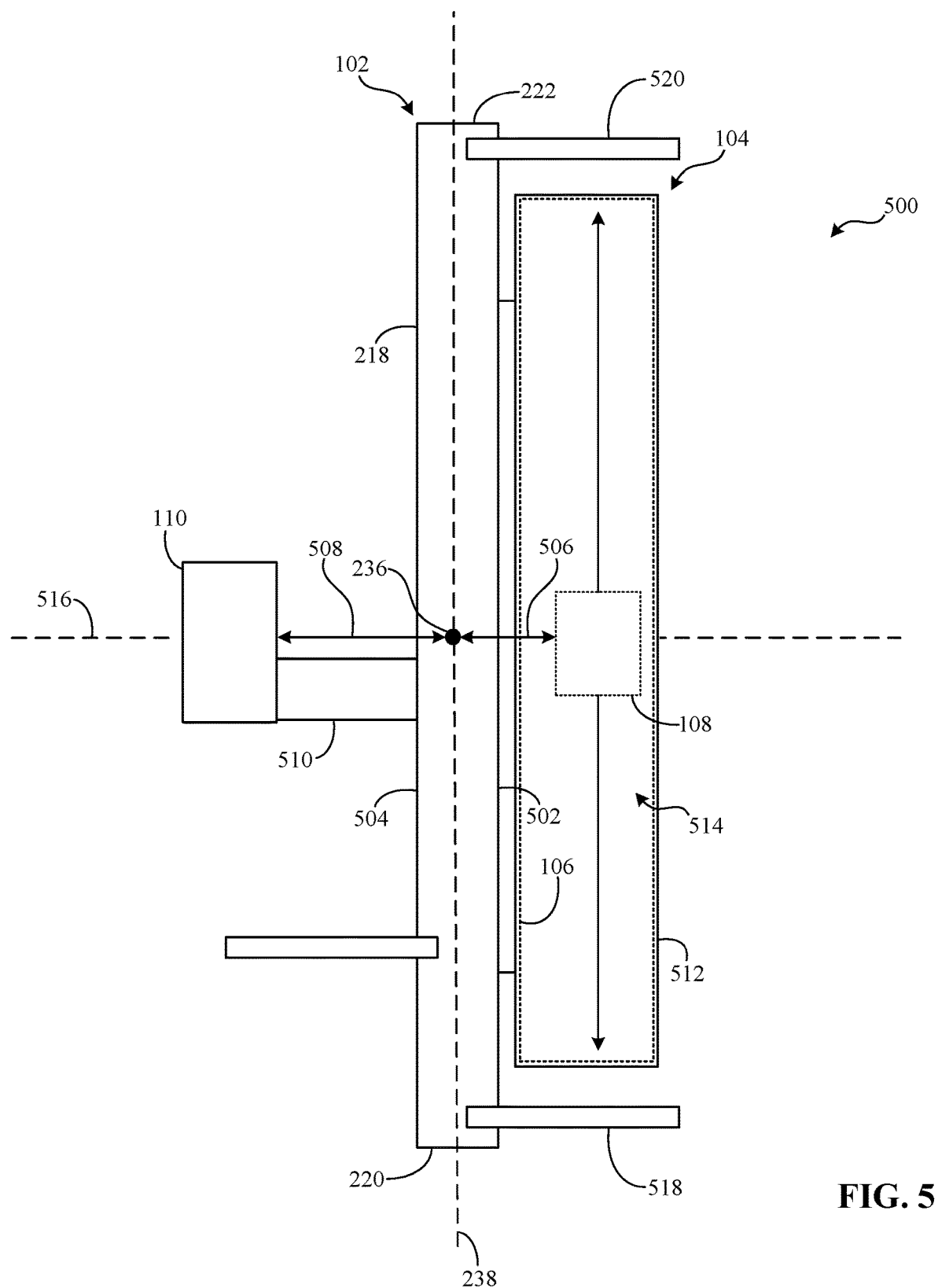

FIG. 5 illustrates another schematic diagram of the load leveler mechanism 104 of FIG. 1 and shows a fourth implementation 500 thereof in accordance with the teachings of this disclosure. In the example of FIG. 5, the hoist 102 and the adjustable load leveler mechanism 104 are viewed along the first center line 236. The primary and auxiliary weights 108, 110 of FIG. 5 are supported by the hoist body 218. In particular, the primary weight 108 of FIG. 5 is positioned adjacent a first side 502 of the hoist body 218, and the auxiliary weight 110 of FIG. 5 is positioned adjacent a second side 504 of the hoist body 218 opposite to the first side 502. Further, in some examples, the primary weight 108 of FIG. 5 is spaced from the first center line 236 or the first axis 238 by a first lateral distance 506, and the auxiliary weight 110 of FIG. 5 is spaced from the first center line 236 or the first axis 238 by a second lateral distance 508. Such relative positioning and/or spacing of the primary and auxiliary weights 108, 110 ensures the hoist body 218 does not rotate or tilt about the first axis 238, for example, regardless of whether the hoist 102 is carrying a load. Although FIG. 5 depicts the first lateral distance 506 that is substantially less than the second lateral distance 508, in some examples, the primary weight 108 and/or the auxiliary weight 110 is/are positioned differently relative to the hoist body 218 while still sufficiently maintaining auxiliary levelness thereof, depending masses of the respective primary and secondary weights 108, 110.

In some examples, similar to the primary weight 108, the auxiliary weight 110 of FIG. 5 is incrementally adjustable, for example, in predetermined increments (e.g., 2-pound increments, 5-pound increments, 10-pound increments, etc.). In such examples, the load leveler mechanism 104 can include a second example coupling mechanism 510 coupled to the auxiliary weight 110, which can form at least part of the mass auxiliary weight 110. The second coupling mechanism 510 can be implemented, for example using one or more brackets, one or more fasteners, etc. In particular, the second coupling mechanism 510 of FIG. 5 is configured to removably connect the auxiliary weight 110 to (a) the body 218 of the hoist 102 and/or (b) the frame 106 of the load leveler mechanism 104. As such, the second coupling mechanism 510 of FIG. 5 can be operatively coupled between at least a portion (e.g., one or more weighted plates) of the auxiliary weight 110 and part of (a) the hoist 102 and/or (b) the load leveler mechanism 104, which provides support to the auxiliary weight 110.

As previously described, the auxiliary weight 110 can include multiple components (e.g., weighted plates), each of which can be removably connected to the hoist body 218 and/or the frame 106 via the second coupling mechanism 510. In some examples, in response to the user(s) interacting with the second coupling mechanism 510, the second coupling mechanism 510 of FIG. 5 is configured to (a) connect the multiple components of the auxiliary weight 110 to the hoist body 218 and/or the frame 106 and (b) disconnect the multiple components of the auxiliary weight 110 from the hoist body 218 and/or the frame 106. In such examples, the user(s) can interact with the second coupling mechanism 510 (e.g., via adjusting one or more fasteners of the second coupling mechanism 510) to remove one or more of the multiple components from the auxiliary weight 110 or add one or more additional components (e.g., weighted plates) to the auxiliary weight 110, as desired or required for maintaining the auxiliary levelness of the hoist 102.

Additionally, in some examples, the load leveler mechanism 104 of FIG. 5 can be provided with no pinch points. In such examples, the load leveler mechanism 104 of FIG. 5 includes an example safety structure 512 preventing access to the primary weight 108 by the user(s), which improves safety. The safety structure 512 can be implemented, for example, using one or more of a cover, a cage, an enclosure, etc., or a combination thereof. In such examples, the safety structure 512 is supported by a suitable part of the load leveler mechanism 104 such as, for example, the frame 106 (as represented by the dotted/dashed lines of FIG. 5). As such, the safety structure 512 of FIG. 5 can be coupled to the frame 106, for example, via one or more fasteners and/or one or more fastening methods or techniques. In particular, the safety structure 512 covers one or more (e.g., all) moving components of the load leveler mechanism 104 such as, for example, the primary weight 108 and/or the actuator 112. In some examples, the safety structure 512 forms and/or defines a chamber 514 in which the primary weight 108 is disposed. The chamber 514 of FIG. 5 is sized and/or shaped such that the primary weight 108 of FIG. 5 can travel through the chamber 514 without interfering with and/or contacting any undesired portion(s) of the load leveler mechanism 104. The safety structure 512 can surround and/or enclose the primary weight 108 as well as the actuator 112.

In the example of FIG. 5, the hoist 102 has a second axis (e.g., a transverse axis) 516 associated with the hoist body 218, which is indicative of the auxiliary levelness of the hoist 102. The second axis 516 of FIG. 5 is perpendicular relative to the first axis 238 and can extend through the COG 212 of the hoist 102 or an area of the hoist body 218 corresponding to the COG 212.

In some examples (e.g., wherein the load leveler mechanism 104 is provided as a clamp-on unit), the frame 106 of FIG. 5 is configured to couple to the body 218 of the hoist 102 and decouple from the body 218. In some examples, the hoist body 218 includes one or more end effectors 518, 520 positioned thereon, which can be advantageously used to support the load leveler mechanism 104. In the illustrated example of FIG. 5, a first end effector 518 and a second end effector 520 are coupled to the hoist body 218. The first end effector 518 of FIG. 5 is positioned proximate to the first end 220 of the hoist body 218 and extends away from the first end 220. On the other hand, the second end effector 520 of FIG. 5 is positioned proximate to the second end 222 of the hoist body 218 and extends away from the second end 222, for example, substantially parallel relative to the first end effector 518. As shown in FIG. 5, the frame 106 is interposed between the first and second end effectors 518, 520. In such examples, the frame 106 of FIG. 5 can be coupled (e.g., removably coupled) to the first and second end effectors 518, 520, for example, via bolting opposing ends of the frame 106 onto the respective ones of the end effectors 518, 520. Additionally or alternatively, in some examples, the frame 106 of FIG. 5 can be similarly coupled (e.g., removably coupled) to a different portion of the hoist body 218 such as, for example, the first side 502 of the hoist 102.

According to the illustrated example of FIG. 5, the hoist 102 and the load leveler mechanism 104, together, can be provided as an integral device. On the other hand, in some examples, the load leveler mechanism 104 can be provided as a standalone clamp-on unit. In such examples, the load leveler mechanism 104 of FIG. 5 is produced separately from the hoist 102 and then installed on the hoist 102.

Figure 6:
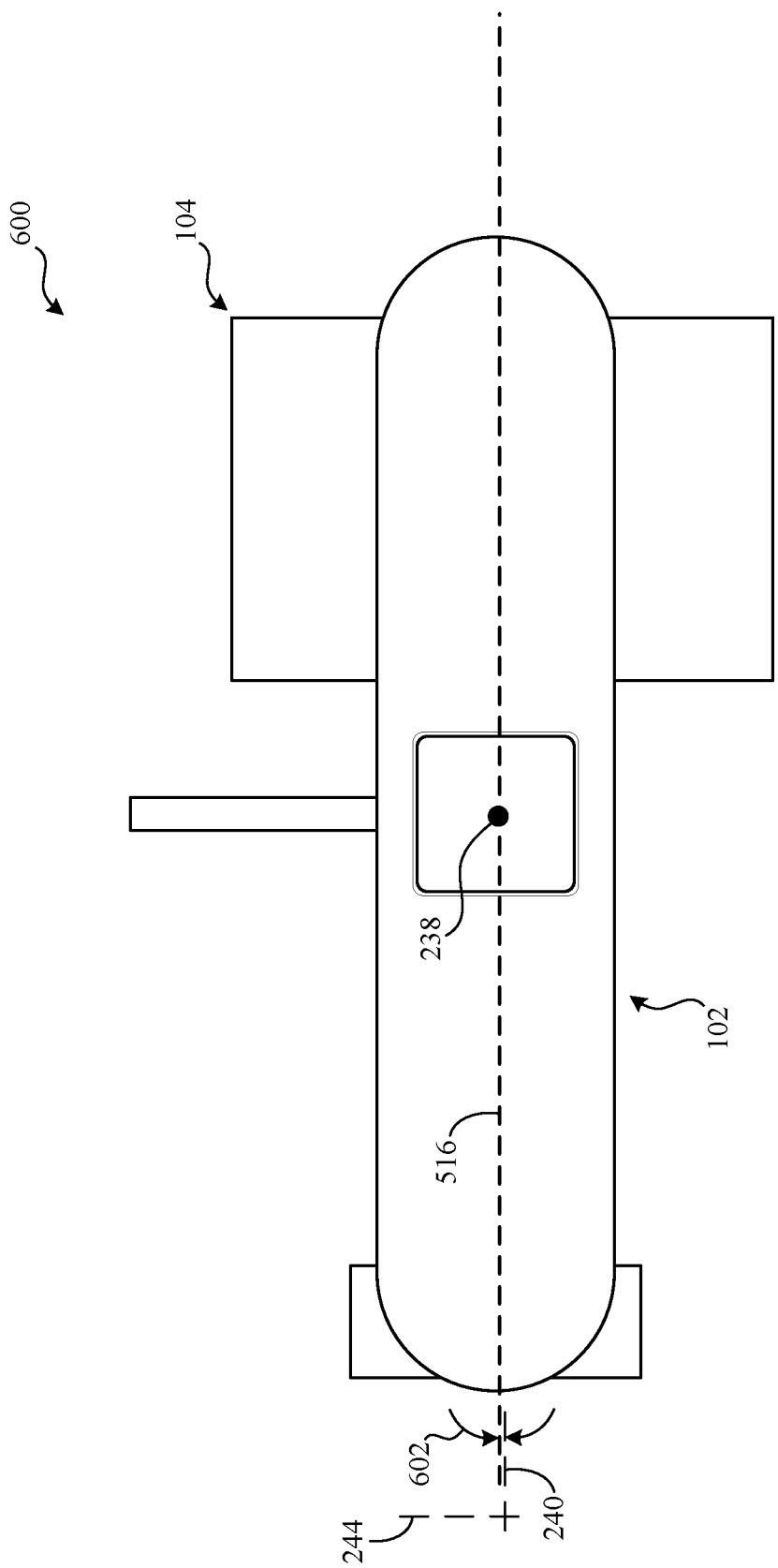

FIG. 6 illustrates another schematic diagram of the load leveler mechanism 104 of FIG. 1 and shows a fifth implementation 600 thereof in accordance with the teachings of this disclosure. In the example of FIG. 6, the hoist 102 and the adjustable load leveler mechanism 104 are viewed along the first axis 238 of the hoist 102. In some examples, when the hoist 102 of FIG. 6 is substantially level or in the first state, the second axis 516 of the hoist 102 is substantially parallel relative to the horizontal axis 240. That is, in the example of FIG. 6, the second axis 516 and the horizontal axis 240 form and/or define a fourth tilt angle 602 that is substantially 0 degrees or within the predefined range of angles. As such, the second axis 516 of FIG. 6 is substantially parallel relative to the horizontal axis 244.

Figure 7:
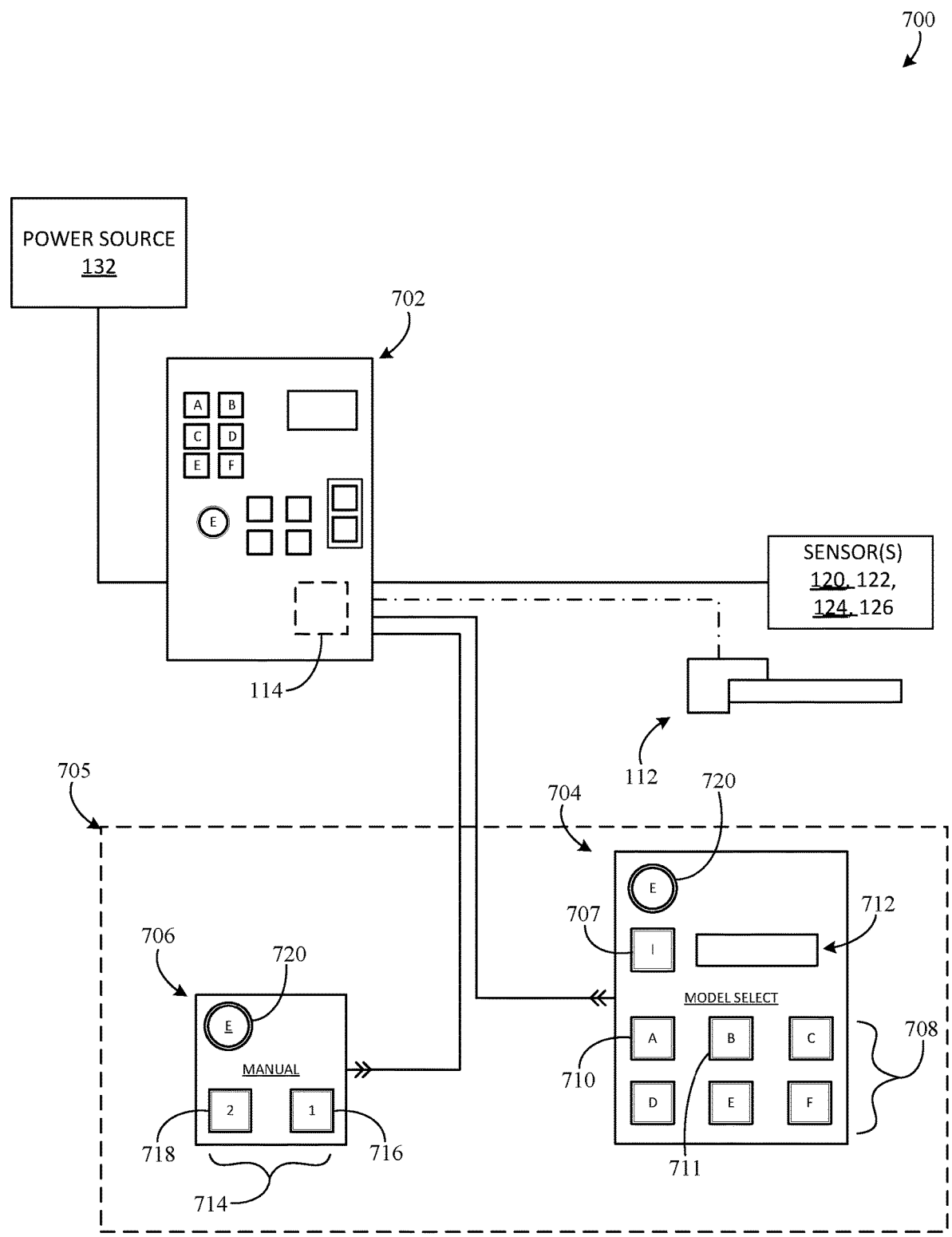
FIG. 7 illustrates an example electronic scheme that can be used to implement the example load leveler mechanism of FIGS. 1-6.

FIG. 7 illustrates an electronic scheme 700 that can be used to implement the adjustable load leveler mechanism 104. According to the illustrated example of FIG. 7, an example operator or control panel 702, a first operation box (e.g., a vehicle model select operation box) 704, and a second operation box (e.g., manual operation box) 706 are provided. In some examples, each of the first and second operation boxes 704, 706 of FIG. 7 is an input device positioned in a manufacturing area 705 within viewing distance of the hoist 102 and accessible to the user(s). As such, each of the first and second operation boxes 704, 706 is communicatively coupled to the control circuitry 114 to provide at least some or all of the aforementioned input data to the control circuitry 114, for example, via one or more signal or transmission wires, a bus, radio frequency, etc. In some examples, the control circuitry 114 is implemented by the control panel 702, as shown in FIG. 7. The control panel 702 of FIG. 7 is connected to the power source 132 and can include a PLC such as, for example, a ToyoPuc PLC with 120 Volt power.

In some examples, to facilitate user interactions and/or communications with the control circuitry 114, one or more switch mechanisms can be operatively coupled to any one or more (e.g., all) of the control panel 702, the first operation box 704, and/or the second operation box 706. According to the illustrated example of FIG. 7, the first operation box 704 includes a primary switch mechanism 707 positioned thereon. The primary switch mechanism 707 of FIG. 7 corresponds to the first operating mode (e.g., an automatic leveling mode) of the load leveler mechanism 104. In particular, selecting and/or pressing the primary switch mechanism 707 enables the control circuitry 114 to set the load leveler mechanism 104 in the first operating mode and/or initiate the fully automatic leveling process. In such examples, in response to detecting a user input from the primary switch mechanism 707, the control circuitry 114 moves, via the actuator 112 and the sensor(s) 120, 122, 124, 126, the primary weight 108 away from an initial position (e.g., the first position 201) and toward a target position (e.g., the first target position 301). Further, the primary switch mechanism 707 can include a visual indicator (e.g., any of an LED, a sticker, paint, etc.) that visually indicates to the user(s), for example, the first operating mode and/or a status of whether the first operating mode is available for selection. For example, the visual indicator can be disposed on or adjacent the primary switch mechanism 707 such that the visual indicator can be viewed by the user(s), which enables the user(s) to easily identify, upon visual inspection of the first operation box 704, the primary switch mechanism 707, the function thereof, and/or the status thereof.

Additionally or alternatively, in some examples, the first operation box 704 includes a first set of switch mechanisms 708 positioned thereon. The first set of switch mechanisms 708 corresponds to the second operating mode (e.g., a model select leveling mode) of the load leveler mechanism 104. As previously described, the first operating mode is associated with a first operating characteristic of the load leveler mechanism 104, and the second operating mode is associated with a second operating characteristic of the load leveler mechanism 104 different relative to the first operating characteristic. In particular, selecting and/or pressing a desired one of the first set of switch mechanisms 708 enables the control circuitry 114 to, for example, move, via the actuator 112, the primary weight 108 to a predefined position of the primary weight 108 relative to the hoist 102. Each switch mechanism of the first set of switch mechanisms 708 can include a visual indicator (e.g., any of an LED, a sticker, paint, etc.) that visually indicates to the user(s), for example, (a) a target position of the primary weight 108 that will be provided when that switch mechanism is activated and/or (b) a status of whether that switch mechanism is available for selection. In another example, each visual indicator can visually indicate to the user(s) different vehicle models or related components that can be carried by the hoist 102 when the respective switch mechanism is activated. For example, the visual indicators can be disposed on or adjacent respective switch mechanisms of the first set of switch mechanism 708 such that the visual indicators can be viewed by the user(s), which enables the user(s) to easily identify, upon visual inspection of the first operation box 704, each switch mechanism, the function thereof, and/or the status thereof.

According to the illustrated example of FIG. 7, each switch mechanism of the first set of switch mechanisms 708, when selected, can provide a unique or different target position of the primary weight 108. For example, in response to detecting that a first switch mechanism 710 of the first operation box 704 is pressed or activated, the control circuitry 114 controls the actuator 112 to move the primary weight 108 to the first target position 301 shown in FIGS. 3 and 4. In such examples, the first switch mechanism 710 can include a visual indicator that visually indicates to the user(s), for example, the first vehicle model and/or the first vehicle module. Additionally or alternatively, in another example, in response to detecting that a second switch mechanism 711 of the first operation box 704 is pressed or activated, the control circuitry 114 controls the actuator 112 to move the primary weight 108 to a second target position different from the first target position 301. In such examples, the second switch mechanism 711 can include a visual indicator that visually indicates to the user(s), for example, the second vehicle model and/or the second vehicle module. The second target position of the primary weight 108 can include, but is not limited to, any of (a) a position at the second end 210 of the path 206 (b) a position between the second end 210 of the path 206 and the first target position 301, (c) a position between the first target position 301 and the initial position 201, (d) a position between the initial position 201 and the first end 208 of the path 206, (e) a position at the first end 208 of the path 206, (f) etc., (g) and/or any other suitable position on the path 206.

In some examples, the first operation box 704 of FIG. 7 further includes an example screen or graphic display 712 configured to present visual information to the user(s), which can be used to implement the output device 118 previously described. In some examples, the control circuitry 114 controls the graphic display 712 to present the primary production instruction to the user(s), for example, via generating text, one or more images, one or more icons, one or more symbols, etc. In such examples, the primary production instruction can indicate to the user(s) a particular vehicle model that matches one of the visual indicators of the first set of the switch mechanisms 708. After receiving the primary production instruction, the user(s) can proceed appropriately by the selecting one of the first switch mechanisms 708 matching the primary production instruction.

Additionally or alternatively, in some examples, the second operation box 706 includes a second set of switch mechanisms 714 positioned thereon. The second set of switch mechanisms 714 corresponds to the third operating mode (e.g., a manual leveling mode) of the load leveler mechanism 104. As previously described, the third operating mode is associated with a third operating characteristic of the load leveler mechanism 104 different relative to the first and second operating characteristics. Selecting and/or pressing a desired switch mechanism of the second set of switch mechanisms 714 enables the control circuitry 114 to, for example, move, via the actuator 112, the primary weight 108 relative to the hoist 102 in a predefined direction (e.g., the first or second direction 202, 204).

Each switch mechanism of the second set of switch mechanisms 714 can include a visual indicator (e.g., any of an LED, a sticker, paint, etc.) that visually indicates to the user(s), for example, a direction (e.g., East, West, etc.) in which the primary weight 108 is to move when that switch mechanism is activated. In some examples, in response to detecting that a third switch mechanism 716 of the second operation box 706 is pressed or activated, the control circuitry 114 controls the actuator 112 to move the primary weight 108 relative to the hoist 102 in the first direction 202. Conversely, in some examples, in response to detecting that a fourth switch mechanism 718 of the second operation box 706 is pressed or activated, the control circuitry 114 controls the actuator 112 to move the primary weight 108 in the second direction 204. The visual indicators can be disposed on or adjacent respective switch mechanisms of the second set of switch mechanism 718 such that the visual indicators can be viewed by the user(s), which enables the user(s) to easily identify, upon visual inspection of the second operation box 706, each switch mechanism and/or the function thereof.

Additionally, in some examples, each of the first and second operation boxes 704, 706 includes an emergency stop switch mechanism 720 positioned thereon. In such examples, selecting and/or pressing one of the emergency stop switch mechanisms 720 enables the control circuitry 114 to, for example, cease operation of the actuator 112.

In some examples, one or more (e.g., all) of the first operation box 704, the second operation box 706, the primary switch mechanism 707, the first set of switch mechanisms 708 (e.g., including the first switch mechanism 710 and the second switch mechanism 711), the second set of switch mechanisms 714 (e.g., including the third switch mechanism 716 and the fourth switch mechanism 718), and/or the emergency stop switch mechanism(s) 720 correspond to and/or can be used to implement the input device 116 shown in FIG. 1. Accordingly, each of the first operation box 704, the second operation box 706, the primary switch mechanism 707, the first set of switch mechanisms 708 (e.g., including the first switch mechanism 710 and the second switch mechanism 711), the second set of switch mechanisms 714 (e.g., including the third switch mechanism 716 and the fourth switch mechanism 718), and/or the emergency stop switch mechanism(s) 720 is sometimes referred to as an input device. In such examples, the control circuitry 114 can be configured to initiate control of the actuator 112 in response to detecting activation of any one of the switch mechanisms 707, 710, 711, 714, 716, 718.

Further, while FIG. 7 depicts the first and second operation boxes 704, 706 having the switch mechanisms 707, 708, 710, 711, 714, 716, 718, 720, in some examples, some or all of the switch mechanisms 707, 708, 710, 711, 714, 716, 718, 720 of FIG. 7 can be implemented in the control panel 702, and/or some or all of the described functionality of the switch mechanisms 707, 708, 710, 711, 714, 716, 718, 720 may be resident in the control panel 702.

In the example of FIG. 7, the switch mechanism(s) 707, 708, 710, 711, 714, 716, 718, 720 can be implemented using, for example, one or more push-button switches, etc., and/or any other suitable button(s) capable of generating input data when activated. Additionally or alternatively, at least some or all of the switch mechanism(s) 707, 708, 710, 711, 714, 716, 718, 720 of FIG. 7 are implemented using software. In some examples, at least one of the control panel 702, the first operation box 704, and/or the second operation box 706 include(s) a screen (e.g., a touch responsive screen) or graphic display configured to generate a virtual switch mechanism a user can interact with via an input selection. Such a virtual switch mechanism, when displayed on the screen, can include, for example, a submit button, a start button, a reset button, etc.

Figure 8:
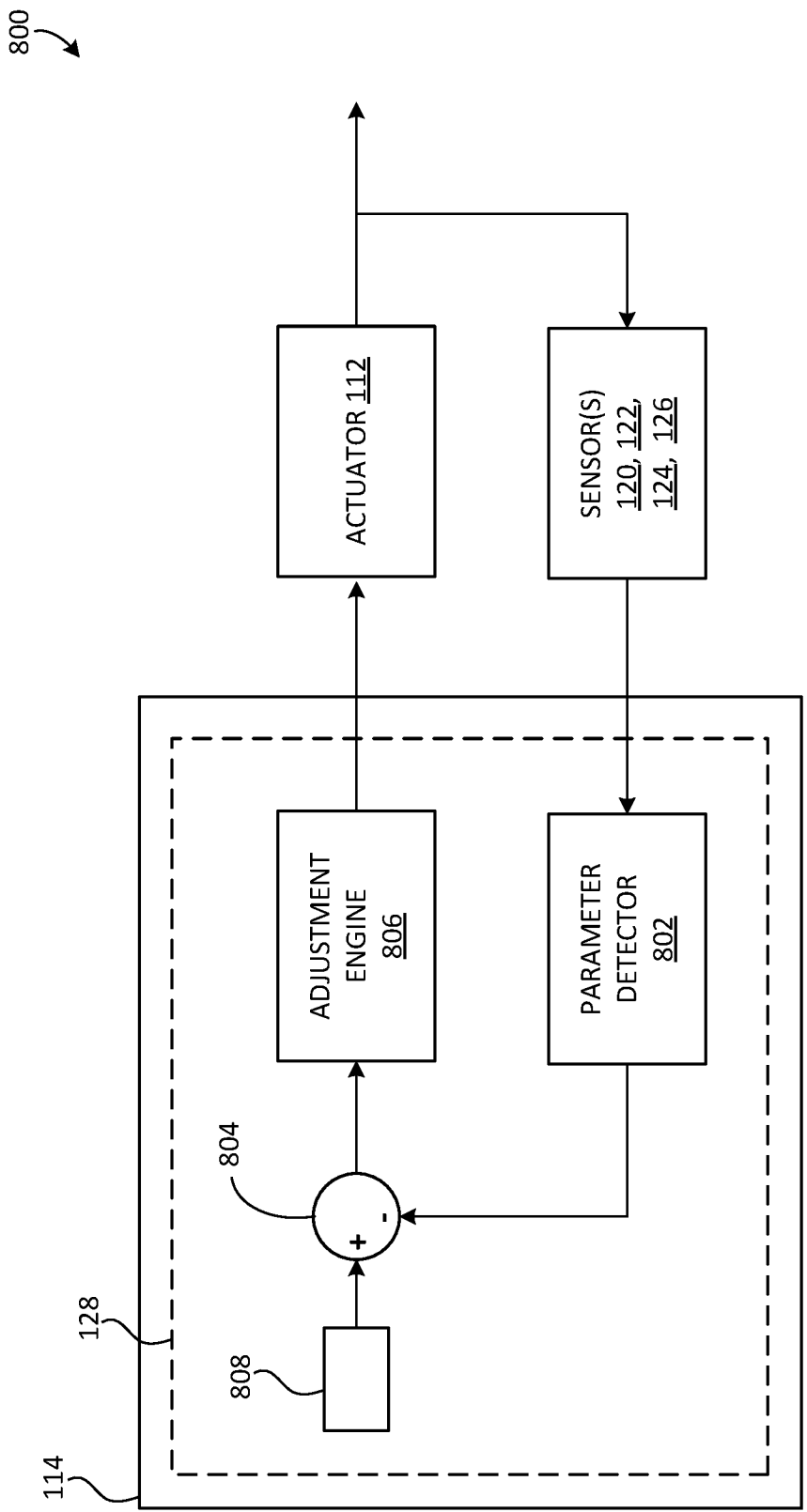
FIG. 8 illustrates a schematic diagram of an example control loop in accordance with the teachings of this disclosure.

FIG. 8 illustrates a schematic diagram of an example control loop (e.g., a feedback control loop) 800 in accordance with the teachings of this disclosure. According to the illustrated example of FIG. 8, the control loop 800 includes a feedback control loop, and the control circuitry 114 includes a feedback controller (e.g., one of a PID controller, a proportional-integral (PI) controller, etc.) forming the feedback control loop with the actuator 112 and one or more (e.g., all) of the sensor(s) 120, 122, 124, 126. In particular, the control circuitry 114 of FIG. 8 employs one or more control strategies corresponding to any of (a) proportional feedback control, (b) integral feedback control, (c) derivative feedback control, (d) or a combination thereof (e.g., PID feedback control). In some examples, the control circuitry 114 of FIG. 8 includes an example parameter detector 802, an example comparator 804, and an example adjustment engine 806 to perform one or more operations of the feedback application 130 shown in FIG. 1, each of which can be implemented by the primary processor 128 previously described. As will be discussed in greater detail below in connection with FIG. 9, the parameter detector 802, the comparator 804, and the adjustment engine 806, together, enable the control circuitry 114 to advantageously process the sensor data generated by the sensor(s) 120, 122, 124, 126 to determine when and/or how to control the actuator 112, for example, during the fully automatic leveling process of the load leveler mechanism 104 when the load leveler mechanism 104 is in the first operating mode.

The parameter detector 802 of FIG. 8 is operatively interposed between the sensor(s) 120, 122, 124, 126 and the comparator 804. The parameter detector 802 of FIG. 8 is configured to receive the sensor data from the sensor(s) 120, 122, 124, 126. In some examples, in response to receiving such data, the parameter detector 802 is configured calculate and/or determine any one or more (e.g., all) of the observable parameters (a)-(o) described above based on the sensor data. For example, the parameter detector 802 can determine (e.g., continuously and/or repeatedly) an observed tilt angle 242, 304, 402 of the hoist 102 based on the sensor data. In another example, the parameter detector 802 can determine (e.g., continuously and/or repeatedly) a position of the actuator 112 based on the sensor data. Further, in such examples, the parameter detector 802 is configured to transmit the determined parameter(s) to the comparator 804 for comparison with one or more target parameters. As will be described further below, the target parameter(s) can include, for example, an optimal or desired degree of tilt of the hoist 102, which can be predefined and/or preprogrammed into the control circuitry 114. Additionally or alternatively, the parameter detector 802 can transmit at least some of the determined parameter(s) directly to the adjustment engine 806 for processing.

As previously described, the first tilt angle 242, the second tilt angle 304, and/or the third tilt angle 402 determined by the parameter detector 802 may be instantaneous parameters. Accordingly, in some examples, the parameter detector 802 is configured to repeatedly determine such instantaneous parameter(s) in response to the sensor(s) 120, 122, 124, 126 generating updated or new sensor data.

The comparator 804 of FIG. 8 is operatively interposed between the parameter detector 802, the adjustment engine 806, and an example database 808 of the control circuitry 114. The comparator 804 is configured to process (a) data provided by the parameter detector 802 and (b) data provided by the database 808. For example, the comparator 804 is configured to perform one or more comparisons of data generated by the parameter detector 802 with predefined or target data stored in the database 808, thereby determining one or more error values. For example, the comparator 804 can calculate a first error value based on a difference between the observed tilt angle 242, 304, 402 of the hoist 102 and a primary target tilt angle (e.g., stored in the database 808). Further, the comparator 804 is configured to transmit results of the comparison(s) to the adjustment engine 806, which enables the adjustment engine 806 to calculate and/or determine one or more adjustments (e.g., control actions) for the actuator 112 associated with advantageously moving the primary weight 108 relative to the hoist 102. Additionally, in some examples, the comparator 804 calculates one or more control components or terms based on the comparison(s) and transmits the control term(s) to the adjustment engine 806, which can aid the adjustment engine 806 in determining the adjustment(s) for the actuator 112. The control terms(s) include, for example, any of a proportional term (e.g., the first error value), an integral term, and/or a derivative term, each of which can affect a time varying response of the adjustment engine 806.

The adjustment engine 806 of FIG. 8 is operatively interposed between the comparator 804 and the actuator 112 of the adjustable load leveler mechanism 104. In particular, the adjustment engine 806 is configured to receive data (e.g., any of the comparison result(s), the control terms, etc.) provided by the comparator 804 and, based on such data, calculate and/or determine the adjustment(s) for the actuator 112. For example, the adjustment engine 806 can utilize one or more example algorithms, models, equations, etc. (e.g., stored in the database 808) related to determining, based on the data provided by the comparator 804, a positional movement of the primary weight 108 that results in the hoist 102 transitioning from the second state to the first state. Then, the adjustment engine 806 and/or, more generally, the control circuitry 114 is/are configured to carry out or execute the adjustment(s), thereby controlling the position of the primary weight 108 relative to the hoist 102. In some examples, the adjustment engine 806 and/or, more generally, the control circuitry 114 is/are configured to adjust one or more operating parameters of the actuator 112 based on the adjustment(s). For example, a first one of the adjustment(s) includes changing (e.g., increasing or decreasing), by a certain amount or degree, voltage, electric current, and/or electric power transmitted from the power source 132 to the actuator 112 or the first actuator component 406 thereof.

Additionally, in some examples (e.g., where the control circuitry 114 includes a feedback controller), the adjustment engine 806 is configured to generate, based on the data received from the comparator 804, the feedback commands for controlling the actuator 112. In such examples, the actuator 112 can generate (e.g., via the first actuator component 406) the actuator output based on the feedback commands to provide rapid control, compensation, and/or correction with respect to reducing the error value(s) (e.g., the first error value) calculated by the comparator 804, which enables the load leveler mechanism 104 to quickly achieve a target levelness of the hoist 102 and substantially maintain the target levelness. Further, in such examples, the adjustment engine 806 can update (e.g., continuously or repeatedly) the feedback commands to enable the actuator 112 to adjust the relative position of the primary weight 108 based on changes of, for example, the observed or calculated tilt angle 242, 304, 402 of the hoist 102. Accordingly, the parameter detector 802, the comparator 804, and the adjustment engine 806, together, may process subsequent sensor data received from at least some of the sensor(s) 120, 122, 124 to determine whether and/or how to update the feedback commands. In this manner, a time varying strength of the actuator output is facilitated by the control circuitry 114 and based on the subsequent sensor data.

As a result of employing such feedback control strategies, an absolute value of the observed tilt angle 242, 304, 402 of the hoist 102 remains substantially below an absolute value the primary target tilt angle of the hoist 102, regardless of disturbance(s) input to the hoist 102 during the leveling process. In other words, the control circuitry 114 may allow the observed tilt angle 242, 304, 402 to slightly vary between the upper and lower allowable tilt angles of the hoist 102. In particular, during execution of the feedback application 130, the parameter detector 802, the comparator 804, the adjustment engine 806, together, can be configured to substantially maintain the hoist 102 in the first state. In some examples, the primary target tilt angle can be set to, for example, +/−5 degrees, +/−2 degrees, +/−0.1 degrees, etc., or any other desired value that may be suitable for a particular manufacturing application.

Although FIG. 8 depicts the control loop 800 and the control circuitry 114 that are associated with feedback control, in some examples, the control loop 800 and/or the control circuitry 114 can be implemented differently, for example, using a feedforward control scheme.

Figure 9:
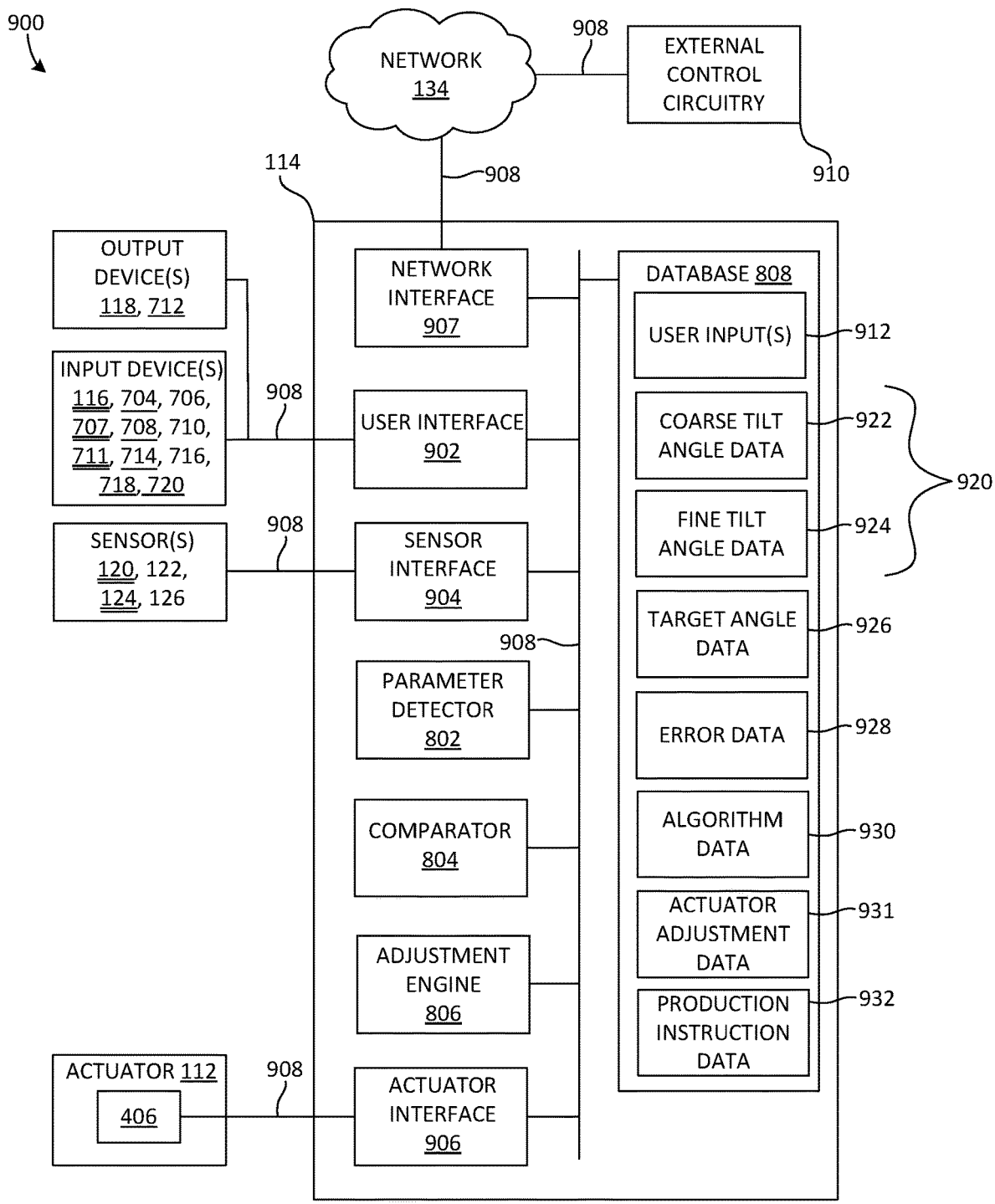
FIG. 9 is a block diagram of an example control system in accordance with the teachings of this disclosure.

FIG. 9 is a block diagram of an example control system 900 in accordance with the teachings of this disclosure. The control system 900 can be implemented, for example, by the control circuitry 114 of FIGS. 1-4, 7, and 8. According to the illustrated example of FIG. 9, the control system 900 includes the example parameter detector 802, the example comparator 804, the example adjustment engine 806, the example database 808, an example user interface 902, an example sensor interface 904, an example actuator interface 906, and an example network interface 907. The control system 900 of FIG. 9 is communicatively coupled to the input device(s) 116, 704, 706, 707, 708, 710, 711, 714, 716, 718, 720, the output device(s) 118, 712, the sensor(s) 120, 122, 124, 126, the actuator 112, and the network 134 via one or more example communication links 908. The communication link(s) 908 of FIG. 9 can be implemented, for example, using one or more signal or transmission wires, a bus, radio frequency, etc. Further, in some examples, the control system 900 can also be communicatively coupled to example external control circuitry 910 via the communication link(s) 908 and the network 134, which will be discussed further below. In particular, the actuator interface 906 of FIG. 9 is configured to provide one or more advantageous control signals or commands and/or electrical power (e.g., the feedback control commands) to the actuator 112, thereby controlling the actuator 112 and/or the actuator output thereof.

In the example of FIG. 9, the user interface 902 facilitates interactions and/or communications between the control system 900 and one or more users. The user interface 902 of FIG. 9 is communicatively coupled, via the communication link(s) 908, to one or more (e.g., all) of the input device(s) 116, 704, 706, 707, 708, 710, 711, 714, 716, 718, 720 previously described. For example, the user interface 902 of FIG. 9 is communicatively coupled, via the communication link(s) 908, to the first operation box 704 and/or the second operation box 706. In another example, the user interface 902 of FIG. 9 is communicatively coupled, via the communication link(s) 908, to (a) the primary switch mechanism 707, (b) each switch mechanism of the first set of switch mechanisms 708 (e.g., including the first switch mechanism 710 and the second switch mechanism 711), (c) each switch mechanism of the second set of switch mechanisms 714 (e.g., including the third switch mechanism 716 and the fourth switch mechanism 718), and/or (d) each of the emergency stop switch mechanism(s) 720. In particular, the user interface 902 is configured to receive one or more example user inputs 912 from the input device(s) 116, 704, 706, 707, 708, 710, 711, 714, 716, 718, 720 associated with operating the load leveler mechanism 104, for example, in response to the user(s) interacting with the input device(s)

116, 704, 706, 707, 708, 710, 711, 714, 716, 718, 720. The user input(s) 912 of FIG. 9 is/are sometimes referred to as input data. Further, the user input(s) 912 of FIG. 9 can include, for example, one or more signals generated and/or provided by the input device(s) 116, 704, 706, 707, 708, 710, 711, 714, 716, 718, 720 that indicate to the adjustment engine 806 when and/or how to implement control of the actuator 112. After receiving the user input(s) 912, the user interface 902 may store the user input(s) 912 in the database 808 for processing by the adjustment engine 806. Additionally or alternatively, the user interface 902 can transmit the user input(s) 912 directly to the adjustment engine 806 for processing.

In the example of FIG. 9, the sensor interface 904 facilitates interactions and/or communications between the control system 900 and the sensor(s) 120, 122, 124, 126. The sensor interface 904 of FIG. 9 is communicatively coupled, via the communication link(s) 908, to one or more (e.g., all) the sensor(s) 120, 122, 124, 126 previously described. For example, the sensor interface 904 of FIG. 9 is communicatively coupled, via the communication link(s) 908, to the primary tilt sensor 122, the auxiliary tilt sensor 124, and/or the force sensor 126. In another example, the sensor interface 904 of FIG. 9 is communicatively coupled, via the communication link(s) 908, to an actuator sensor. In particular, the sensor interface 904 is configured to receive (e.g., continuously or repeatedly) example sensor data (e.g., raw sensor data and/or processed sensor data) 920 from the sensor(s) 120, 122, 124, 126. Further, the sensor interface 904 is configured to store the sensor data 920 in the database 808 and/or transmit the sensor data 920 directly to the parameter detector 802 for processing. The sensor data 920 of FIG. 9 can include data associated with operation with the hoist 102 and/or the load leveler mechanism 104 such as, for example, tilt sensor data, force sensor data, actuator positional data, actuator output data, voltage data, electric current data, etc., and/or any other suitable data. In some examples, the sensor data 920 received by the sensor interface 904 includes coarse tilt angle data 922 and fine tilt angle data 924, which enable the adjustment engine 806 to operate the actuator 112 effectively when the actuator 112 is in the first or second actuator operating mode. The coarse tilt angle data 922 of FIG. 9 is generated by the auxiliary tilt sensor 124 and can include the coarse tilt angle of the hoist 102 previously described. Further, the fine tilt angle data 924 of FIG. 9 is generated by the primary tilt sensor 122 and can include the fine tilt angle of the hoist 102 previously described.

In the example of FIG. 9, the parameter detector 802 processes the sensor data 920, 922, 924 received by the sensor interface 904, thereby determining one or more (e.g., all) of the observable parameters (a)-(o) described above. The parameter detector 802 of FIG. 9 is configured to receive at least some or all of the sensor data 920, 922, 924 via the communication link(s) 908, for example, from the database 808 and/or the sensor interface 904. In some examples, the parameter detector 802 calculates and/or determines the coarse tilt angle of the hoist 102 based on at least portion of the coarse tilt angle data 922. In other words, the control system 900 of FIG. 9 can obtain the coarse tilt angle by detecting, via the auxiliary tilt sensor 124, the first, second, or third tilt angle 242, 304, 402 of the hoist 102. Additionally or alternatively, in some examples, the parameter detector 802 calculates and/or determines the fine tilt angle of the hoist 102 based on at least a portion of the fine tilt angle data 924. In other words, the control system 900 of FIG. 9 can obtain the fine tilt angle by detecting, via the primary tilt sensor 122, the first, second, or third tilt angle 242, 304, 402 of the hoist 102. Further, in some examples the parameter detector 802 of FIG. 9 can calculate (e.g., continuously and/or repeatedly) the load associated with the hoist 102. In particular, in such examples, the parameter detector 802 is configured to transmit the calculated load to the comparator 804 for comparison with a threshold load, which can serve as a trigger for the adjustment engine 806 to initiate the fully automatic leveling process of the load leveler mechanism 104 after the hoist 102 releases the load.

In the example of FIG. 9, the comparator 804 processes data of interest (e.g., feedback data) including at least some or all of the sensor data 920, 922, 924 and/or example target angle data 926. The comparator 804 of FIG. 9 is configured to receive the data of interest via the communication link(s) 908, for example, from the database 808 and/or the parameter detector 802. The target angle data 926 of FIG. 9 can be preprogrammed into the control system 900 and/or otherwise stored in the database 808 (e.g., prior to leveler operation). In some examples, the target angle data 926 is provided to the control system 900 and/or updated therein via the network interface 907. In particular, the target angle data 926 includes the primary target tilt angle previously describe above in connection with FIG. 8. The target angle data 926 can also include a criterion or criteria, which aids the comparator 804 in analyzing compared data. In particular, the comparator 804 of FIG. 9 performs one or more comparisons of coarse tilt angle data 922 with the target angle data 926, thereby generating example error data 928. Additionally or alternatively, in some examples, the comparator 804 of FIG. 9 performs one or more comparisons of the fine tilt angle data 924 with the target angle data 926, thereby generating the error data 928 or at least a portion thereof. The error data 928 of FIG. 9 can include one or more error values determined by the comparator 804 such as, for example, the first error value described above in connection with FIG. 8. In some examples, the comparator 804 calculates a difference between the observed tilt angle 242, 304, 402 of the hoist 102 and the primary target tilt angle, thereby determining the first error value.

Additionally or alternatively, the error data 928 can include the control term(s) previously described. In some examples, the comparator 804 of FIG. 9 calculates the integral term, for example, based on a sum of instantaneous values corresponding to the first error value. Further, the comparator 804 of FIG. 9 can calculate the derivative term, for example, based on a rate of change of the first error value. Accordingly, the comparator 804 of FIG. 8 can utilize one or more equations (e.g., stored in the database 808) related to calculating such control term(s). In such examples, gains of the respective control term(s) can be tuned or set to provide a desired response of the control system 900 (e.g., a critically damped response) with respect to varying the observed tilt angle 242, 304, 402 of the hoist 102.

In some examples, when the actuator 112 is in the first actuator operating mode, the comparator 804 of FIG. 9 performs a first comparison of the coarse tilt angle of the hoist 102 with an auxiliary target tilt angle of the target angle data 926. In particular, an absolute value of the auxiliary target tilt angle is substantially greater than an absolute value of the primary target tilt angle. The auxiliary target tilt angle can be set to, for example, +/−10 degrees, etc., or any other desired value that may be suitable for a particular manufacturing application. Further, in such examples, the comparator 804 of FIG. 9 determines whether the first comparison satisfies a first criterion of the target angle data 926. The first criterion can include a condition of whether an absolute value of the coarse tilt angle is less than or equal to the absolute value of the auxiliary target tilt angle, which serves as a trigger for changing the actuator 112 from the first actuator operating mode to the second actuator operating mode.

On the other hand, in some examples, when the actuator 112 is in the second actuator operating mode, the comparator 804 performs a second comparison of the fine tilt angle of the hoist 102 with the primary target tilt angle. In such examples, the comparator 804 of FIG. 9 determines whether the second comparison satisfies a second criterion of the target angle data 926. The second criterion can include a condition of whether an absolute value of the fine tilt angle is less than or equal to the absolute value of the primary target tilt angle, which serves as a trigger for ceasing operation of the actuator 112 and/or ceasing relative movement of the primary weight 108.

In the example of FIG. 9, the adjustment engine 806 processes, via example algorithm data 930, any or all of the user input(s) 912, the sensor data 920, 922, 924, and/or the error data 928, thereby generating example actuator adjustment data 931. The adjustment engine 806 of FIG. 9 is configured to receive such data 912, 920, 922, 924, 928 for processing via the communication link(s) 908, for example, from the user interface 902, the parameter detector 802, the comparator 804, and/or the database 808. The algorithm data 930 of FIG. 9 includes, for example, one or more algorithms, one or more models, one or more equations, one or more look-up tables, etc. related to calculating or determining, based on such data 912, 920, 922, 924, 928, one or more actuator adjustments that result in reducing the error value(s) calculated by the comparator 804. In particular, the adjustment engine 806 advantageously utilizes the algorithm data 930 to calculate and/or determine, based on any or all of the user input(s) 912, the sensor data 920, 922, 924, and/or the error data 928, the adjustment(s) for the actuator 112 associated with advantageously moving the primary weight 108 relative to the hoist 102. The adjustment engine 806 of FIG. 9 can store the determined adjustment(s) in the database 808 as the actuator adjustment data 931. Additionally or alternatively, the adjustment engine 806 can transmit, via the communication link(s) 908, the adjustment(s) and/or the actuator adjustment data 931 directly to the actuator interface 906 for execution or communication with the actuator 112.

In the example of FIG. 9, the actuator interface 906 facilitates interactions and/or communications between the control system 900 and the actuator 112 of the load leveler mechanism 104. The actuator interface 906 of FIG. 9 is communicatively coupled to the actuator 112 and/or the first actuator component 406 via the communication link(s) 908. Further, the actuator interface 906 processes the adjustment (s) for the actuator 112 and/or, more generally, processes the actuator adjustment data 931 generated by the adjustment engine 806. In particular, the actuator interface 906 of FIG. 9 is configured to convert the actuator adjustment data 931 into the control signal(s) or command(s) and/or electrical power provided to the first actuator component 406. That is, the actuator interface 906 is configured to direct the first actuator component 406 based on the actuator adjustment data 931 to control the actuator output of the actuator 112 and, consequently, to control the relative position of the primary weight 108. For example, the actuator interface 906 can adjust the operating parameter(s) of the actuator 112 based on the adjustment(s) determined by the adjustment engine 806.

In some examples, when the actuator 112 is in the first actuator operating mode while the first criterion is not satisfied, the actuator interface 906 directs the actuator 112 to move the primary weight 108 relative to the hoist 102 at the first speed based on the coarse tilt angle. Additionally or alternatively, in some examples, when the actuator 112 is in the second actuator operating mode while the second criterion is not satisfied, the actuator interface 906 directs the actuator 112 to move the primary weight 108 relative to the hoist 102 at the second speed based on the fine tilt angle. The first speed can be, for example, greater than 1 millimeter (mm) per second and less than or equal to a certain maximum speed (e.g., about 100 mm per second) associated with the load leveler mechanism 104. On the other hand, the second speed can be, for example, less than 1 mm per second. In some examples, the second speed can be greater than 1 mm per second and reach up to, for example, the maximum speed.

In operation, the user interface 902 of FIG. 9 can receive various types of user inputs. In some examples, the user interface 902 of FIG. 9 receives a first one of the user input(s) 912 from the input device(s) 116, 704, 706, 707, 708, 710, 711, 714, 716, 718, 720 indicative of a certain operating mode of the load leveler mechanism 104, which enables the adjustment engine 806 and the actuator interface 906 to set the load leveler mechanism 104 in the certain operating mode. For example, the first one of the user input(s) 912 can be indicative of the first operating mode, the second operating mode, or the third operating mode previously described.

Additionally or alternatively, in some examples, the user interface 902 receives a second one of the user input(s) 912 from the first set of switch mechanisms 708 indicative of a predefined position (e.g., the first target position 301) of the primary weight 108 relative to the hoist 102. In such examples, the adjustment engine 806 uses the algorithm data 930 to determine a first adjustment (e.g., part of the actuator adjustment data 931) for the actuator 112 based on the second one of the user input(s) 912 and an initial position of the actuator 112. Further, the actuator interface 906 then directs the actuator 112, based on the first adjustment, to move the primary weight 108 to the predefined position to substantially level the hoist 102.

Additionally or alternatively, in some examples, the user interface 902 receives a third one of the user input(s) 912 from the second set of switch mechanisms 714 indicative of the first direction 202 or the second direction 204 opposite to the first direction 202. In such examples, the adjustment engine 806 uses the algorithm data 930 to determine a second adjustment (e.g., part of the actuator adjustment data 931) for the actuator 112 based on the third one of the user input(s) 912. Further, the actuator interface 906 then directs the actuator 112, based on the second adjustment, to move the primary weight 108 relative to the hoist 102 in the first or second direction 202, 204, for example, while a respective one of the third or fourth switch mechanism 716, 718 is held in an activated state. Further still, in such examples, the actuator interface 906 directs the actuator 112 to cease moving the primary weight 108 relative to the hoist 102, for example, when the respective one of the third or fourth switch mechanism 716, 718 changes from the activated state to a deactivated state.

While certain example user inputs have been described, the user input(s) 912 of FIG. 9 can include any other type of input and/or data associated with the controlling the actuator 112 or, more generally, associated with operating the load leveler mechanism 104. For example, a user input can more generally cause a mode change of the load leveler mechanism 104 to occur. In some examples, the user interface 902 receives a fourth one of the user input(s) 912 from the input device(s) 116, 704, 706, 707, 708, 710, 711, 714, 716, 718, 720 indicative of the second operating mode while the load leveler mechanism 104 is in the first operating mode. In such examples, the actuator interface 906 directs the actuator 112 to change, based on the fourth one of the user input(s) 912, the load leveler mechanism 104 from the first operating mode to the second operating mode.

In the example of FIG. 9, the network interface 907 facilitates interactions and/or communications between the control system 900 and the network 134. The network interface 907 of FIG. 9 is communicatively coupled to the network 134 via the communication link(s) 908 to receive data therefrom and/or provide data thereto. In some examples, the network interface 907 communicates with the network 134 to update at least some of the data in the database 808 such as, for example, some or all of the target angle data 926, example production instruction data 932, etc. The production instruction data 932 of FIG. 9 includes one or more production instructions associated with the manufacturing system 100 such as, for example, the primary production instruction previously described.

In the example of FIG. 9, the user interface 902 is also communicatively coupled to the output device(s) 118, 712 via the communication link(s) 908. In some examples, the user interface 902 is configured to direct the output device(s) 118, 712 based on the production instruction data 932, for example, to present the primary production instruction to the user(s).

In the example of FIG. 9, the database 808 stores (e.g., temporarily and/or permanently) and/or provides access to at least some or all of the data 912, 920, 922, 924, 926, 928, 930, 931, 932 in the database 808. The database 808 of FIG. 9 is communicatively coupled, via the communication link(s) 908, to the parameter detector 802, the comparator 804, the adjustment engine 806, the user interface 902, the sensor interface 904, the actuator interface 906, and the network interface 907. In some examples, any one or more (e.g., all) of the parameter detector 802, the comparator 804, the adjustment engine 806, the user interface 902, the sensor interface 904, the actuator interface 906, and/or the network interface 907 transmit (e.g., repeatedly and/or continuously) data to the database 808. Conversely, in some examples, the database 808 transmits (e.g., repeatedly or continuously) data to any one or more (e.g., all) of the parameter detector 802, the comparator 804, the adjustment engine 806, the user interface 902, the sensor interface 904, the actuator interface 906, and/or the network interface 907.

While example implementation of the control system 900 is illustrated in FIG. 9, one or more of the elements, processes, and/or devices depicted in FIG. 9 may be combined, divided, re-arranged, omitted, eliminated, and/or implemented in any other way. In some examples, some or all of the described functions of the control system 900 may be resident on the external control circuitry 910, for example, via one or more processors of the external control circuitry 910. In such examples, the external control circuitry 910 of FIG. 9 may be located external to the control system 900, such as in a control room of a manufacturing plant, and communicatively coupled to the control system 900 via the communication link(s) 908 and the network 134. Further, the example control system 900 of FIG. 9 may include one or more elements, processes, and/or devices in addition or alternatively to those illustrated in FIG. 9, and/or may include more than one of any of the illustrated elements, processes, and devices.

Additionally, one or more of the example control circuitry 114, the example parameter detector 802, the example comparator 804, the example adjustment engine 806, the example database 808, the example user interface 902, the example sensor interface 904, the example actuator interface 906, the example network interface 907, and/or, more generally, the example control system 900 of FIG. 9 may be implemented by hardware, software, firmware and/or any combination thereof. For example, one or more (e.g., all) of the control circuitry 114, the parameter detector 802, the comparator 804, the adjustment engine 806, the database 808, the user interface 902, the sensor interface 904, the actuator interface 906, the network interface 907, and/or, more generally, the control system 900 could be implemented by one or more circuits (e.g., an analog or digital circuit, a logic circuit, a programmable processor, etc.). Further, in some examples, at least one of the control circuitry 114, the parameter detector 802, the comparator 804, the adjustment engine 806, the database 808, the user interface 902, the sensor interface 904, the actuator interface 906, the network interface 907, and/or the control system 900 include(s) a tangible machine-readable storage device or storage disk (e.g., a memory storing the software and/or firmware).

Figure 10:
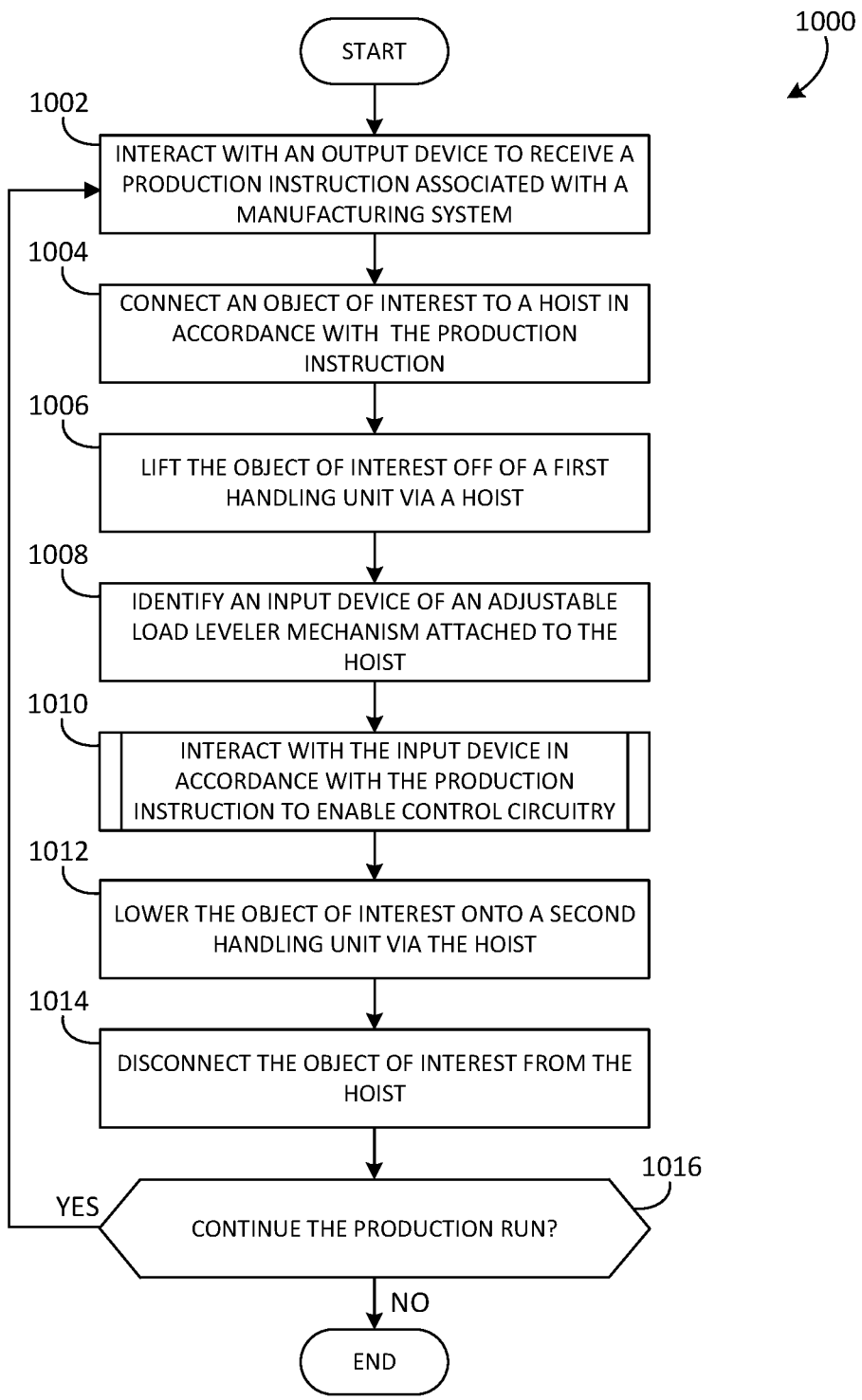
FIGS. 10 and 11 are flowcharts representative of example methods that can be carried out to implement the example manufacturing system of FIG. 1.

FIG. 10 is flowchart representative of an example method 1000 that can be executed to implement the aforementioned manufacturing system 100. In particular, the example method 1000 of FIG. 10 is effective in moving (e.g., lifting and/or lowering) one or more objects of interest via the hoist 102 and the load leveler mechanism 104 during a production run of the manufacturing system 100. Further, the example method 1000 of FIG. 10 serves as an effective method of operating the adjustable load leveler mechanism 104. The example method 1000 of FIG. 10 begins by interacting with an output device to receive a production instruction associated with a manufacturing system (block 1002). In some examples, one or more users (e.g., plant personnel) interact with the output device(s) 118, 712 to receive the primary production instruction associated with the manufacturing system 100.

The example method 1000 of FIG. 10 also includes connecting an object of interest to a hoist in accordance with the production instruction (block 1004). In some examples, the user(s) connect (e.g., via the link(s) 216) the object of interest 226 to the hoist 102 in accordance with the primary production instruction.

The example method 1000 of FIG. 10 also includes lifting the object of interest off of a first handling unit via a hoist (block 1006). In some examples, the user(s) lift the object of interest 226 off of the first handling unit 224 via the hoist 102.

The example method 1000 of FIG. 10 also includes identifying an input device of an adjustable load leveler mechanism attached to the hoist (block 1008). In some examples, the user(s) identify the input device 116 of the adjustable load leveler mechanism 104 shown in FIGS. 1-4. For example, the user(s) can identify, via visual inspection, the first operation box 704, the second operation box 706, and/or the switch mechanism(s) 707, 708, 710, 711, 714, 716, 718, 720 disposed thereon (e.g., see FIG. 7). As previously described, such input device(s) is/are connected to the control system 900, for example, via the user interface 902.

The example method 1000 of FIG. 10 also includes interacting with the input device in accordance with the production instruction to enable control circuitry (block 1010). In some examples, the user(s) interact with the input device 116 in accordance with the primary production instruction to enable the control circuitry 114, the external control circuitry 910, and/or, more generally, to enable the control system 900 of FIG. 9. For example, the user(s) can activate one or more of the switch mechanisms 707, 708, 710, 711, 714, 716, 718, which causes the control system 900 to direct the actuator 112 to particularly move the primary weight 108 relative to the hoist 102 to adjust the levelness of the hoist 102. In other examples, the user(s) provide a confirmation to the input device 116. In particular, the load leveler mechanism 104 provides levelness to the hoist 102 as a result of the user(s) operating the load leveler mechanism 104 in accordance with the primary production instruction (e.g., see FIG. 4).

The example method 1000 of FIG. 10 also includes lowering the object of interest onto a second handling unit via the hoist (block 1012). In some examples, the user(s) lower the object of interest 226 onto the second handling unit 306 via the hoist 102.

The example method 1000 of FIG. 10 also includes disconnecting the object of interest from the hoist (block 1014). In some examples, the user(s) disconnect the object of interest 226 from the hoist 102.

The example method 1000 of FIG. 10 also includes determining whether to continue the production run (block 1016). In some examples, if a positive determination is provided (e.g., a subsequent object of interest is ready to be carried by the hoist 102) (block 1016: YES), control of the example method 1000 of FIG. 10 returns to block 1002. On the other hand, in some examples, if a negative determination is provided (block 1016: NO), control of the example method 1000 of FIG. 10 ends.

Although the example method 1000 is described in connection with the flowchart of FIG. 10, one or more other methods of implementing the manufacturing system 100 may alternatively be used. For example, the order of execution of the blocks 1002, 1004, 1006, 1008, 1010, 1012, 1014, 1016 may be changed, and/or at least some operations of the blocks 1002, 1004, 1006, 1008, 1010, 1012, 1014, 1016 described may be changed, eliminated, or combined.

Figure 11:
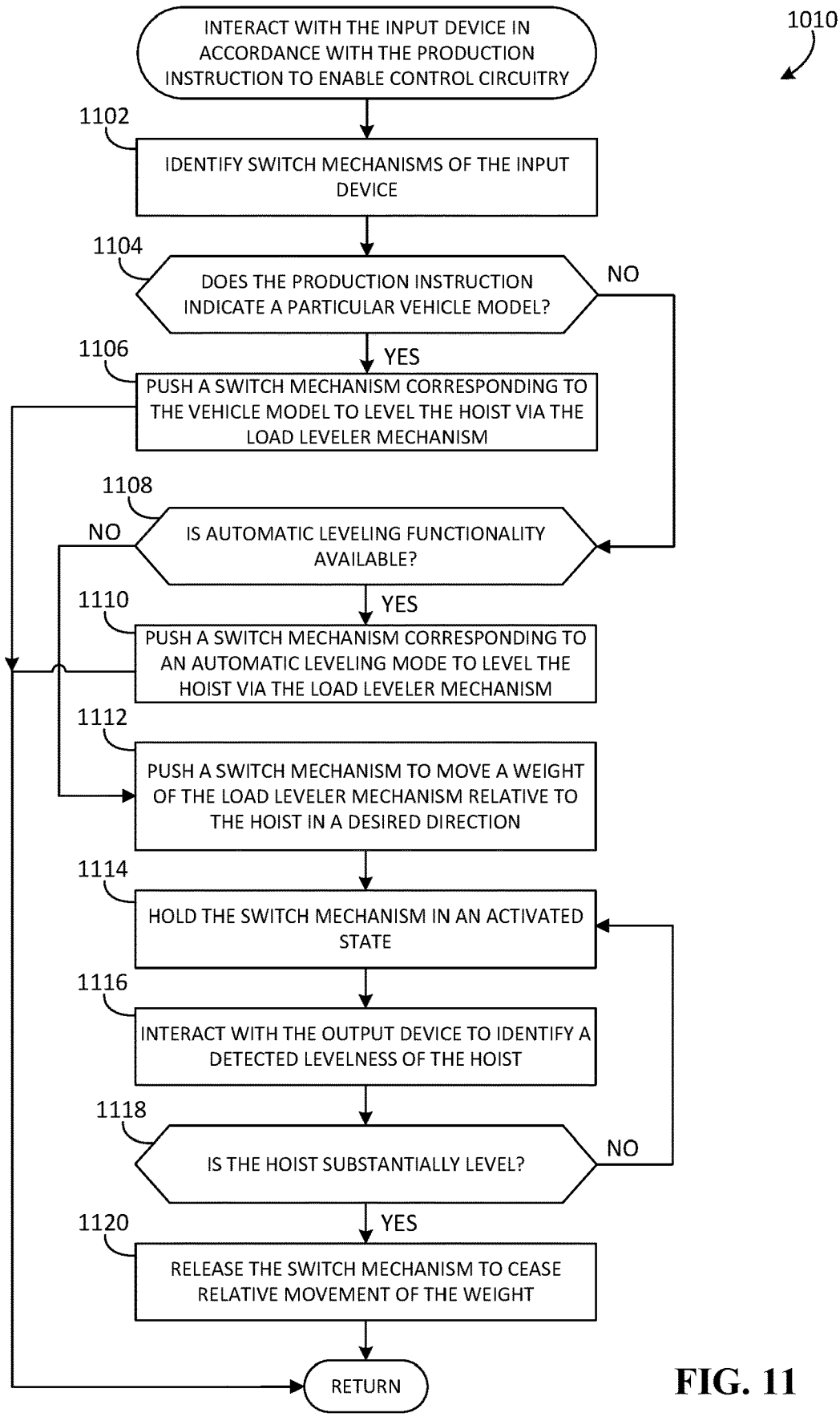

FIG. 11 is flowchart representative of an example method 1010 that can be executed to implement the aforementioned manufacturing system 100. The operations of block 1102, 1104, 1106, 1108, 1110, 1112, 1114, 1116, 1118, 1120 can be used to implement block 1010 of FIG. 10. In particular, the example method 1010 of FIG. 11 is effective in enabling or activating the control circuitry 114 and/or the control system 900 by interacting with at least one of the input device(s) 704, 706, 707, 708, 710, 711, 714, 716, 718, 720 in accordance with the primary production instruction. The example method 1010 of FIG. 11 begins by identifying switch mechanisms of the input device (block 1102). In some examples, the user(s) can identify (e.g., via visual inspection) one or more of the switch mechanism(s) 707, 708, 710, 711, 714, 716, 718, 720 shown in FIG. 7.

The example method 1010 of FIG. 11 also includes determining whether the production instruction indicates a particular vehicle model (block 1104). In some examples, the user(s) determine whether the primary production instruction indicates a particular vehicle model. In some examples, if a positive determination is provided (block 1104: YES), control of the example method 1010 of FIG. 11 proceeds to block 1106. On the other hand, in some examples, if a negative determination is provided (block 1104: NO), control of the example method 1010 of FIG. 11 proceeds to block 1108.

The example method 1010 of FIG. 11 also includes pushing a switch mechanism corresponding to the vehicle model to level the hoist via the load leveler mechanism (block 1106). In some examples, the user(s) push a switch mechanism 710, 711 of the first set of switch mechanisms 708 that corresponds to the vehicle model indicated by the primary production instruction to substantially level the hoist 102 via the load leveler mechanism 104. For example, if the primary production instruction indicates the first vehicle model, the user(s) can push the first switch mechanism 710 shown in FIG. 7, which causes the control system 900 to move, via the actuator 112, the primary weight 108 to the first target position 301 to substantially level the hoist 102 (e.g., while the hoist 102 is carrying the first vehicle module). In another example, if the primary production instruction indicates the second vehicle model, the user(s) can push the second switch mechanism 711 shown in FIG. 7, which causes the control system 900 to move, via the actuator 112, the primary weight 108 to the second target position to substantially level the hoist 102 (e.g., while the hoist 102 is carrying the second vehicle module).

In some examples, after performing the operation of block 1106, control of the example method 1010 returns to the example method 1000 of FIG. 10.

The example method 1010 of FIG. 11 also includes determining whether automatic leveling functionality is available (block 1108). In some examples, the user(s) determine whether automatic leveling functionality of the load leveler mechanism 104 is available. As previously described, the load leveler mechanism 104 can be provided with the first operating mode such as, for example, an automatic leveling mode. In some examples (e.g., where the visual indicator of the primary switch mechanism 707 includes an LED), the control system 900 of FIG. 9 is configured to illuminate the visual indicator of the primary switch mechanism 707 when the first operating mode is available for selection, which aids the user(s) in making a determination. If a positive determination is provided (e.g., the first operating mode is available for selection) (block 1108: YES), control of the example method 1010 of FIG. 11 proceeds to the block 1110. On the other hand, in some examples, if a negative determination is provided (e.g., the first operating mode is not available for selection) (block 1108: NO), control of the example method proceeds to block 1112.

The example method 1010 of FIG. 11 also includes pushing a switch mechanism corresponding to an automatic leveling mode to level the hoist via the load leveler mechanism (block 1110). In some examples, the user(s) can push the primary switch mechanism 707 shown in FIG. 7 to substantially level the hoist 102 via the load leveler mechanism 104. As previously described, the primary switch mechanism 707 corresponds to the first operating mode of the load leveler mechanism 104, and pushing the primary switch mechanism 707 causes the control system 900 to move, via the actuator 112, the primary weight 108 relative to the hoist 102 based on the sensor data 920, 922, 924 to substantially level the hoist 102. That is, in such examples, the control system 900 sets the load leveler mechanism 104 in the first operating mode and/or initiates the fully automatic leveling process.

In some examples, after performing the operation of block 1110, control of the example method 1010 returns to the example method 1000 of FIG. 10.

The example method 1010 of FIG. 11 also includes pushing a switch mechanism to move a weight of the load leveler mechanism relative to the hoist in a desired direction (block 1112). In some examples, the user(s) push a switch mechanism 716, 718 of the second set of switch mechanisms 714 to move the primary weight 108 relative to the hoist 102 in a desired direction. As previously described, the third switch mechanism 716 corresponds to the first direction 202 in which the primary weight 108 is movable relative to the hoist 102, and the fourth switch mechanism 718 corresponds to the second direction 204 in which the primary weight 108 is movable relative to the hoist 102. For example, pressing the third switch mechanism 716 causes the control system 900 to move, via the actuator 112, the primary weight 108 relative to the hoist 102 in the first direction 202 while the third switch mechanism 716 is held in an activated stated. On the other hand, pressing the fourth switch mechanism 718 causes the control system 900 to move, via the actuator 112, the primary weight 108 relative to the hoist 102 in the second direction 204 while the fourth switch mechanism 718 is held in an activated state.

The example method 1010 of FIG. 11 also includes holding the switch mechanism in an activated state (block 1114). In some examples, the user(s) can hold the third or fourth switch mechanism 716, 718 pressed at block 1112 in the activated state, which causes the control system 900 to continue moving, via the actuator 112, the primary weight 108 relative to the hoist 102 in a single direction (e.g., the first or second direction 202, 204).

The example method 1010 of FIG. 11 also includes interacting with the output device to identify a detected levelness of the hoist (block 1116). In some examples, the user(s) can interact with the output device(s) 118, 712 to identify a detected levelness of the hoist 102. As previously described, the control system 900 can detect, via the sensor(s) 120, 122, 124, the observed tilt angle 242, 304, 402 of the hoist 102 and present, via the output device 118, the observed tilt angle 242, 304, 402 to the user(s).

The example method 1010 of FIG. 11 also includes determining whether the hoist is substantially level (block 1118). In some examples, the user(s) can determine whether the hoist 102 is substantially level, for example, based on the detected levelness identified in connection with block 1116. If a positive determination is provided (e.g., the observed tilt angle 242, 304, 402 of the hoist 102 is substantially between the upper allowable tilt angle and the lower allowable tilt angle) (block 1118: YES), control of the example method 1010 of FIG. 11 proceeds to block 1120. On the other hand, in some examples, if a negative determination is provided (block 1118: NO), control of the example method 1010 of FIG. 11 returns to block 1114.

The example method 1010 of FIG. 11 also includes releasing the switch mechanism to cease relative movement of the weight (block 1120). In some examples, the user(s) can release the third or fourth switch mechanism 716, 718 held at blocks 1114, 1116, 1118 to cease relative movement of the primary weight 108 relative to the hoist 102. After performing the operation of block 1120, control of the example method 1010 of FIG. 11 returns to the example method 1000 of FIG. 10.

In this manner, the user(s) can interact with the input device(s) 116, 704, 706, 707, 708, 710, 711, 714, 716, 718, 720 in accordance with the primary production instruction to cause the control system 900 (including the control circuitry 114) to move, via the actuator 112, the primary weight 108 relative to the hoist 102 to adjust a levelness to the hoist 102.

Although the example method 1010 is described in connection with the flowchart of FIG. 11, one or more other methods of implementing the manufacturing system 100 may alternatively be used. For example, the order of execution of the blocks 1102, 1104, 1106, 1108, 1110, 1112, 1114, 1116, 1118, 1120 may be changed, and/or at least some operations of the blocks 1102, 1104, 1106, 1108, 1110, 1112, 1114, 1116, 1118, 1120 described may be changed, eliminated, or combined. In some examples, the method 1010 of FIG. 11 can include pushing a switch mechanism 707, 710, 711, 716, 718, 720 to cause the control system 900 (including the control circuitry 114) to change the load leveler mechanism 104 between the different operating modes thereof, for example, from the first operating mode to the second operating mode.

Flowcharts representative of example hardware logic or machine-readable instructions for implementing the example control system 900 of FIG. 9 are shown in FIGS. 12-16. The machine-readable instructions may be a program or portion of a program for execution by a processor such as the processor 1702 shown in the example processor platform 1700, which is discussed in greater detail below in connection with FIG. 17. The program may be embodied in software stored on a tangible machine-readable storage medium such as a CD-ROM, a floppy disk, a hard drive, or a memory associated with the processor 1702, but the entire program and/or parts thereof could be alternatively executed by a different device and/or embodied in firmware or dedicated hardware. Further, although the example program is described with reference to the flowcharts illustrated in FIGS. 12-16, many other methods of implementing the example control system 900 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 12-16 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example methods of FIGS. 12-16 may be implemented using coded instructions stored on a non-transitory machine-readable medium in which information is stored for any duration, which includes any type of computer or machine readable storage device or disk and excludes propagating signals and transmission media.

Figure 12:
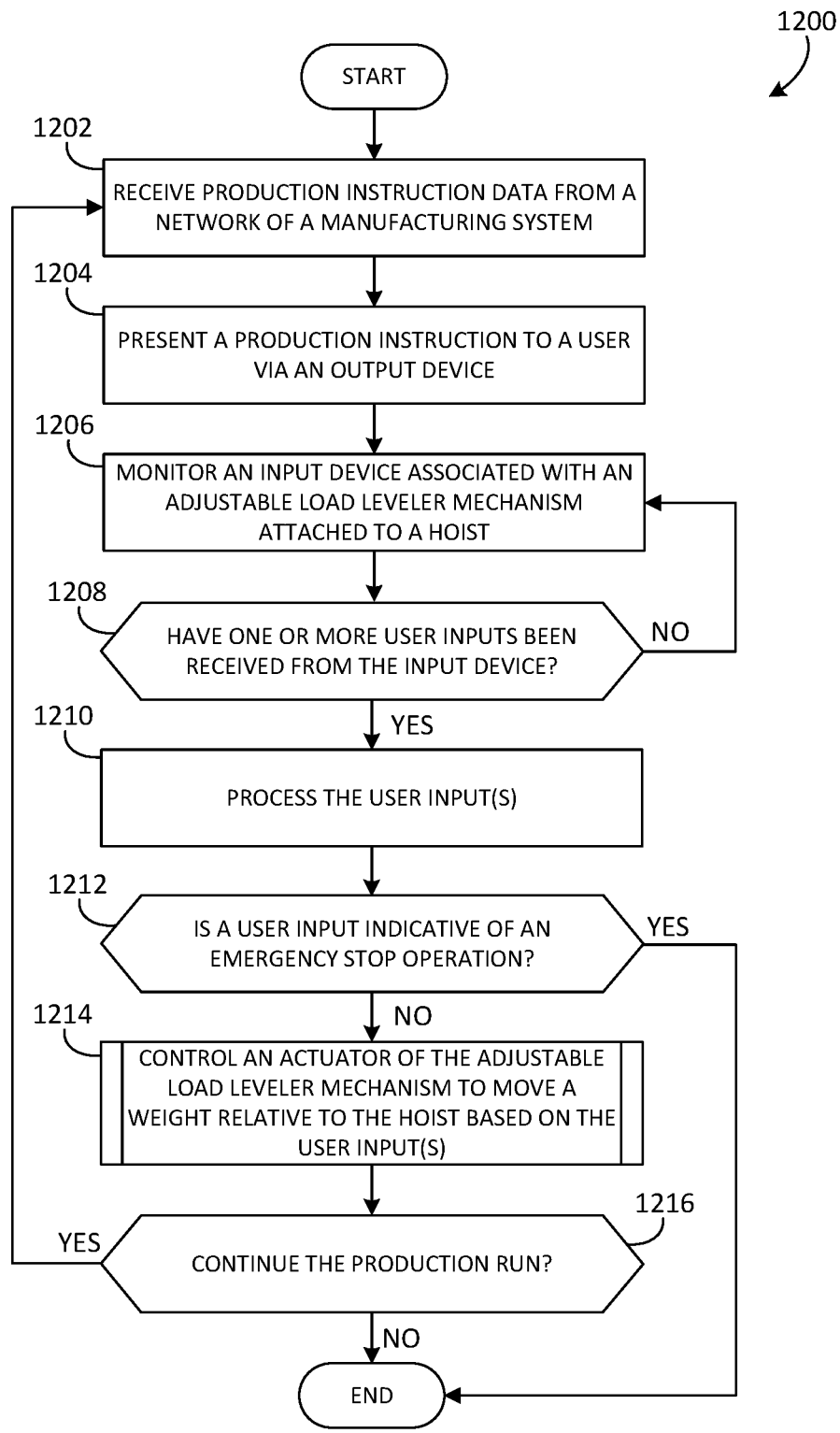
FIGS. 12-16 are flowcharts representative of example methods that can be executed to implement the example control system of FIG. 9.

FIG. 12 is a flowchart representative of an example method 1200 that can be executed to implement the example control system 900 of FIG. 9. The example method 1200 of FIG. 12 can be implemented using any of the adjustable load leveler mechanism 104 of FIGS. 1-6, the control circuitry 114 of FIGS. 1-4 and 7-9, and/or the external control circuitry 910 of FIG. 9.

The example method 1200 of FIG. 12 begins by receiving production instruction data from a network of a manufacturing system (block 1202). In some examples, the control system 900 of FIG. 9 receives (e.g., via the network interface 907) the production instruction data 932 from the network 134 of the manufacturing system 100. In such examples, the production instruction data 932 includes the primary production instruction associated with the manufacturing system 100.

The example method 1200 of FIG. 12 also includes presenting a production instruction to a user via an output device (block 1204). In some examples, the control system 900 of FIG. 9 presents (e.g., via the user interface 902) the primary production instruction received at block 1202 to the user(s) via the output device(s) 118, 712.

The example method 1200 of FIG. 12 also includes monitoring an input device associated with an adjustable load leveler mechanism attached to a hoist (block 1206). In some examples, the control system 900 of FIG. 9 monitors (e.g., via the user interface 902) any one or more (e.g., all) of (a) the input device 116, (b) the first operation box 704, (c) the second operation box 706, and/or (d) the switch mechanism(s) 707, 708, 710, 711, 714, 716, 718, 720. As previously described, the user interface 902 can receive the user input(s) 912 of FIG. 9, for example, during a production run of the manufacturing system 100.

The example method 1200 of FIG. 12 also includes determining whether one or more user inputs have been received from the input device (block 1208). In some examples, the control system 900 of FIG. 9 determines (e.g., via the user interface 902 and/or the adjustment engine 806) whether one or more of the user input(s) 912 have been received. If the control system 900 provides a positive determination (e.g., at least one of the user input(s) 912 is stored in the database 808) (block 1208: YES), control of the example method 1200 of FIG. 12 proceeds to the block 1210. On the other hand, in some examples, if the control system 900 provides a negative determination (block 1208: NO), control of the example method 1200 of FIG. 12 returns to block 1206. Additionally or alternatively at block 1208, the control system 900 can wait to receive at least one of the user input(s) 912.

The example method 1200 of FIG. 12 also includes processing the user input(s) (block 1210). In some examples, the control system 900 of FIG. 9 processes (e.g., via the adjustment engine 806) the user input(s) 912 received at block 1206. As previously described, the user input(s) 912 enable the control system 900 to determine when and/or how to the control the actuator 112 of the load leveler mechanism 104, for example, in a manner that provides levelness to the hoist 102. For example, the control system 900 can determine whether a latest one of the user input(s) 912 is indicative of a particular operating mode of the load leveler mechanism 104 such as the first operating mode, the second operating mode, or the third operating mode. In another example, the control system 900 can determine whether the latest one of the user input(s) 912 is indicative of a predefined position of the primary weight 108 such as one of the initial position 201, the first target position 301, the second target position, etc. Further, in another example, the control system 900 can determine whether the latest one of the user input(s) 912 is indicative of a predefined direction in which the primary weight 108 is movable such as one of the first direction 202 or the second direction 204.

The example method 1200 of FIG. 12 also includes determining whether a user input is indicative of an emergency stop operation (block 1212). In some examples, the control system 900 of FIG. 9 determines (e.g., via the user interface 902 and/or the adjustment engine 806) whether a latest one of the user input(s) 912 processed at block 1210 is indicative of the emergency stop operation of the load leveler mechanism 104. If the control system 900 provides a positive determination (e.g., a user pressed one of the emergency stop switch mechanism(s) 720) (block 1212: YES), the example method 1200 of FIG. 12 ends. On the other hand, if the control system 900 provides a negative determination (block 1212: NO), control of the example method 1200 of FIG. 12 proceeds to block 1214.

The example method 1200 of FIG. 12 also includes controlling an actuator of the adjustable load leveler mechanism to move a weight relative to the hoist based on the user input(s) (block 1214). In some examples, the control system 900 of FIG. 9 controls (e.g., via the adjustment engine 806 and/or the actuator interface 906) the actuator 112 to move the primary weight 108 relative to the hoist 102 based on the user input(s) 912 processed at block 1210. Further, depending on the user input(s) 912, the control system 900 can receive and/or utilize the sensor data 920, 922, 924 in connection with operating the actuator 112. In such examples, based on the user input(s) 912 and/or the sensor data 920, 922, 924, the control system 900 controls the actuator 112 to move the primary weight 108 away from the first position 201 shown in FIG. 2 toward a different position of the primary weight 108 such as, for example, the first target position 301 shown in FIGS. 3 and 4 or the second target position previously described. In this manner, the control system 900 advantageously uses the adjustable load leveler mechanism 104 to substantially level the hoist 102 and/or otherwise change the hoist 102 from the second state to the first state (e.g., see FIG. 4). In some examples, any one or more (e.g., all) of the example processes of FIGS. 13-15 can be executed to implement the control system 900 to provide such control of the actuator 112, as discussed further below.

The example method 1200 of FIG. 12 also includes determining whether to continue the production run (block 1216). In some examples, the control system 900 of FIG. 9 is configured to determine whether to continue the production run associated with the manufacturing system 100. If the control system 900 provides a positive determination (block 1216: YES), control of the example method 1200 of FIG. 12 returns to block 1202. On the other hand, in some examples, if the control system 900 provides a negative determination (block 1216: NO), the example method 1200 of FIG. 12 ends.

Although the example method 1200 is described in connection with the flowchart of FIG. 12, one or more other methods of implementing the control system 900 may alternatively be used. For example, the order of execution of the blocks 1202, 1204, 1206, 1208, 1210, 1212, 1214, 1216 may be changed, and/or at least some operations of the blocks 1202, 1204, 1206, 1208, 1210, 1212, 1214, 1216 described may be changed, eliminated, or combined. For example, the operations of blocks 1206, 1208, 1210, 1212 can be repeated and executed independent of and/or simultaneously with the operation of block 1214, which allows the control system 900 to effectively obtain and process new or updated user inputs from the input device(s) 116, 704, 706, 708. Further, as another example, the control system 900 can obtain and/or collect (e.g., via the sensor interface 904) at least some of the sensor data 920, 922, 924 during execution of any or all of the blocks 1202, 1204, 1206, 1208, 1210, 1212, 1214, 1216.

Figure 13:
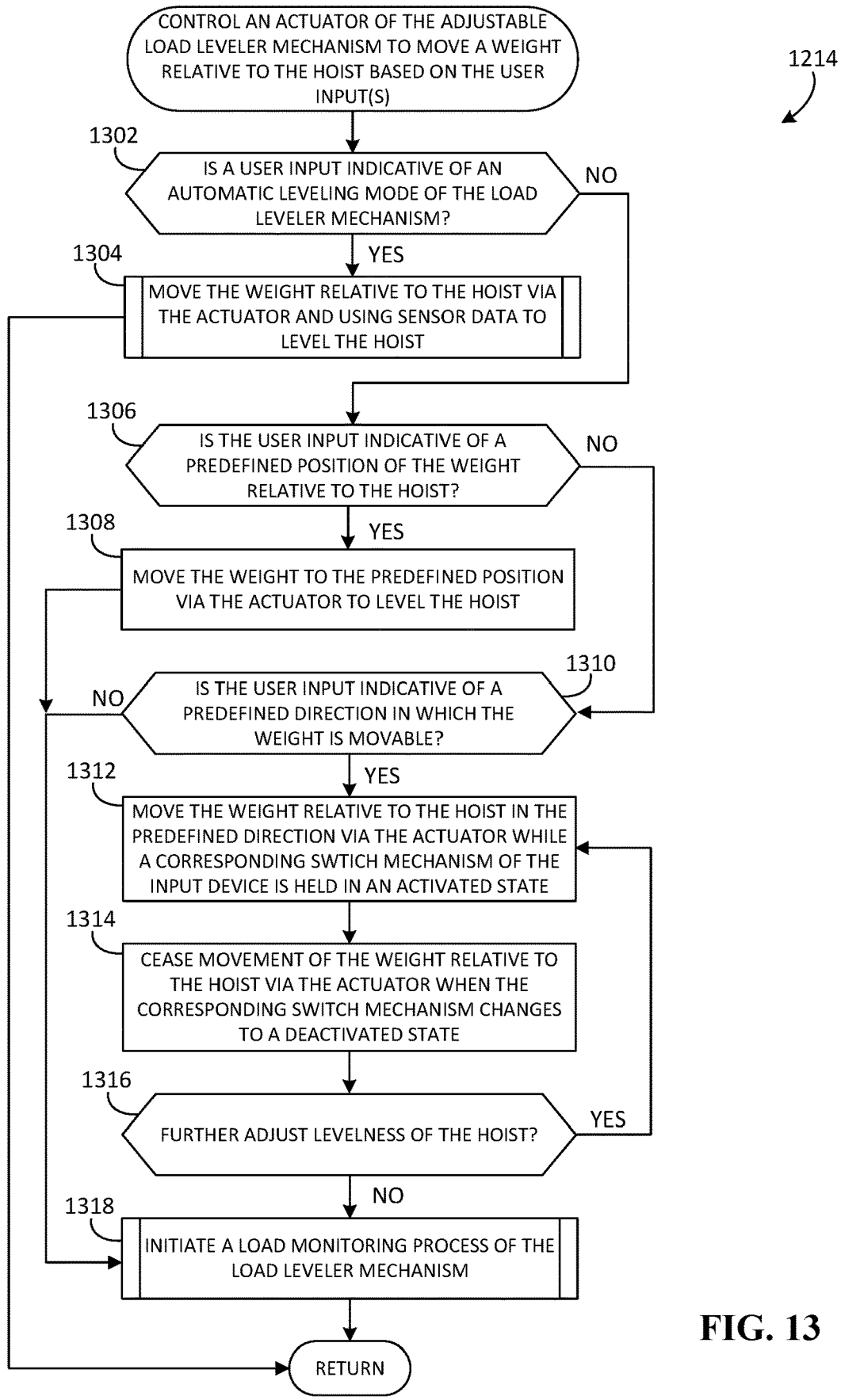

FIG. 13 is a flowchart representative of an example method 1214 that may be executed to implement the example control system 900 of FIG. 9. The example method 1214 of FIG. 13 can be implemented using any of the adjustable load leveler mechanism 104 of FIGS. 1-6, the control circuitry 114 of FIGS. 1-4 and 7-9, and/or the external control circuitry 910 of FIG. 9. Example operations of blocks 1302, 1304, 1306, 1308, 1310, 1312, 1314, 1316, 1318 can be used to implement block 1214 of FIG. 12. In particular, the example method 1214 of FIG. 13 is effective in controlling the actuator 112 to move the primary weight 108 relative to the hoist 102 based on the user input(s) 912 and, in some examples, the sensor data 920, 922, 924.

The example method 1214 of FIG. 13 begins by determining whether a user input is indicative of an automatic leveling mode of the load leveler mechanism (block 1302). In some examples, the control system 900 of FIG. 9 determines (e.g., via the user interface 902 and/or the adjustment engine 806) whether a latest one of the user input(s) 912 processed at block 1210 of FIG. 12 is indicative of the first operating mode of the load leveler mechanism 104 or initiation thereof. If the control system 900 provides a positive determination (e.g., the latest one of the user input(s) 912 indicates the first operating mode or initiation thereof to the control system 900) (block 1302: YES), control of the example method 1214 of FIG. 13 proceeds to block 1304. On the other hand, in some examples, if the control system 900 provides a negative determination (block 1302: NO), control of the example method 1214 of FIG. 13 proceeds to block 1306.

The example method 1214 of FIG. 13 also includes moving the weight relative to the hoist via the actuator and using sensor data to level the hoist (block 1304). In some examples, the control system 900 of FIG. 9 moves (e.g., via the adjustment engine 806 and/or the actuator interface 906) the primary weight 108 relative to the hoist 102 via the actuator 112 and the using the sensor data 920, 922, 924 to substantially level the hoist 102. For example, at block 1304, the control system 900 sets the load leveler mechanism 104 in the first operating mode and/or initiates the fully automatic leveling process. Accordingly, in such examples, the control system 900 can execute (e.g., via the primary processor 128) the feedback application 130 during such positional adjustments of the primary weight 108.

In some examples, after performing the operation of block 1304, control of the example method 1214 of FIG. 13 returns to a calling function such as the example method 1200 of FIG. 12.

The example method 1214 of FIG. 13 also includes determining whether the user input is indicative of a predefined position of the weight relative to the hoist (block 1306). In some examples, the control system 900 of FIG. 9 determines (e.g., via the user interface 902 and/or the adjustment engine 806) whether the latest one of the user input(s) 912 is indicative of a predefined position of the primary weight 108 such as, for example, the first target position 301 shown in FIGS. 3 and 4 or the second target position previously described. If the control system 900 provides a positive determination (e.g., the latest one of the user input(s) 912 indicates the first or second target position to the control system 900) (block 1306: YES), control of the example method 1214 of FIG. 13 proceeds to the block 1308. On the other hand, in some examples, if the control system 900 provides a negative determination (block 1306: NO), control of the example method proceeds to block 1310.

The example method 1214 of FIG. 13 also includes moving the weight to the predefined position via the actuator to substantially level the hoist (block 1308). In some examples, the control system 900 of FIG. 9 moves (e.g., via the adjustment engine 806 and/or the actuator interface 906) the primary weight 108 to the predefined positioned indicated at block 1306 via the actuator 112 to substantially level the hoist 102. For example, the control system 900 moves, via the actuator 112, the primary weight 108 from the first position 201 shown in FIG. 2 to the first target position 301 shown in FIGS. 3 and 4.

In some examples, after performing the operation of block 1308, control of the example method 1214 of FIG. 13 proceeds to block 1318.

The example method 1214 of FIG. 13 also includes determining whether the user input is indicative of a predefined direction in which the weight is movable (block 1310). In some examples, the control system 900 of FIG. 9 determines (e.g., via the user interface 902 and/or the adjustment engine 806) whether the latest one of the user input(s) 912 is indicative of a predefined direction in which the primary weight 108 is movable such as, for example, one of the first direction 202 or the second direction 204. If the control system 900 provides a positive determination (e.g., the latest one of the user input(s) 912 indicates the first or second direction 202, 204 to the control system 900) (block 1310: YES), control of the example method 1214 of FIG. 13 proceeds to block 1312. On the other hand, in some examples, if the control system 900 provides a negative determination (block 1310: NO), control of the example method proceeds to block 1318.

The example method 1214 of FIG. 13 also includes moving the weight relative to the hoist in the predefined direction via the actuator while a corresponding switch mechanism of the input device is held in an activated state (block 1312). In some examples, the control system 900 of FIG. 9 moves (e.g., via the adjustment engine 806 and/or the actuator interface 906) the primary weight 108 relative to the hoist 102 in the first direction 202 via the actuator 112 while the third switch mechanism 716 is held in an activated state thereof. Additionally or alternatively, in some examples, the control system 900 moves the primary weight 108 relative to the hoist 102 in the second direction 204 via the actuator 112 while the fourth switch mechanism 718 is held in an activated state thereof.

The example method 1214 of FIG. 13 also includes ceasing movement of the weight relative to the hoist via the actuator when the corresponding switch mechanism changes to a deactivated state (block 1314). In some examples, the control system 900 of FIG. 9 ceases (e.g., via the actuator interface 906) movement of the primary weight 108 relative to the hoist 102 via the actuator 112 when the third switch mechanism 716 changes to a deactivated state thereof (i.e., changes from the activated state to the deactivated state). Additionally or alternatively, in some examples, the control system 900 ceases movement of the primary weight 108 relative to the hoist 102 when the fourth switch mechanism 718 changes from the activated state thereof to a deactivated state thereof.

The example method 1214 of FIG. 13 also includes determining whether to further adjust levelness of the hoist (block 1316). In some examples, the control system 900 of FIG. 9 determines (e.g., via the user interface 902 and/or the adjustment engine 806) whether to further adjust levelness of the hoist 102. If the control system 900 provides a positive determination (block 1316: YES), control of the example method 1214 of FIG. 13 returns to block 1312. In such examples, the control system 900 can wait for a predetermined time interval (e.g., a relatively short time interval) during which the control system 900 monitors the input device(s) for subsequent input data. Accordingly, in such examples, the control system 900 provides the positive determination in response to detecting that a latest user input 912 is indicative of the first direction 202 or the second direction 204 during the predetermined time interval. On the other hand, in some examples, if the control system 900 provides a negative determination (block 1316: NO), control of the example method 1214 of FIG. 13 proceeds to block 1318.

The example method 1214 of FIG. 13 also includes initiating a load monitoring process of the load leveler mechanism (block 1318). In some examples, the control system 900 of FIG. 9 initiates a load monitoring process of the load leveler mechanism 104, which facilitates preparing the hoist 102 for a subsequent object of interest. After completing the operation of block 1318, control of the example method 1214 of FIG. 13 returns to a calling function such as the example method 1200 of FIG. 12.

Although the example method 1214 is described in connection with the flowchart of FIG. 13, one or more other methods of implementing the example control system 900 may alternatively be used. For example, the order of execution of the blocks 1302, 1304, 1306, 1308, 1310, 1312, 1314, 1316, 1318 may be changed, and/or at least some operations of the blocks 1302, 1304, 1306, 1308, 1310, 1312, 1314, 1316, 1318 described may be changed, eliminated, or combined.

Figure 14:
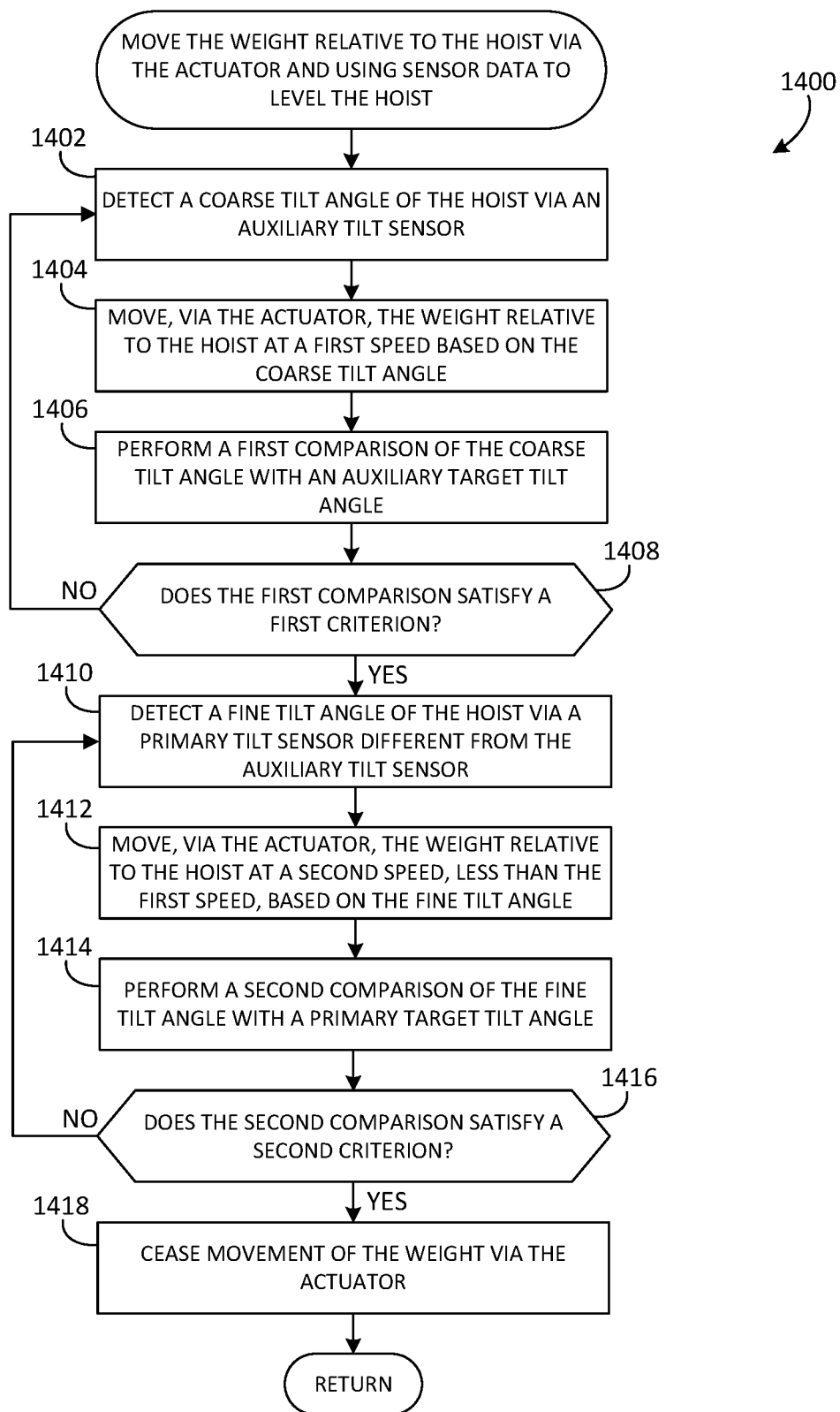

FIG. 14 is a flowchart representative of an example method 1400 that may be executed to implement the example control system 900 of FIG. 9. The example method 1400 of FIG. 14 can be implemented using any of the adjustable load leveler mechanism 104 of FIGS. 1-6, the control circuitry 114 of FIGS. 1-4 and 7-9, and/or the external control circuitry 910 of FIG. 9. Example operations of blocks 1402, 1404, 1406, 1408, 1410, 1412, 1414, 1416, 1418 can be used to implement block 1304 of FIG. 13 and, in some examples, block 1608 of FIG. 16. In particular, the example method 1400 of FIG. 14 is effective in moving the primary weight 108 relative to the hoist 102 via the actuator 112 and using at least some or all of the sensor data 920, 922, 924 to level the hoist 102.

The example method 1214 of FIG. 14 begins by detecting a coarse tilt angle of the hoist via an auxiliary tilt sensor (block 1402). In some examples, the control system 900 of FIG. 9 detects (e.g., via the parameter detector 802) the coarse tilt angle of the hoist 102 via the auxiliary tilt sensor 124.

The example method 1400 of FIG. 14 also includes moving, via the actuator, the weight relative to the hoist at a first speed based on the coarse tilt angle (block 1404). In some examples, the control system 900 of FIG. 9 moves, via the actuator 112, the primary weight 108 relative to the hoist 102 at the first speed (e.g., a relatively high speed) based on the coarse tilt angle detected at block 1402.

The example method 1400 of FIG. 14 also includes performing a first comparison of the coarse tilt angle with an auxiliary target tilt angle (block 1406). In some examples, the control system 900 of FIG. 9 performs (e.g., via the comparator 804) a first comparison of the coarse tilt angle detected at block 1402 with the auxiliary target tilt angle of the target angle data 926.

The example method 1400 of FIG. 14 also includes determining whether the first comparison satisfies a first criterion (block 1408). In some examples, the control system 900 of FIG. 9 determines (e.g., via the comparator 804 and/or the adjustment engine 806) whether the first comparison performed at block 1406 satisfies the first criterion of the target angle data 926. If the control system 900 provides a positive determination (e.g., an absolute value of the coarse tilt angle is less than or equal to the absolute value of the auxiliary target tilt angle) (block 1408: YES), control of the example method 1400 of FIG. 14 proceeds to block 1410. On the other hand, in some examples, if the control system 900 provides a negative determination (e.g., the absolute value of the coarse tilt angle is greater than the absolute value of the auxiliary target tilt angle) (block 1408: NO), control of the example method 1400 of FIG. 14 returns to block 1402.

The example method 1304 of FIG. 14 also includes detecting a fine tilt angle of the hoist via a primary tilt sensor different from the auxiliary tilt sensor (block 1410). In some examples, the control system 900 of FIG. 9 detects (e.g., via the parameter detector 802) the fine tilt angle of the hoist 102 via the primary tilt sensor 122.

The example method 1400 of FIG. 14 also includes moving, via the actuator, the weight relative to the hoist at a second speed, less than the first speed, based on the fine tilt angle detected at block 1410 (block 1412). In some examples, the control system 900 of FIG. 9 moves, via the actuator 112, the primary weight 108 relative to the hoist 102 at the second speed (e.g., a relatively low speed) based on the fine tilt angle detected at block 1410. As previously described, the second speed is less than the first speed.

Accordingly, in some examples, the control system 900 is configured to move, via the actuator 112, the primary weight 108 (a) at the first speed when the coarse tilt angle (or the absolute value thereof) is greater than the auxiliary target tilt angle (or the absolute value thereof) and (b) at the second speed when the coarse tilt angle (or the absolute value thereof) is less than or equal to the auxiliary target tilt angle (or the absolute value thereof).

The example method 1400 of FIG. 14 also includes performing a second comparison of the fine tilt angle with a primary target tilt angle (block 1414). In some examples, the control system 900 of FIG. 9 performs (e.g., via the comparator 804) a second comparison of the fine tilt angle detected at block 1410 with the primary target tilt angle of the target angle data 926.

The example method 1400 of FIG. 14 also includes determining whether the second comparison satisfies a second criterion (block 1416). In some examples, the control system 900 of FIG. 9 determines (e.g., via the comparator 804 and/or the adjustment engine 806) whether the second comparison performed at block 1414 satisfies the second criterion of the target angle data 926. If the control system 900 provides a positive determination (e.g., an absolute value of the fine tilt angle is less than or equal to the primary target tilt angle) (block 1416: YES), control of the example method 1400 of FIG. 14 proceeds to block 1418. On the other hand, in some examples, if the control system 900 provides a negative determination (e.g., the absolute value of the fine tilt angle is greater than the primary target tilt angle) (block 1416: NO), control of the example method 1400 of FIG. 14 returns to block 1410.

The example method 1400 of FIG. 14 also includes ceasing movement of the weight via the actuator (block 1418). In some examples, the control system 900 of FIG. 9 ceases (e.g., via the actuator interface 906) movement of the primary weight 108 via the actuator 112, which leaves the primary weight 108 substantially in a target position (e.g., the first target position 301) associated with providing levelness to the hoist 102.

Accordingly, in some examples, the control system 900 is configured to move, via the actuator 112, the primary weight 108 at the second speed when the fine tilt angle (or the absolute value thereof) is greater than the primary target tilt angle (or the absolute value thereof). Further, in such examples, the control system 900 is also configured cease movement, via the actuator 112, of the primary weight 108 when the fine tilt angle is less than or equal to the primary target tilt angle.

Although the example method 1214 is described in connection with the flowchart of FIG. 14, one or more other methods of implementing the example control system 900 may alternatively be used. For example, the order of execution of the blocks 1402, 1404, 1406, 1408, 1410, 1412, 1414, 1416, 1418 may be changed, and/or at least some operations of the blocks 1402, 1404, 1406, 1408, 1410, 1412, 1414, 1416, 1418 described may be changed, eliminated, or combined.

Figure 15:
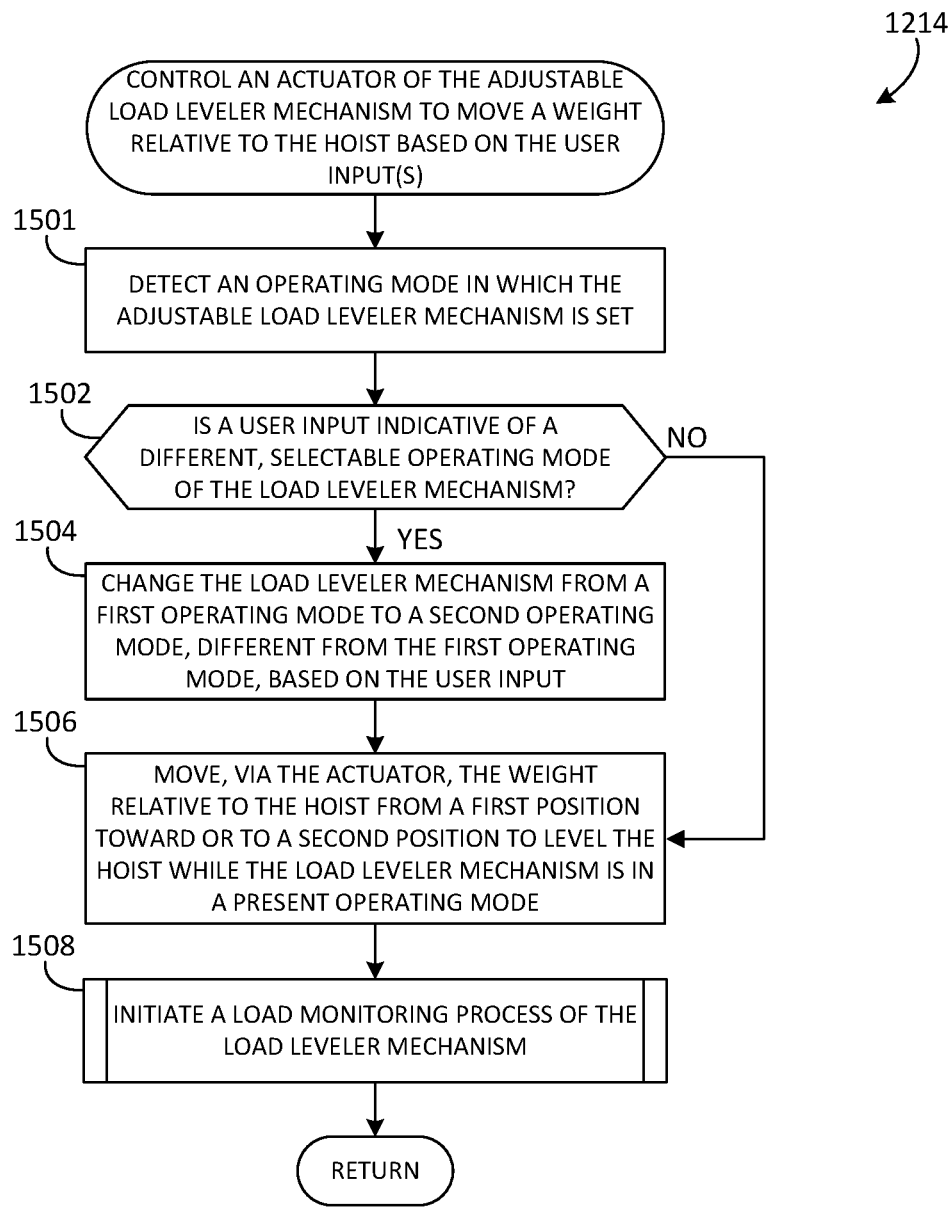

FIG. 15 is a flowchart representative of an example method 1214 that may be executed to implement the example control system 900 of FIG. 9. The example method 1214 of FIG. 15 can be implemented using any of the adjustable load leveler mechanism 104 of FIGS. 1-6, the control circuitry 114 of FIGS. 1-4 and 7-9, and/or the external control circuitry 910 of FIG. 9. Example operations of blocks 1501, 1502, 1504, 1506, 1508, can be used to implement block 1214 of FIG. 12. In particular, the example method 1214 of FIG. 15 is effective in controlling the actuator 112 to move the primary weight 108 relative to the hoist 102 based on the user input(s) 912 and, in some examples, the sensor data 920, 922, 924.

The example method 1214 of FIG. 15 begins by detecting an operating mode in which the adjustable load leveler mechanism is set (block 1501). In some examples, the control system 900 of FIG. 9 detects an operating mode (i.e., a present operating mode) in which the adjustable load leveler mechanism 104 is set. For example, for example, the control system 900 can detect that the load leveler mechanism 104 is set in one of the first operating mode, the second operating mode, or the third operating mode.

The example method 1214 of FIG. 15 also includes determining whether a user input is indicative of a different, selectable operating mode of the load leveler mechanism (block 1502). In some examples, the control system 900 of FIG. 9 determines (e.g., via the user interface 902 and/or the adjustment engine 806) whether a latest one of the user input(s) 912 processed at block 1210 of FIG. 12 is indicative of a different, selectable operating mode of the load leveler mechanism 104. That is, the control system 900 can determine whether the indicated selectable operating mode is different from the present operating mode of the load leveler mechanism 104. For example, the control system 900 determines that the latest one of the user input(s) 912 is indicative of the second operating mode of the load leveler mechanism 104 while the load leveler mechanism 104 is set to or in the first operating mode. In other words, at block 1502, the control system 900 determines whether the latest one of the user input(s) 912 is indicative of changing the operating mode of the load leveler mechanism 104.

If the control system 900 provides a positive determination (block 1502: YES), control of the example method 1214 of FIG. 15 proceeds to block 1504. On the other hand, in some examples, if the control system 900 provides a negative determination (block 1502: NO), control of the example method proceeds to block 1506. In such examples, the control system 900 leaves the load leveler mechanism 104 in the present operating mode, and then proceeds to control the actuator 112 while the load leveler mechanism 104 is in the present operating mode.

The example method 1214 of FIG. 15 also includes changing the load leveler mechanism from a first operating mode to a second operating mode, different from the first operating mode, based on the user input (block 1504). In some examples, the control system 900 of FIG. 9 changes (e.g., via the actuator interface 906) the load leveler mechanism 104 from the first operating mode to the second operating mode based on the latest one of the user input(s) 912. Of course, in addition or alternatively to such a mode change, the control system 900 can provide one or more different mode changes for the load leveler mechanism 104. For example, the control system 900 can change the load leveler mechanism 104 from (a) the first operation mode to the third operating mode, (b) the second operating mode to the third operating mode, (c) the third operating mode to the second operating mode, (d) the third operating mode to the first operating mode, (e) etc., and/or (f) any other suitable mode change.

The example method 1214 of FIG. 15 also includes moving, via the actuator, the weight relative to the hoist from a first position toward or to a second position to level the hoist while the load leveler mechanism is in a present operating mode (block 1506). In some examples, the control system 900 of FIG. 9 moves (e.g., via the actuator interface 906) the primary weight 108 relative to the hoist 102 from the initial position 201 toward or to the first target position 301 to level the hoist 102 while the load leveler mechanism 104 is in one of the first, second, or third operating mode.

The example method 1214 of FIG. 15 also includes initiating a load monitoring process of the load leveler mechanism (block 1508). In some examples, the control system 900 of FIG. 9 initiates the load monitoring process of the load leveler mechanism 104, which facilitates preparing the hoist 102 for a subsequent object of interest. After completing the operation of block 1508, control of the example method 1214 of FIG. 15 returns to a calling function such as the example method 1200 of FIG. 12

Although the example method 1214 is described in connection with the flowchart of FIG. 15, one or more other methods of implementing the example control system 900 may alternatively be used. For example, the order of execution of the blocks 1501, 1502, 1504, 1506, 1508 may be changed, and/or at least some operations of the blocks 1501, 1502, 1504, 1506, 1508 described may be changed, eliminated, or combined.

Figure 16:
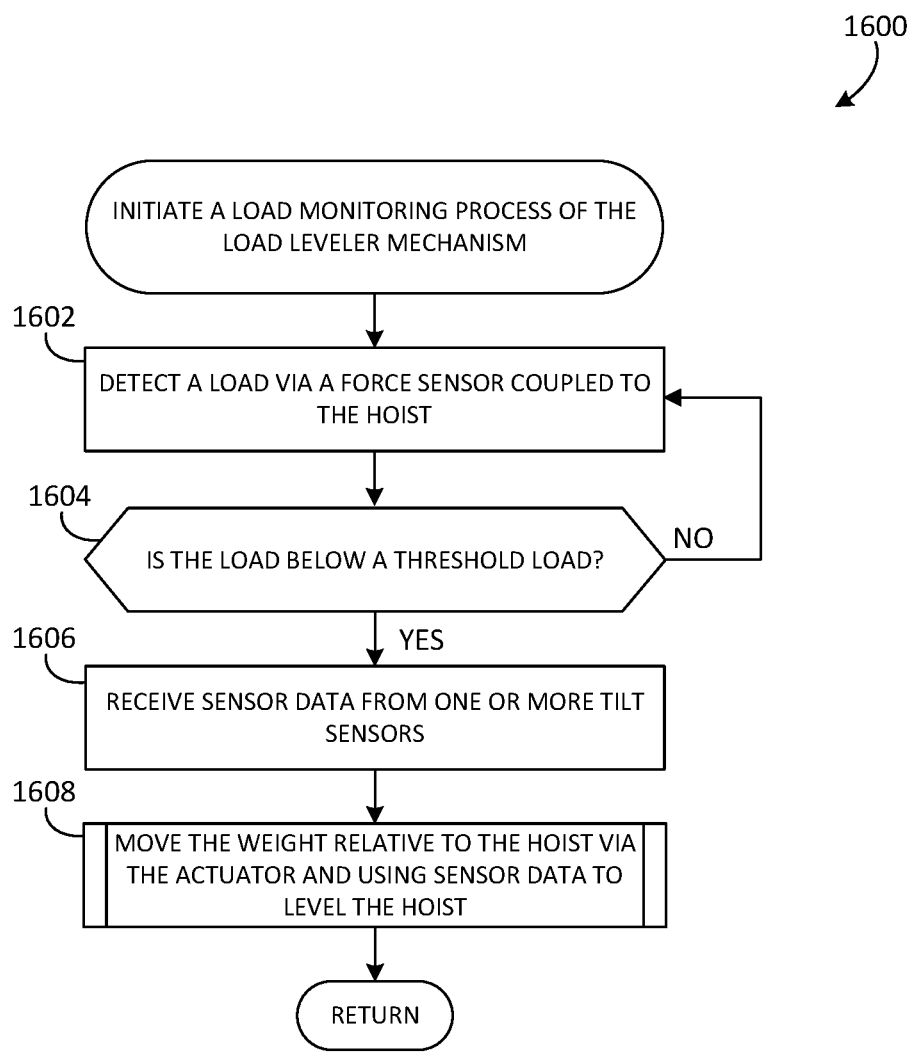

FIG. 16 is a flowchart representative of an example method 1600 that may be executed to implement the example control system 900 of FIG. 9. The example method 1600 of FIG. 16 can be implemented using any of the adjustable load leveler mechanism 104 of FIGS. 1-6, the control circuitry 114 of FIGS. 1-4 and 7-9, and/or the external control circuitry 910 of FIG. 9. Example operations of blocks 1602, 1604, 1606, 1608 can be used to implement block 1318 of FIG. 13 and/or block 1508 of FIG. 15. In particular, the example method 1600 of FIG. is effective in initiating a load monitoring process of the load leveler mechanism 104 in which the control system 900 controls the actuator 112 in response to a sudden detected load change associated with the hoist 102.

The example method 1600 of FIG. 16 begins by detecting a load via a force sensor coupled to the hoist (block 1602). In some examples, the control system 900 of FIG. 9 detects (e.g., via the parameter detector 802) the load associated with the hoist 102 via the force sensor 126. The detected load can be a load carried by the hoist 102, a weight of the hoist 102, or a combination thereof.

The example method 1600 of FIG. 16 also includes determining whether the load is below a threshold load (block 1604). In some examples, the control system 900 of FIG. 9 determines (e.g., via the comparator 804) whether the load detected at block 1602 is below a threshold load. If the control system 900 provides a positive determination (block 1602: YES), control of the example method 1600 of FIG. 16 proceeds to block 1606. On the other hand, in some examples, if the control system 900 provides a negative determination (block 1602: NO), control of the example method 1600 of FIG. 16 returns to block 1602. That is, in such examples, the control system 900 can monitor the detected load for a substantial change therein.

The example method 1600 of FIG. 16 also includes receiving sensor data from one or more tilt sensors (block 1606). In some examples, the control system 900 of FIG. 9 receives (e.g., via the sensor interface 904) at least some or all of the sensor data 920, 922, 924 shown in FIG. 9 from the primary tilt sensor 122 and/or the auxiliary tilt sensor 124.

The example method 1600 of FIG. 16 also includes moving the weight relative to the hoist via the actuator and using sensor data to level the hoist (block 1608). In some examples, the control system 900 of FIG. 9 moves (e.g., via the adjustment engine 806 and/or the actuator interface 906) the primary weight 108 relative to the hoist 102 via the actuator 112 and the using the sensor data 920, 922, 924 received at block 1606 to substantially level the hoist 102. For example, at block 1608, the control system 900 sets the load leveler mechanism 104 in the first operating mode and/or initiates the fully automatic leveling process. Accordingly, in such examples, the control system 900 can execute (e.g., via the primary processor 128) the feedback application 130 during such positional adjustments of the primary weight 108.

Although the example method 1600 is described in connection with the flowchart of FIG. 16, one or more other methods of implementing the example control system 900 may alternatively be used. For example, the order of execution of the blocks 1602, 1604, 1606, 1608 may be changed, and/or at least some operations of the blocks 1602, 1604, 1606, 1608 described may be changed, eliminated, or combined.

Figure 17:
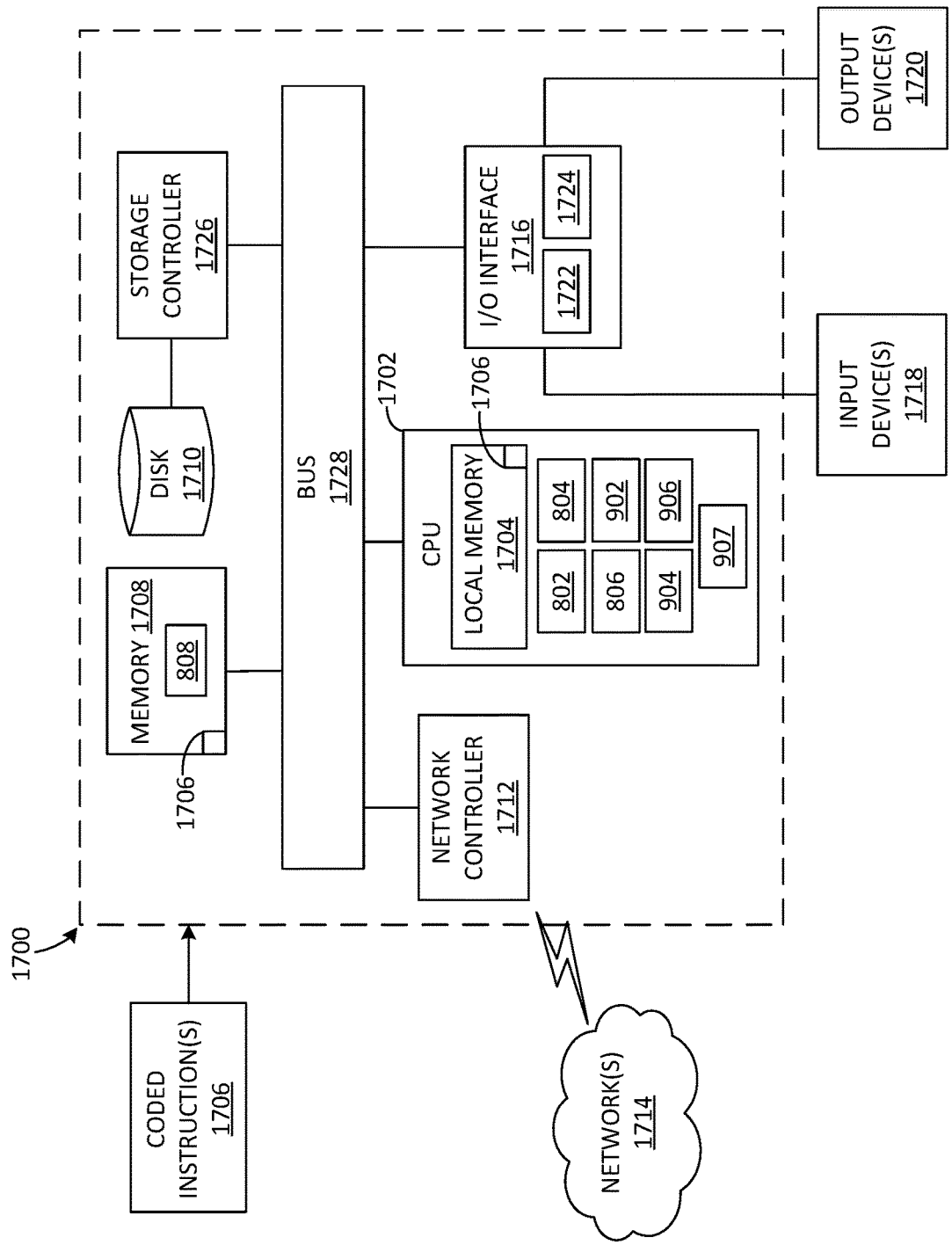
FIG. 17 is a block diagram of an example processor platform structured to execute instructions to carry out the methods of FIGS. 12-16 and/or, more generally, to implement the example control system of FIG. 9.

FIG. 17 is a block diagram of an example processor platform 1700 structured to execute instructions to carry out the methods of FIGS. 12-16 and/or, more generally, to implement the control system 900 of FIG. 9. For example, the processor platform 1700 can be a personal computer, a server, a mobile device (e.g., a cell phone, a smart phone, a tablet, etc.) or any other type of computing device. According to the illustrated example of FIG. 17, the processor platform 1700 includes a central processing unit (CPU) 1702 (sometimes referred to as a processor), which is hardware (e.g., one or more integrated circuits, logic circuits, microprocessors, etc.). The CPU 1702 of FIG. 17 includes a local memory 1704 such as, for example, a cache. In some examples, the CPU 1702 of FIG. 17 corresponds to the primary processor 128 of FIGS. 1 and 8. In the example of FIG. 17, the CPU 1702 implements the example parameter detector 802, the example comparator 804, the example adjustment engine 806, the example user interface 902, the example sensor interface 904, the example actuator interface 906, and the example network interface 907.

Coded instruction(s) 1706 to implement the methods of FIGS. 12-16 may be stored in a main memory 1708 of the processor platform 1700. The memory 1708 may include a volatile memory (e.g., random access memory device(s) such as Dynamic Random Access Memory (DRAM)) and a non-volatile memory (e.g., flash memory). In the example of FIG. 17, the main memory 1708 implements the example database 808. Such processes and/or instructions may also be stored on a storage medium disk 1710 associated with the processor platform 1700, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 1700 communicates, such as a server or computer for example.

Further, the claimed advancements may be provided as a utility application, background daemon, or component of an operating system, or combination thereof, executing in conjunction with the CPU 1702 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processor platform 1700 may be realized by various circuitry elements, known to those skilled in the art. For example, the CPU 1702 may be a Xenon or Core processor from Intel of America or an Opteron processor from AMD of America, or may be other processor types that would be recognized by one of ordinary skill in the art. Alternatively, the CPU 1702 may be implemented on an FPGA, ASIC, PLD or using discrete logic circuits, as one of ordinary skill in the art would recognize. Further, the CPU 1702 may be implemented as multiple processors cooperatively working in parallel to perform the instructions of the inventive processes described above.

In some examples, the processor platform 1700 of FIG. 17 also includes a network controller 1712 such as, for example, an Intel Ethernet PRO network interface card from Intel Corporation of America for interfacing with one or more networks 1714. As can be appreciated, the network(s) 1714 can be one or more public networks (e.g., the Internet), private networks (e.g., a LAN, a WAN, etc.) and/or subnetworks (e.g., a public switched telephone network (PSTN), an integrated services digital network (ISDN), etc.). The network(s) 1714 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 1700 of FIG. 17 includes a general purpose I/O interface circuit 1716 that interfaces and/or otherwise communicates with one or more input devices 1718 and/or one or more output devices 1720. The I/O interface circuit 1716 of FIG. 17 may be implemented as an Ethernet interface, a universal serial bus (USB), a PCI express interface, and/or any other type of standard interface.

The input devices 1718 are connected to the I/O interface circuit 1716 and may include, for example, a keyboard, a mouse, a touchscreen, a button, a microphone, a voice recognition system, a camera, and/or any other suitable device(s) for enabling a user to input data and/or commands to the CPU 1702.

The output device(s) 1720 are also connected to the I/O interface circuit 1716 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit 1716 includes a display controller 1722 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 1724 such as, for example, Sound Blaster X-Fi Titanium from Creative, to interface with a speaker and/or a microphone.

The processor platform 1700 of FIG. 17 also includes a general purpose storage controller 1726 that connects the storage medium disk 1710 with a communication bus 1728. The storage controller 1726 may also control access to the memory 1708. The communication bus 1728 of FIG. 17 may be an ISA, EISA, VESA, PCI, etc. for interconnecting all of the components of the processor platform 1700. For example, the CPU 1702 communicates with the main memory 1708 via the bus 1728.

It will be appreciated that the adjustable load leveler apparatus and related methods for use with automotive manufacturing systems disclosed in the foregoing description provide numerous advantages. Examples disclosed herein provide an efficient, low mass, and low cost solution to advantageously level one or more hoist. Some disclosed examples provide a load leveler mechanism for a hoist that, when implemented in a manufacturing environment, substantially improves manufacturing productivity as well as plant safety.

Although certain example systems, apparatus, methods, and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An automotive manufacturing system, comprising:
a hoist supported by a support structure and configured to carry a vehicle component;
a load leveler mechanism attached to the hoist, the load leveler mechanism including a frame, a weight movably coupled to the frame, and an actuator operatively coupled to the weight;
a control circuitry connected to the actuator; and
an input device connected to the control circuitry and configured to generate input data in response to a user interacting with the input device,
wherein the control circuitry is configured to move, via the actuator, the weight relative to the hoist based on the input data to adjust a levelness of the hoist, and
wherein the weight of the load leveler mechanism is a primary weight positioned adjacent a first side of a hoist body, the load leveler mechanism including an auxiliary weight supported by the hoist body and positioned adjacent a second side of the hoist body opposite to the first side.

2. The automotive manufacturing system of claim 1, wherein the frame of the load leveler mechanism is configured to couple to a body of the hoist and decouple from the body.

3. The automotive manufacturing system of claim 1, wherein the load leveler mechanism includes a safety structure coupled to the frame and preventing access to the weight by the user.

4. The automotive manufacturing system of claim 1, wherein the primary and auxiliary weights are incrementally adjustable.

5. The automotive manufacturing system of claim 1, wherein the control circuitry is configured to present, via an output device, a production instruction notifying the user regarding how or when to interact with the input device during a production run of the manufacturing system.

6. The automotive manufacturing system of claim 1, wherein the input device includes an operation box positioned in a manufacturing area within viewing distance of the hoist.

7. The automotive manufacturing system of claim 1, wherein the control circuitry is configured to:
receive a user input from the input device indicative of a predefined position of the weight relative to the hoist, and
move, via the actuator, the weight to the predefined position to substantially level the hoist.

8. The automotive manufacturing system of claim 1, wherein the input device includes switch mechanisms, and wherein the control circuitry is configured to initiate control of the actuator in response to detecting activation of one of the switch mechanisms.

9. The automotive manufacturing system of claim 8, wherein the control circuitry is configured to:
receive a user input from the input device indicative of a first predefined direction or a second predefined direction opposite the first predefined direction,
move, via the actuator, the weight relative to the hoist in the first or second predefined direction while the one of switch mechanisms is held in an activated state, and
cease moving, via the actuator, the weight relative to the hoist when the one of the switch mechanisms changes from the activated state to a deactivated state.

10. The automotive manufacturing system of claim 1, further including a first tilt sensor positioned on the hoist and connected to the control circuitry, wherein the control circuitry is configured to:
detect a coarse tilt angle of the hoist via the first tilt sensor, and
move, via the actuator, the weight relative to the hoist at a first speed based on the coarse tilt angle.

11. The automotive manufacturing system of claim 10, further including a second tilt sensor, different from the first tilt sensor, positioned on the hoist and connected to the control circuitry, wherein the control circuitry is configured to:
detect a fine tilt angle of the hoist via the second tilt sensor, and
move, via the actuator, the weight relative to the hoist at a second speed, less than the first speed, based on the fine tilt angle.

12. The automotive manufacturing system of claim 11, wherein the control circuitry is configured to:
perform a comparison of the coarse tilt angle with an auxiliary target tilt angle,
move, via the actuator, the weight (a) at the first speed when the coarse tilt angle is greater than the auxiliary target tilt angle and (b) at the second speed when the coarse tilt angle is less than or equal to the auxiliary target tilt angle.

13. The automotive manufacturing system of claim 11, wherein the control circuitry is configured to:
   perform a comparison of the fine tilt angle with a primary target tilt angle,
   move, via the actuator, the weight at the second speed when the fine tilt angle is greater than the primary target tilt angle, and
   cease movement, via the actuator, of the weight when the fine tilt angle is less than or equal to the primary target tilt angle.

14. The automotive manufacturing system of claim 11, wherein the first tilt sensor includes a relatively low precision inclinometer and the second tilt sensor includes a relatively high precision inclinometer.

15. The automotive manufacturing system of claim 11, wherein the control circuitry includes a feedback controller forming a feedback control loop with the actuator, the first tilt sensor, and the second tilt sensor.

16. The automotive manufacturing system of claim 1, wherein the load leveler mechanism has a first operating mode associated with a first operating characteristic of the load leveler mechanism and a second operating mode associated with a second operating characteristic of the load leveler mechanism different relative to the first operating characteristic, and wherein the control circuitry is configured to:
   receive a user input from the input device indicative of the second operating mode while the load leveler mechanism is in the first operating mode,
   change, based on the user input, the load leveler mechanism from the first operating mode to the second operating mode, and
   operate the actuator while the load leveler mechanism is in the second operating mode.

17. An adjustable load leveler mechanism for a hoist, comprising:
   a frame coupled to the hoist;
   a weight movable along the frame to change a center of gravity of the hoist;
   an actuator operatively coupled to the weight;
   an input device configured to generate a user input in response to a user interacting with the input device; and
   a control circuitry configured to receive the user input from the input device and control, based on the user input, the actuator to move the weight relative to the hoist,
   wherein the weight of the load leveler mechanism is a primary weight positioned adjacent a first side of a hoist body, the load leveler mechanism including an auxiliary weight supported by the hoist body and positioned adjacent a second side of the hoist body opposite to the first side.

18. A method of operating an adjustable load leveler mechanism attached to a hoist, comprising:
   interacting with an output device to receive a production instruction;
   lifting an object of interest off of a first handling unit via the hoist;
   identifying an input device connected to a control circuitry of the adjustable load leveler mechanism, the adjustable load leveler mechanism including a frame, a weight movably coupled to the frame, and an actuator operatively coupled to the weight; and
   interacting with the input device in accordance with the production instruction to cause the control circuitry to move, via the actuator, the weight relative to the hoist to adjust a levelness to the hoist,
   wherein the weight of the load leveler mechanism is a primary weight positioned adjacent a first side of a hoist body, the load leveler mechanism including an auxiliary weight supported by the hoist body and positioned adjacent a second side of the hoist body opposite to the first side.

19. The method of claim 18, further including pushing a switch mechanism of the input device to cause the control circuitry to change the adjustable load leveler mechanism from a first operating mode to a second operating mode, the first operating mode associated with a first operating characteristic of the adjustable load leveler mechanism, the second operating mode associated with a second operating characteristic of the adjustable load leveler mechanism different from the first operating characteristic.

* * * * *